United States Patent [19]
Beltran

[11] Patent Number: 5,630,074
[45] Date of Patent: May 13, 1997

[54] INTER-PROGRAM COMMUNICATION AND SCHEDULING METHOD FOR PERSONAL COMPUTERS

[75] Inventor: Anthony R. Beltran, Columbia Heights, Minn.

[73] Assignee: Network Systems Corporation, Minneapolis, Minn.

[21] Appl. No.: 441,120

[22] Filed: May 15, 1995

Related U.S. Application Data

[63] Continuation of Ser. No. 995,409, Dec. 18, 1992, abandoned.

[51] Int. Cl.$^6$ .................................................... G06F 13/00
[52] U.S. Cl. .................. 395/250; 364/939.7; 364/239.8
[58] Field of Search .............................. 395/200.01, 250, 395/650, 725, 775, 800

[56] References Cited

U.S. PATENT DOCUMENTS

| | | | |
|---|---|---|---|
| 4,692,861 | 9/1987 | May | 395/650 |
| 4,819,151 | 4/1989 | May | 395/650 |
| 5,212,792 | 5/1993 | Gerety et al. | 395/656 |
| 5,214,759 | 5/1993 | Yamaoka | 395/200 |
| 5,237,691 | 8/1993 | Robinson | 395/700 |
| 5,265,239 | 11/1993 | Ardolino | 395/500 |
| 5,274,821 | 12/1993 | Rouquie | 395/700 |

*Primary Examiner*—David Y. Eng
*Attorney, Agent, or Firm*—Haugen and Nikolai, P.A.

[57] ABSTRACT

A control program for IBM compatible microprocessors utilizing the MSDOS operating system provides the ability for a plurality of application programs to pass information amongst themselves and to a KERNEL program whereby the KERNEL may spawn applications according to the contents of its message buffers, thereby enhancing the MSDOS environment without the usually encountered conflicts associated with inter-programmed communication schemes.

7 Claims, 8 Drawing Sheets

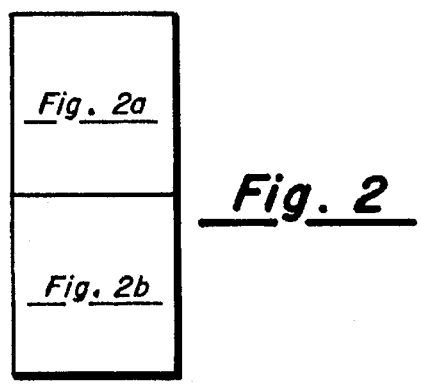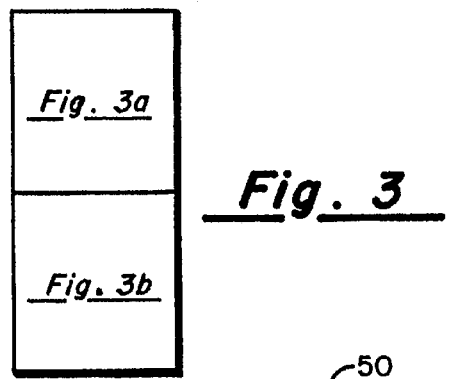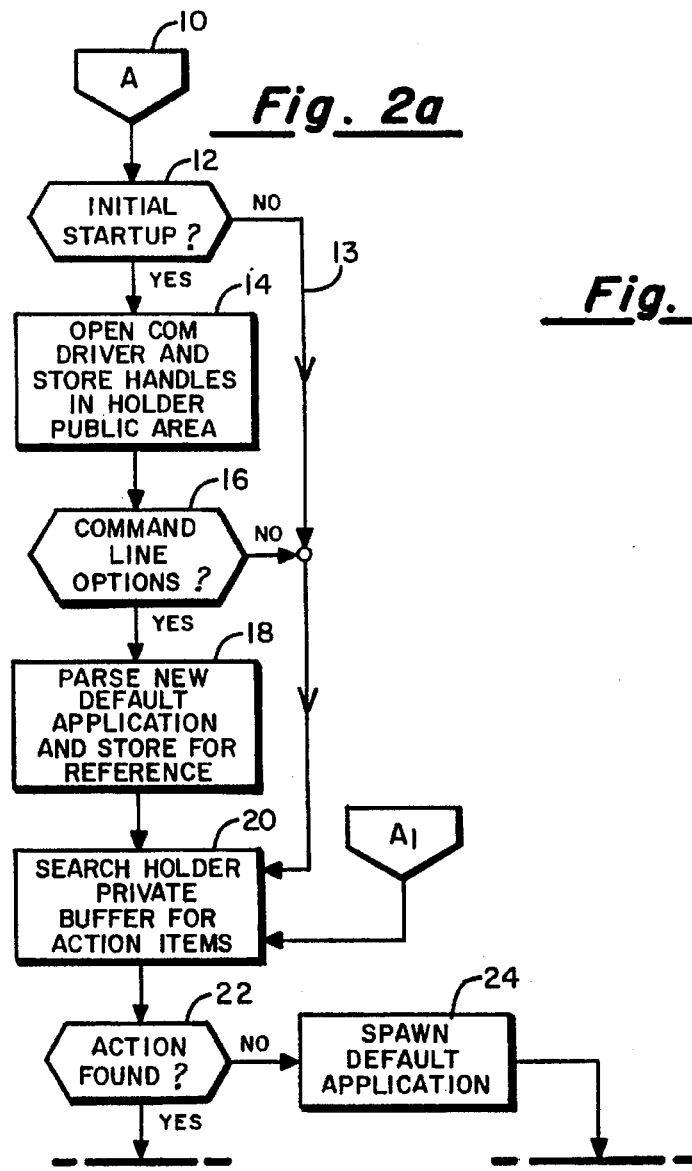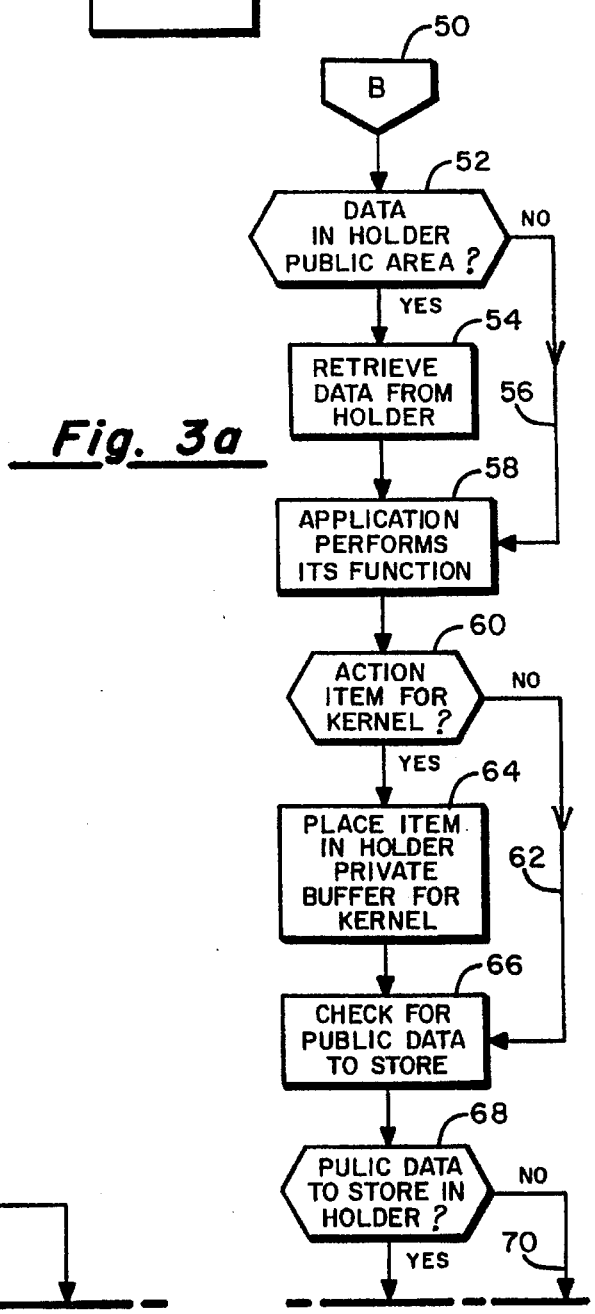

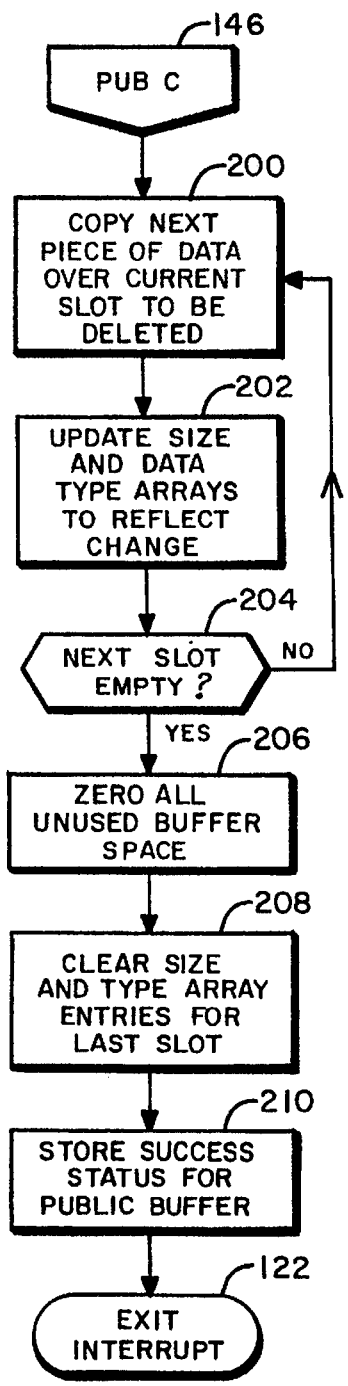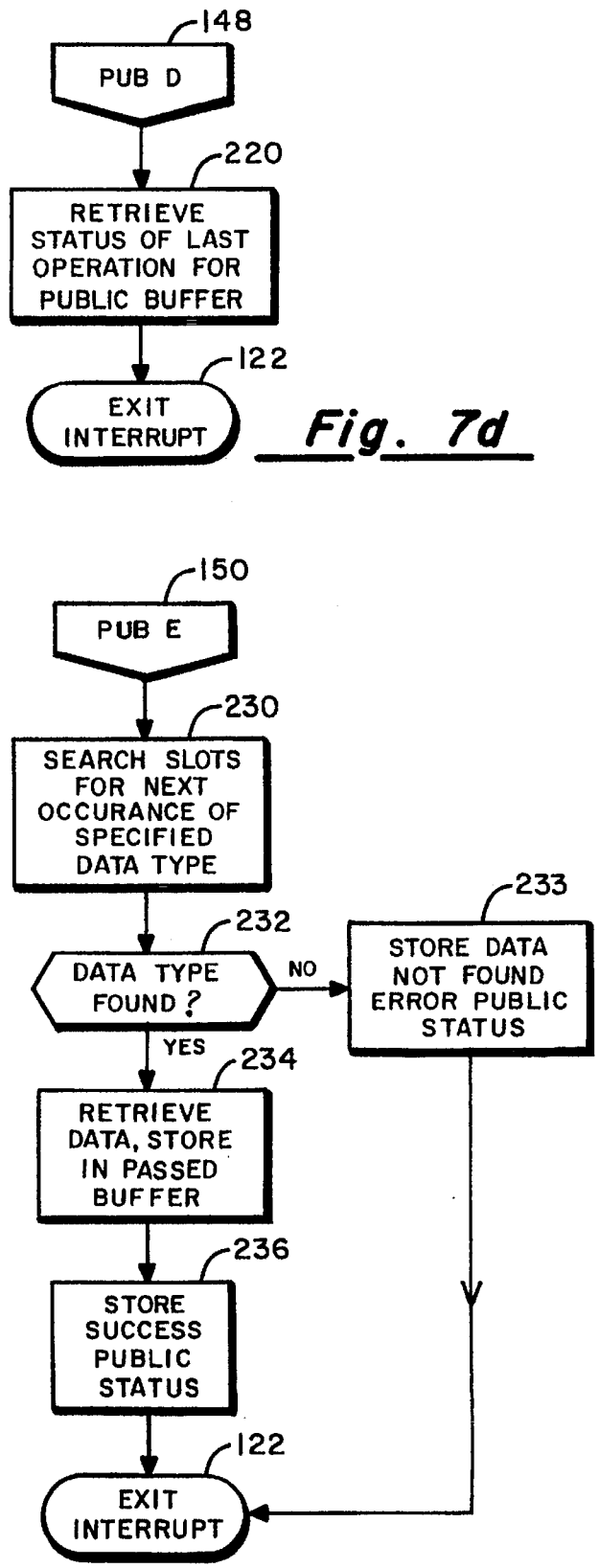
Fig. 7c
Fig. 7d
Fig. 7e

INTER-PROGRAM COMMUNICATION AND SCHEDULING METHOD FOR PERSONAL COMPUTERS

This is a continuation of application Ser. No. 07/995,409, filed on Dec. 18, 1992 now abandoned.

BACKGROUND OF THE INVENTION

I. Field of the Invention

This invention relates generally to inter-program communication, and more particularly to apparatus in the form of a control program which provides application programs with the ability to communicate with each other, control each other and to share the communications hardware through a common driver while providing a uniform interface to the user.

II. Discussion of the Prior Art

Personal computers based upon the Intel 8×86 family of micro-processors, also known as IBM PCs or IBM compatible PCs, are the dominant standard for personal computing. The continuing popularity of this standard is due principally to the relatively low hardware cost plus the availability of a large body of applications software written to operate with a specific Disk Operating System (DOS) known as MSDOS which is sold by Microsoft Corporation. MSDOS, as with any operating system software, provides a prescribed environment for the operation of application programs. While the term MSDOS literally refers the software sold by Microsoft Corporation, it is frequently construed to include the Basic Input-Output System (BIOS) program contained in the Read-Only-Memory contained in any IBM compatible PC. Hereafter the term MSDOS will be used to mean the standard operating system, including the BIOS, of an IBM compatible personal computer generally conforming to the MSDOS (version 3.0 or later) protocol. Persons skilled in the art will be knowledgeable of the structure and mode of operation of MSDOS, but those desiring further background are referred to the detailed description of MSDOS found in a publication entitled "Advanced MSDOS" by Raymond Duncan, Microsoft Press, Copyright 1988.

BRIEF MSDOS TUTORIAL

MSDOS is comprised of a collection of programs which together provide an operating interface by which a user may interrogate and control the operation of the PC. When MSDOS is started it first completes an initialization process and then calls the command interpreter (COMMAND.COM). This program accepts, and acts upon, commands entered by the user via the keyboard. At this level, the commands are actually the names of files which contain a corresponding executable program. For example, if the user enters the command, "DIR", the command interpreter program will find the file "DIR.COM", load the program DIR into memory, if not already resident, and transfers control to the DIRectory program. The program DIR is executed, causing the contents of the current directory to be printed on the user's display. The DIR program terminates by returning control to the MSDOS command interpreter which then awaits the next user command. The user may thus invoke the execution of any MSDOS command or application program by entering the program name. The program thus called may, in turn, call low level DOS service routines to communicate with the various Input/Output resources.

The foregoing description fairly encompasses the relatively primitive scope of MSDOS when it was first introduced with the IBM PC, the model XT. The limited memory and computing resources of the model XT precluded many of the capabilities of known main frame and minicomputer operating systems such as UNIX. Whereas UNIX provided a very capable multi-user, multi-tasking environment, MSDOS was constrained to a single user, executing a single task with, at most, 640 kilobytes of random access memory. More significantly, MSDOS allows the application programs unrestricted access to input-output facilities, such as the asynchronous communication ports. The aforementioned limitations are inherent to MSDOS and cannot be directly overcome within MSDOS without compromising compatibility. Although examples of efficient inter-program communication and dynamic task scheduling are well known in other operating systems, this desirable capability has heretofore not been available on a personal computer running MSDOS.

Although MSDOS is readily extendible, such that new control programs may be incorporated to add new, or altered, features to the operating system, known prior art schemes do not yield an operating environment wherein a number of distinct application programs may be called by a single user command to efficiently and cooperatively accomplish a complex task. Whereas examples of this capability abound in more capable operating systems, the typical practice under MSDOS is to write a single monolithic program corresponding to the complexity of the task. It is believed that this is because prior art solutions to inter-program communication and dynamic scheduling under MSDOS have either been incomplete or too cumbersome. The underlying problem is that for a control program to efficiently accomplish the communication and scheduling tasks, it must remain resident in RAM memory where it competes with application programs for scarce memory resources. This conflict continues even as the speed and RAM memory capacity of PCs continues to increase.

To understand the impact of the control program environment of the present invention on the DOS environment, it is deemed helpful to discuss some of the limitations imposed by DOS on any software under its control. Through this description, the value of the control program environment of the present invention will become more clear.

The operating system called DOS was originally written to operate in the hardware environment provided by the Intel 8088 microprocessor. In this environment, a maximum of 1 MB of addressable RAM is available. It is divided into two regions by DOS. The lower memory space comprises 640 KB of program memory. It is in this area that programs are loaded and run. The limitation here is that if a program requires more than this amount of memory, it has no other memory to expand into. Also, it should be noted that the 640 KB space must also be occupied by the DOS program, leaving the remaining space for applications, device drivers, and other system software. This can result in not having enough memory space for the application to run.

The upper memory space consists of the remaining 384 KB, which is used for firmware residing on any of the PC boards installed in any of the PC's expansion slots. The video RAM is also addressed here. This space was never intended to be used for application programs.

A later development provided for more memory through the use of what is known as expansion memory. This scheme places a 64 KB buffer in the upper 384 KB space. Any memory in the computer beyond the original 1 MB space is swapped into this buffer through the use of hardware registers. The memory is useful for program data, but still does not alleviate memory limitations for the application executable code.

With the introduction of the 80286 and newer processors, another memory mapping scheme was evolved. It uses the extra addressable memory capabilities of these newer processors (up to 16 MB) as extended memory. Again, this memory is useful for storing program data, but not the programs themselves.

With these newer memory mapping schemes, one is still limited by the 640 KB program space. Therefore, any additions to the system-level software must take as little memory space as possible. Also, with the newer processors (80286 and above), it is possible to move certain device drivers and other system programs into the upper 384 KB region. One must appreciate, however, that such software must be relocatable so as to run properly without regard to where it is located in memory.

A powerful feature of the DOS environment is the concept of the Terminate and Stay Resident (TSR) program. It is a program which, when run, initializes itself (usually attaching to an interrupt) and returns control back to DOS. From that point on, when its interrupt is generated, the TSR will "wake up" and perform the required function. A common example of this is the popular Sidekick software available from Borland Corporation. This software attaches itself to the PC keyboard interrupt. Every time a key is pressed, the program "wakes up" and provides a multitude of functions to the user in the form of calendar, note pad, etc. If the keystroke was not Sidekicks "hot key", Sidekick simply passes the keystroke to DOS for further processing.

DOS provides a batch file mechanism whereby a user may create an ASCII file containing any DOS command line entries. Application programs, DOS commands, and any other action which can be initiated from the DOS command line may also be initiated from a batch file. For example, the task of clearing files from a DOS directly can be automated by creating a batch file which contains the necessary sequence of commands as they would be entered at the DOS command line. Whenever this batch file is executed, the series of commands it contains will be carried out as if they were entered manually from the DOS command line. In reality, the DOS batch file processing software is parsing the batch file and temporarily spawning a COMMAND.COM to execute these commands. One problem inherent in batch file processing is that the parent program's (in this case, the batch file processor) environment is not passed along to the child process (the action generated by the entry in the batch file). Because of this, batch files cannot adequately perform in the same integrated manner as is permitted by the control program environment of the present invention. In addition, since the lines are hard-coded into the batch file, they cannot be dynamically altered in response to changes in external stimuli. Batch files can make use of rudimentary error codes produced by the applications on exit, but unless the line to deal with this is already in the batch file, it cannot be handled.

Another part of the operating system for MSDOS is the so-called "device driver". It provides device independence to the application software. The hardware, through the device driver, is accessed simply as a file. The device is opened read and written to, and closed when the application finished with the device.

OBJECTS OF THE INVENTION

It is an object of the invention to provide a control program apparatus which operates cooperatively with MSDOS to provide guaranteed response time inter-program communication which allows complex user directives to be efficiently accomplished by a multiplicity of interacting application programs and, further, that this capability is extendable to more time-critical, event-driven, or real-time, processing for which the personal computer running MSDOS has been heretofore generally unsuitable.

It is a further object of the invention to provide a control program which allows dynamic scheduling where the application programs which it controls are able to modify the thread of execution.

It is another object of the invention to provide an improved degree of control and specificity of the operating environment under which subordinate application programs are run.

Another object of the invention is to provide a control program that is easily extensible in a modular fashion. In other words, the control program environment is an "open" architecture in which other software programs (system and/or application level) have full access to the critical elements or "hooks". The result is that software enhancements may be added to the future with little or no modification to the existing system.

It is yet a further object of the invention to permit computers to operate without conflicting with MSDOS or any MSDOS compatible application program.

It is a still further object of the invention to accomplish the forgoing objectives without introducing new impediments to the efficient operation of subordinate application programs while still maximizing the RAM memory space available to these programs by employing a very compact and efficient control protocol.

Yet another object of the present invention is to provide a new software environment in which the resident software, including all buffers, is written entirely in 8086 assembly language and requires only a minimal amount of memory space (e.g., about 24 KB of the 640 KB space). Moreover, the software of the present invention can be loaded into the upper 384 KB memory space, thereby further reducing the overall memory requirement in the 640 KB space.

SUMMARY OF THE INVENTION

The invention is comprised of a novel control program which effectively extends the MSDOS operating system capability to include inter-program communication and dynamic scheduling. It is comprised of two subprograms, HOLDER and KERNEL, which are installed as resident programs during system initialization and thus become extensions to the MSDOS operating system conforming to the MSDOS rules for such extensions. FIG. 1 is a diagrammatic representation showing the relationship of the control program to the MSDOS operating system and the application programs which run under the extended operating system.

The HOLDER program is analogous to a post office. It controls the process of receiving, storing and delivering the "mail", i.e., inter-program communication. Application programs may call the HOLDER program to send mail, determine if there is any mail addressed to them or receive mail. The HOLDER program contains two buffer memories (mail rooms) which have identical structure and employ the same control protocol. However, they achieve a different result. The public buffer is the mail room which supports inter-program communication. Application program A may call the HOLDER program to send a message to application program B. When application program A terminates, and if application program B is executed at some future time, application program B may call the HOLDER program to receive the message sent by application program A. The intended addressee is denoted by the data type variables, a 16-bit unsigned integer which forms the heading of each message stored in the public buffer and thus provides for 65,536 distinct addresses. Thus far, there is no means for application program A to assure that application program B ever gains the opportunity to receive its message. This is not a problem if both programs are part of a pre-defined script which assures that both programs are called in sequence. However, it is very desirable to allow application program A to cause the execution of application program B, thereby enabling a complex task to be accomplished by a set of interactive application programs without the encumbrance of a script. This capability, known as dynamic scheduling, is supported by the other HOLDER mail room, the private buffer which is reserved for a special kind of mail.

The private buffer contains the execution thread required to accomplish a complex task. An application program may send one or more messages to the private buffer, each message identifying a program to be executed to, in effect, create a master plan. When an application program is called to fulfill its role in the master plan, it may communicate, via the HOLDER program, to become aware of the master plan of which it is a part and may also alter the plan. Such alterations include adding new application programs to the plan, deleting application programs from the plan and changing the order of execution. It can also cause its own future re-execution by adding its own program name to the plan.

Although the aforementioned application programs are not part of the instant invention it is understood that they must be written to conform to the inter-program communication protocol of the instant invention to make use of this capability. The foregoing does not, however, preclude the possibility of including in the execution thread of the master plan any MSDOS compatible program, even though it is not so written.

There must be at least one application program capable of invoking the control program of the instant invention. Typically this would be a menuing program responsive to user direction, since the ultimate control of a personal computer typically resides with a human operator. The commercial programs, Windows sold by Microsoft Corporation, and Deskview sold by Quarterdeck Corporation, are examples of menuing programs which provide a menu of tasks from which a user may choose. The user inputs are interpreted by the menuing program which causes the respective program or programs to be executed. The term "MENU program" will be used to mean any program which invokes the control program of the instant invention in response to any computer input including, but not limited to, operator input devices such as a keyboard or a mouse. The MENU program communicates with the control program in two steps. First, the MENU program calls the HOLDER program to store the requested execution thread in the private buffer. In the simplest case, this would be the name of a single application program to be executed, but could be a sequence of as many as 32 programs, limited only by the slot capacity of the private buffer. The MENU program may also employ the public buffer of the HOLDER program to send messages to certain application programs which comprise the execution thread to modify their behavior when they execute. Also, each application has the ability to modify the public and private holder buffers to alter dynamically the course of actions following the application's control. The MENU program is really just another application as child process spawned by the KERNEL. Any application that makes use of the environment can perform the same functions.

Recall that interaction with the HOLDER program merely establishes a master plan for execution. The actual execution is initiated when the MENU program passes control to the KERNEL program. Although the KERNEL program appears as another applications program to MSDOS, it appears as a part of the extended operating system to the application programs that it controls. The KERNEL program functions as a dispatcher. When it gains control, it reads the private buffer to determine the next program to call. Whenever the KERNEL program finds an entry in the private buffer, it removes that entry and spawns the respective program. The program thus spawned is subordinate to the KERNEL program in that the spawned program is the child of the parent KERNEL program which inherits the KERNEL's environment and returns control to the KERNEL program when it terminates. Upon regaining control, this action is repeated until the execution thread has completed, i. e., the private buffer is empty, at which time control is passed back to the MENU program. Whereas the application programs which are part of the execution thread may modify the execution thread, the KERNEL program is constrained to follow the execution thread without modification.

Preferably, the entire process should be started by first calling the KERNEL program which, finding the private buffer empty, calls the MENU program. Since the KERNEL program is now the "parent" of the MENU program, control is passed to the KERNEL program whenever the MENU program terminates normally. When the KERNEL program has completed the execution thread by responding to all of its messages contained in the private buffer, a default program (typically the MENU program) is spawned to await a new event which will again involve the control program.

In summary, the MENU application program may use the control program of the instant invention to cause a multiplicity of other application programs to operate in a prescribed, yet not fully scripted, manner. This capability may be better understood by considering the analogy of a football team. The quarterback, like the MENU application program, has the role of communicating to the rest of his team (other application programs), the detailed instructions to accomplish a given play. The huddle and the call at the line of scrimmage allow the quarterback to communicate a master plan for which each player has a specified role. Certain players are given special instruction, known as play options. When the ball is snapped each player executes his part of the plan making adaptations, as required, in response to the action of other players (The analogy could be further expanded to consider the opposing team to be analogous to the dynamic operating environment of the application programs which conditionally modifies the behavior of the programs.).

The football team is a parallel model wherein players communicate and interact concurrently. In the MSDOS environment only one program can be active at any instant and that program is not inherently aware of programs which precede or follow it. The dynamic scheduling and inter-program communication capability of the control program enables a set of application programs to gain this awareness and to behave as if they were operating concurrently without the relatively high overhead associated with multi-tasking. The result is a very compact program which can be totally resident in RAM memory to achieve fast response and which yet leaves ample RAM memory space for application programs.

The memory required for both the control program and the communications driver are as follows:

HOLDER code—4.6 KB

Private Buffer—1
Public Buffer—1
KERNEL code—7.4
COM Driver code—2
COM Buffer—16 4 KB×4 (2 ports each with 4 KB IN buffer & 4 KB OUT buffer)
Total memory—32 KB In the control program environment of the present invention, the KERNEL opens both communication ports, via the device driver. The resultant file handles are then placed into the HOLDER TSR public buffer. Any application then accesses the RS-232 ports, via the file handles in the HOLDER TSR buffer. The application only reads and writes to the RS-232 ports. Since only the KERNEL program opens or closes the ports, various applications are able to share the RS-232 hardware. For example, one application can start a data transfer and spawn another application to continue. Since the buffers in the device driver are large enough to hold typically two seconds worth of data at a 19200 baud rate, there is ample time for one application to spawn another without losing any data.

The HOLDER program of the instant invention is a TSR program. It attaches itself to an unused interrupt so that it "wakes up" only when its interrupt is specifically generated by an application or by the control program KERNEL. In this manner, HOLDER's operation is completely transparent to the user. Moreover, all of the technical details of the control program are completely transparent to the user. As far as the user is concerned, the control program of the present invention is nothing more than another simple menuing program when, in fact, it is performing many behind-the-scenes types of operation.

The control program of the present invention is completely compatible with MSDOS. It works with MSDOS, passing any unrecognizable commands to MSDOS to handle, taking an unused interrupt for its TSR, and providing device drivers written in strict accordance with Microsoft's guidelines. Furthermore, the control program environment does not try to duplicate MSDOS's functionality. Instead, it tries to enhance MSDOS by providing those functions not already provided by MSDOS. Moreover, it is able to do this without taking up large amounts of memory from available program space.

The source Code, written in the language of Borland Turbo Assembler, is contained in Appendix A.

BRIEF DESCRIPTION OF THE DRAWINGS

FIG. 2 shows the relationship between FIGS. 2a and 2b.

FIGS. 2(a) and 2(b) when arranged as in FIG. 2 is a software flow diagram illustrating the KERNEL program in accordance with the present invention:

FIG. 3 shows the relationship between FIGS. 3a and 3b.

FIGS. 3(a) and 3(b) when arranged as in FIG. 3 is a software flow chart illustrating program flow within any application program, designed to utilize the inter-program communication afforded by the control program of the present invention;

FIGS. 7A–7E are more detailed software flow charts illustrative of the various options available depending upon the results of the function interpretation, via the Public Buffer, contemplated by the HOLDER program.

DETAILED DESCRIPTION OF THE INVENTION

The initialization of a PC computer includes the installation of the resident portion of MSDOS in RAM memory. When this is complete, the HOLDER program is also installed as a TSR program. The starting address of the HOLDER program is stored at address 63h (Hex.) in the interrupt vector table. This allows the HOLDER program to be called by executing programmable interrupt 63h. Finally the KERNEL program is installed. It does not require an interrupt vector since it will be called using the standard MSDOS procedure used to call application programs. The control program is now resident and ready to provide control and communication services to application programs.

Figure 1:
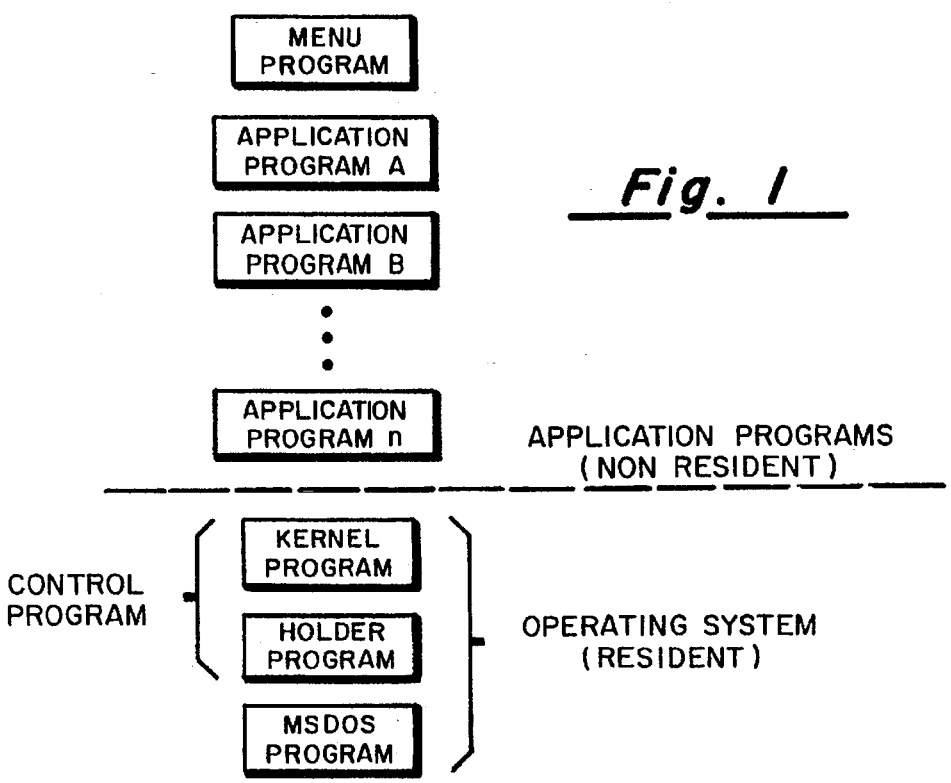
FIG. 1 is a block diagram illustrating the organization of the Operating System incorporating the control program of the present invention and its relationship to MSDOS and non-resident application programs.
Figure 6:
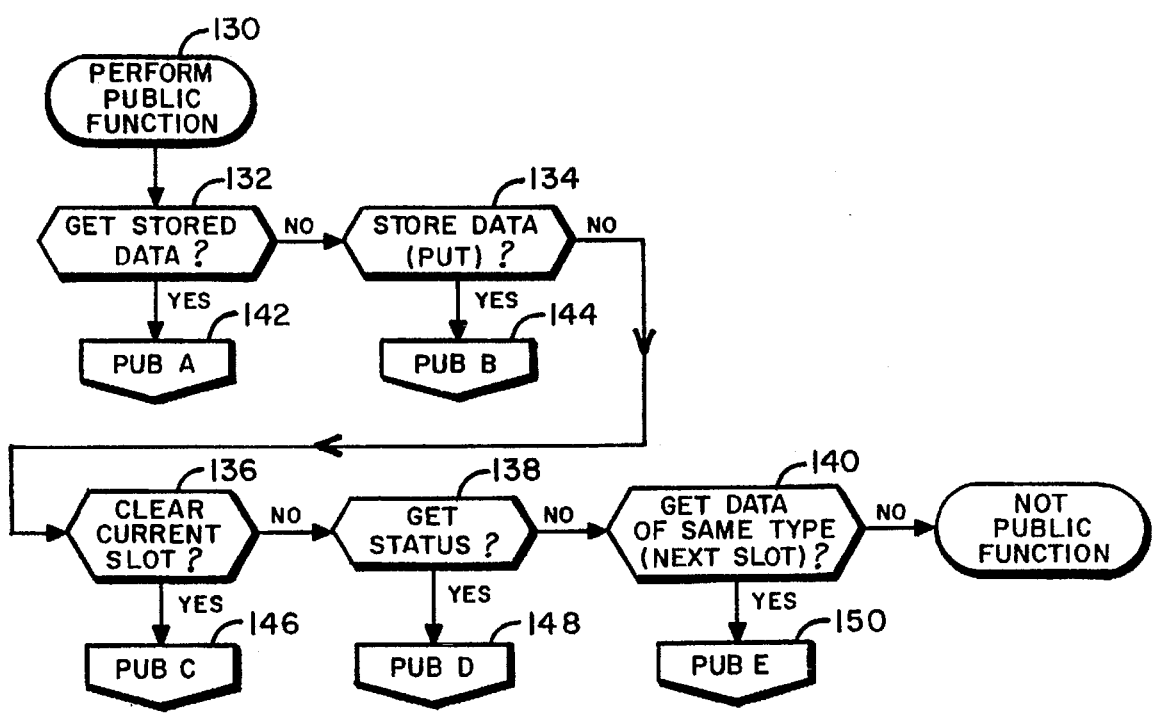
FIG. 6 is a general software flow diagram showing the interpretation of functions contained in the Public Buffer and requested using a stored identifier.
Figure 2B:
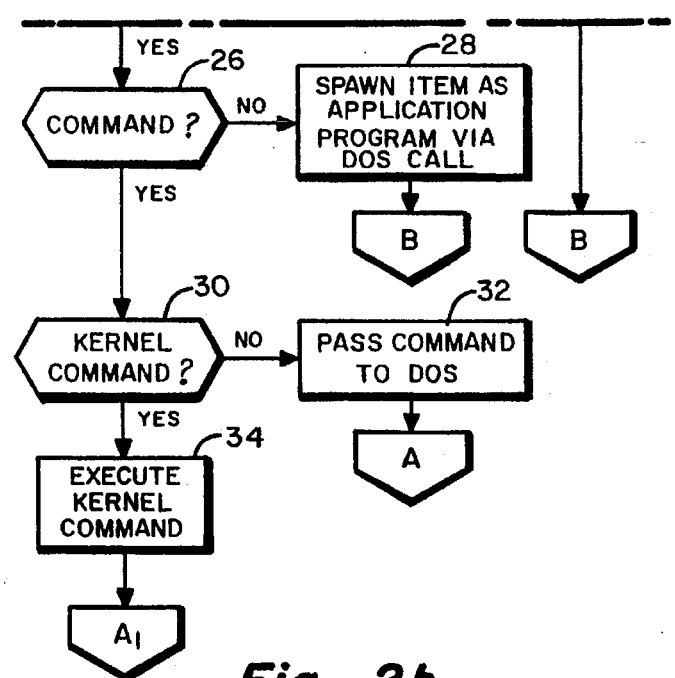

The KERNEL is a supervisory program which operates in conjunction with the MENU and HOLDER programs to initiate a program, or sequence of programs in response to a user command while maintaining continuous control of the operating environment. Although it is possible for an application program to assume control of the operating environment, contrary to the intent of the invention, the KERNEL does not relinquish control. As an aid in understanding, the application program can be considered as a "child" of the "parent" KERNEL program which "inherits" the parent's MSDOS operating environment plus any extensions to the operating environment placed in the public buffer. FIGS. 2a and 2b when arranged as shown in FIG. 2 show a block diagram of the operation of the KERNEL program. The KERNEL is the only application run from the MSDOS command line. Any application run under the control program is launched by the KERNEL as a child process. This includes the MENU program. HOLDER, as the TSR, is usually executed at the system startup from the AUTO EXEC.BAT file, though it could be started from the DOS command line. HOLDER must be installed before running the control program of the present invention. The KERNEL program is entered at entry point 10, having been called by the MENU program or directly from the MSDOS command level. At step 12, status is tested to determine if this is the first time the program has been called. If it is, step 14 is executed. To open the communications device driver, my program simply does a standard "FILE OPEN" request to DOS which returns a file handle that the KERNEL then stores in the public HOLDER buffer. This is done for each COMport. This driver operates much like the MSDOS drivers COM1 and COM2 to establish the essential communication parameters. MSDOS returns the file handle for each port found to be present in the host PC. A file handle is a 16-bit integer which names the file or communication port. It is provided by MSDOS when a request is made to open a file or communication port and subsequent requests to MSDOS for file service must include the file handle. As indicated by block 14, the KERNEL program stores each file handle along with a uniquely specified identifier in the public buffer associated with the HOLDER program. Since the communication file handles remain constant and accessible to all application programs spawned by the KERNEL program, multiple applications are now able to use a common file handle to thus share access to a given communication port. This is illustrative of the general capability of the instant invention to enable the operating system to regain control in those instances where MSDOS has surrendered too much control thereby providing a more useful total operating environment for application programs.

If the KERNEL program has been previously called, branch 13 is taken and execution passes to the operation represented by block 20. If the KERNEL program has been called from the MSDOS command level and a new default application program name has been entered as a command line option this condition is sensed at decision block 16 and the operation of block 18 captures the new program name and overwrites the intrinsic default application program name of MENU. If the above condition had not occurred, branch 13 is taken and execution passes directly to the operation of block 20. Here, the HOLDER program is called, via interrupt 63h, with a request code to get data from the private buffer. The HOLDER program returns the identity of the next program or command, if any, to be executed along with the associated identifier. It should be recalled that identifiers are predefined such that they provide a classification of the type of action to be performed. If no action item is returned, control moves to block 24 causing the default application program to be spawned. The program MENU is spawned unless the default name has been changed due to execution of the operation of block 18.

If an action item is returned, at block 26 a test of whether the value of the identifier associated with the action item retrieved at the operation of block 20 is made. If it indicates that the action item is the name of an application program, then the operation of block 28 spawns that application program as a "child" process, via a MSDOS call. If the identifier has a value of 2 and the action item is recognized as one of the internal KERNEL commands of Table 1 then step 34 executes the internal command and branches back to operation of block 20. Otherwise the command is presumed to be an MSDOS command and the command is passed to MSDOS for execution.

TABLE 1

KERNEL Program Internal Commands

| Command | Meaning |
| --- | --- |
| home | Return to the control program home directory |
| reset | Clear all HOLDER TSR buffers |
| help | Print the command list |
| shell | Enter control program command mode |
| dos | Shell to MSDOS from control program command mode |
| exit | Exit control program command mode and return to the child application (or if the child application issues the command, the KERNEL exits to MSDOS). |

Figure 3B:
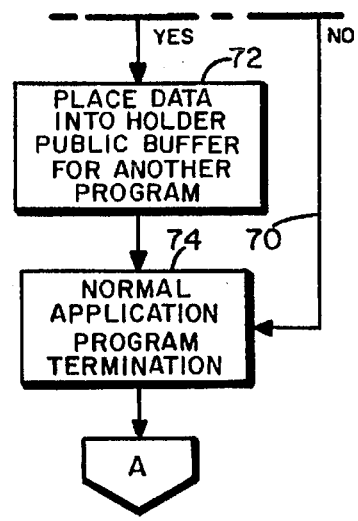

The software flow chart of FIG. 3 is illustrative of the program flow within any application program designed to use the inter-program communication and interaction capabilities afforded by the instant invention. Entry point 50 is the beginning of any such program spawned from the operations of either of blocks 24 or 28 in FIG. 2. Steps 52 and 54 call the HOLDER program, via interrupt 63h, with a request code to get data from the public buffer placed there by another application program. As indicated by block 58, the application performs it's intended function and at block 60 a test is performed to determine whether the instant application program should request the execution of another related application program. If so, operation block step 64 indicates that the name of the application program to be executed, along with its identifier, is placed in the private buffer, via interrupt 63h, using a "put data" request code. In the same manner the execution of the operations and test represented by blocks 66, 68 and 72 in FIG. 3 provide the option to place data in the public buffer to thus be available to other application programs. Block 74 indicates that a normal program termination is executed by calling any of the MSDOS functions reserved for that action causing the KERNEL program to be re-entered at point A (block 10, FIG. 2). In summary, the execution of the operations represented by operations 52 and 54 provide input data from other application programs while operations 60 and 64 provide dynamic scheduling and steps 66, 68 and 72 provide output data to other application programs. Alternatively, the KERNEL program may spawn an application which is not aware of the KERNEL or HOLDER programs. In this case, only the operations of blocks 58 and 74 are executed.

Figure 4:
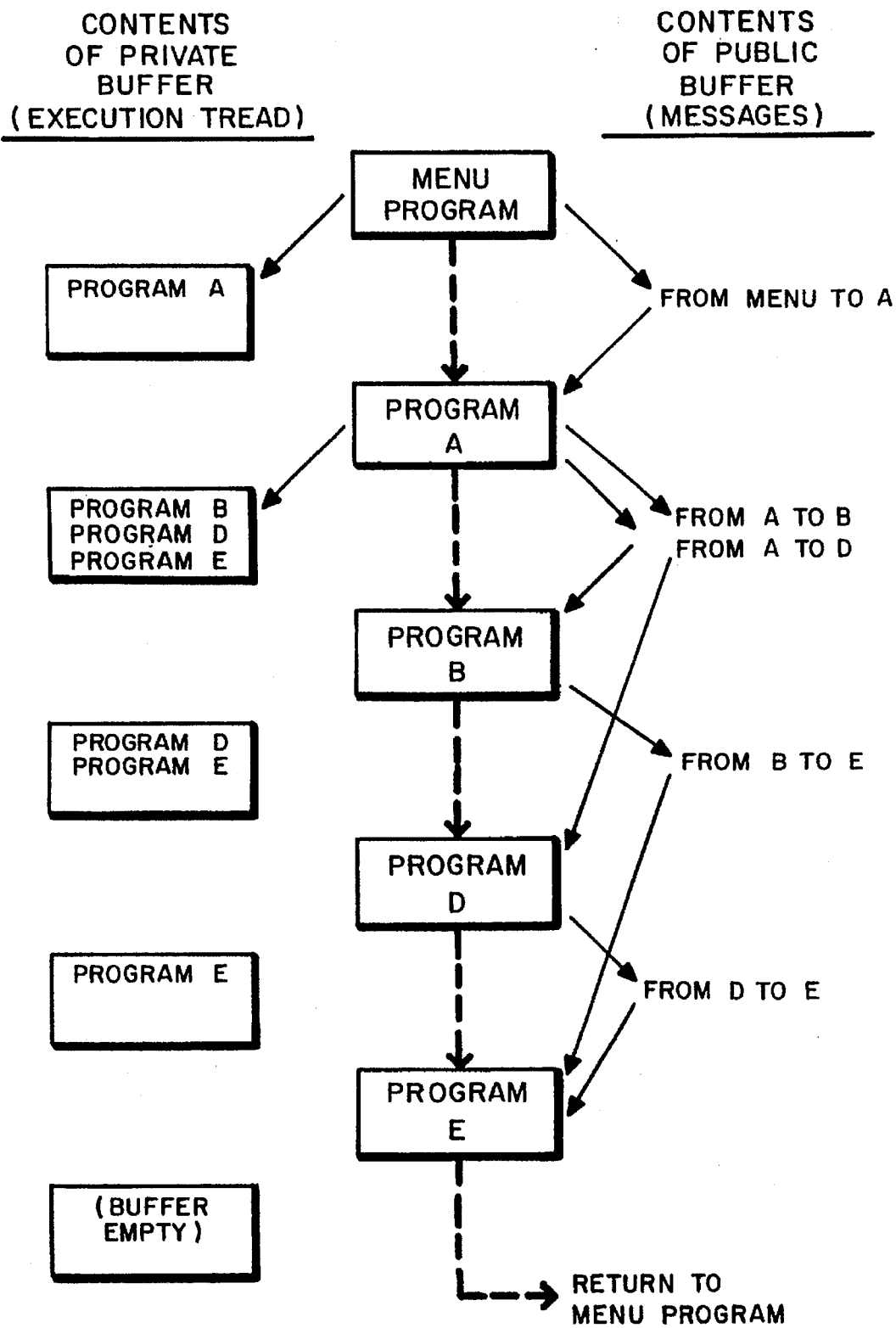
FIG. 4 is a flow diagram illustrating the execution sequence control and interprogram communication afforded to application programs which utilize the control program of the present invention.

The following example shown in FIG. 4 is illustrative of the versatility afforded by these programs. The heavy dashed lines indicate the program execution thread while the light solid lines indicate communication to and from the respective buffers. The KERNEL program is initially called from the MSDOS command level. Since all HOLDER buffers are initially empty, the default application program MENU is spawned. The user selects a menu option to be performed which requires program A to gather data from a user specified location, programs B, C or D to conditionally process the data and program E to disseminate the data when the intervening programs have run. The MENU program uses the program A identifier to dispatch a message to program A, via the public buffer, which tells program A where to find the source data. The MENU program also places an action item in the private buffer, directing program A to be spawned. The MENU program terminates, returning control to the KERNEL program, which, finding the action item from the MENU program, spawns application program A. Program A gets the message from the MENU program, gathers the data, and determines that the data received requires processing by programs B and D, but not by program C, causing it to place action items in the private buffer directing the KERNEL to spawn programs B, D and E in that order. Next program A dispatches messages to programs B and D, telling them where to find their respective data and then terminates, returning control to the KERNEL program. In the same manner programs B, D and E are spawned with each program passing messages, via the public buffer, as required. Additional application programs, not shown, may be dynamically added to the schedule to accommodate exception handling, such as error reporting or error recovery. When program E terminates, the KERNEL program, finding no action items in the private buffer, again spawns the MENU program, returning control to the user to perform another menu selection.

The communication between the application program and the HOLDER program, indicated by blocks 54 and 72 of FIG. 3 uses the standard MSDOS function calling procedure. Various CPU registers are loaded with data by the application according to the function to be performed. The application then executes the programmed interrupt 63h to call the HOLDER program. The HOLDER program performs the requested function, loading various CPU registers with the requested information and then returns control to the application program. A common set of functions, differing only in the specific value of the request code, provides services for both the public and private buffers. These are:

getblock:

Get a piece of data, according to the specified identifier.

getnext:

Get the next piece of data according to the last specified identifier.

putblock:

Put a piece of data with its identifier in a HOLDER slot.

clearblock:

Clear the block of data last retrieved. A request to get a piece of data is non-destructive so any number of processes can have access to it, as needed.

status:

Get the status of the last operation.

signature: (provided in a startup routine)

Get the signature of the HOLDER.EXE program. This call is used to establish both the existence of the HOLDER.EXE TSR and its revision level. This call is made by the central program KERNEL on startup.

A detailed description of these functions is as follows:

PUBLIC BUFFER FUNCTIONS

Function 1: get the stored data from HOLDER's buffer
Registers to set for call:
  AH=1
  CX=number of bytes to be retrieved
  DL=identifier code (0=untyped)
  ES:DI=destination address
  Note that the destination must be large enough to hold all the requested data.
Registers as set on return:
  CX=number of bytes actually transferred
  Note that if CX=0, the buffer was empty and no data was transferred.
Before calling this function, it is prudent to get HOLDER's current status to make sure the stored data is for the current program.

Function 2: put data into HOLDER's buffer
Registers to set for call:
  AH=2
  CX=number of bytes to be stored
  DL=identifier code (0=untyped)
  DS:SI=source address
  Note the value in CX must be <=buffer size. If CX=0, the buffer is erased.
Registers as set on return:
  CX=number of bytes actually stored
  Most often, the best way to store data in the buffer will be with a formal C structure. From HOLDER's viewpoint, any data sent is just a stream of bytes which HOLDER makes no attempt to understand. The identifier code should be used to identify to another program whether the stored data is of interest or not.

Function 3: clear HOLDER's internal buffer
Registers to set for call:
  AH=3
Registers as set on return:
  None set on return
  This call should be done when either the caller is intending to store new data or doesn't want another program to have access to the stored data.

Function 4: get HOLDER's current status
Registers to set for call:
  AH=4
  Note that this routine is reentrant and can be called recursively.
Registers as set on return:
  BX=size of internal buffer (in bytes)
  CX=number of currently bytes stored in the internal buffer
  DH=error code from the previous operation
  DL=identifier code of data stored in buffer
  This should be done after each operation to insure that the requested operation was successfully performed.

Function 5: get next block of data with the same identifier
Registers to set for call:
  AH=5
  CX=number of bytes to be retrieved
  ES:DI=destination address
  Note that the destination must be large enough to hold all the requested data.
Registers as set on return:
  CX=number of bytes actually transferred
  Note that if CX=0, the buffer was empty and no data was transferred.

Function 100: get HOLDER's version and signature
Registers to set for call:
  AH=5
  Note that this routine is reentrant and can be called recursively.
Registers as set on return:
  CX=TSR signature (6996)
  DH=TSR major version number
  DL=TSR minor version number
  Example: version 1.2—DH=1 and DL=2
  This operation should be called to insure that the code at HOLDER's vector is actually Holder.

PRIVATE BUFFER FUNCTIONS

Function 101: get the stored data from HOLDER's buffer
Registers to set for call:
  AH=101
  CX=number of bytes to be retrieved
  ES:DI=destination address
  Note that the destination must be large enough to hold all the requested data.
Registers as set on return:
  CX=number of bytes actually transferred
  Note that if CX=0, the buffer was empty and no data was transferred.
Before calling this function, it is prudent to get HOLDER's current status to make sure the stored data is for the current program.

Function 102: put data into HOLDER's buffer
Registers to set for call:
  AH=102
  CX=number of bytes to be stored
  DL=identifier code (0=untyped)
  DS:SI=source address
  Note the value in CX must be <=buffer size. If CX=0, the buffer is erased.
Registers as set on return:
  CX=number of bytes actually stored
  Most often, the best way to store data in the buffer will be with a formal C structure. From HOLDER's viewpoint, any data sent is just a stream of bytes which HOLDER makes no attempt to understand. The identifier code should be used to identify to another program whether the stored data is of interest or not.

Function 103: clear HOLDER's internal buffer
Registers to set for call:
AH=103
Registers as set on return:
None set on return
This call should be done when either the caller is intending to store new data or doesn't want another program to have access to the stored data.
Function 104: get HOLDER's current status
Registers to set for call:
AH=104
Note that this routine is reentrant and can be called recursively.
Registers as set on return:
BX=size of internal buffer (in bytes)
CX=number of currently bytes stored in the internal buffer
DH=error code from the previous operation
DL=identifier code of data stored in buffer
This should be done after each operation to insure that the requested operation was successfully performed.
Function 105: get next block of data with the same identifier
Registers to set for call:
AH=105
CX=number of bytes to be retrieved
ES:DI=destination address
Note that the destination must be large enough to hold all the requested data.
Registers as set on return:
CX=number of bytes actually transferred
Note that if CX=0, the buffer was empty and no data was transferred.
The following errors may be reported as status returns:

| 1 | invalid HOLDER function call |
| 2 | no room in buffer for more data |
| 3 | HOLDER is busy |
| 201 | system interrupt error |
| 202 | requested identifier was not found |

Figure 5:
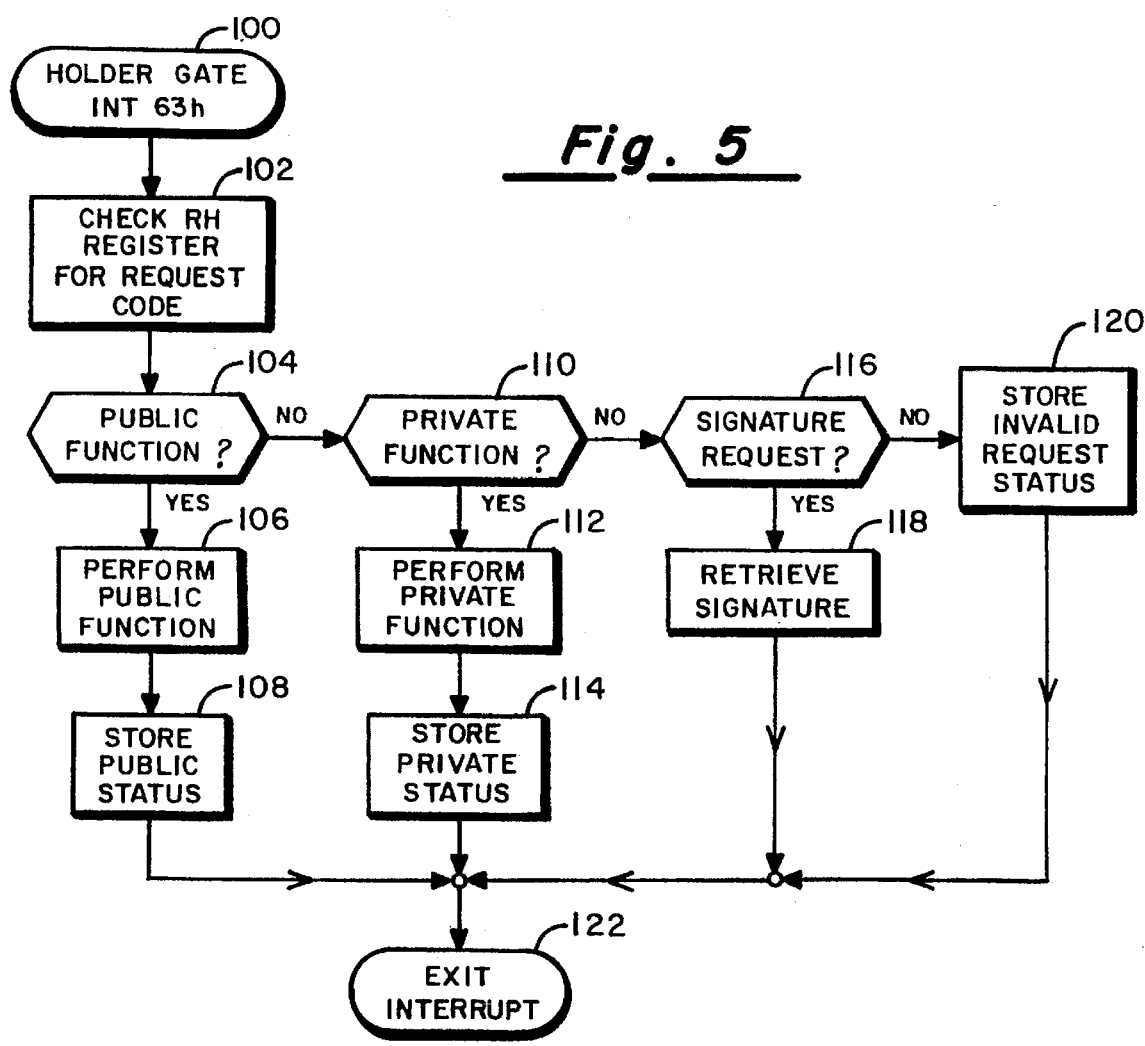
FIG. 5 is a software flow chart of the HOLDER program forming a part of the overall control program of the present invention.
Figure 7A:
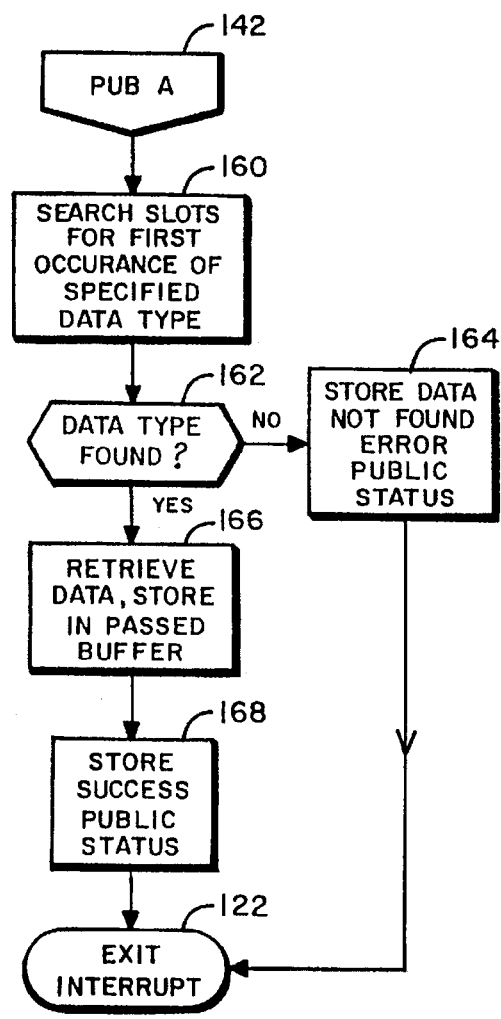
Figure 7B:
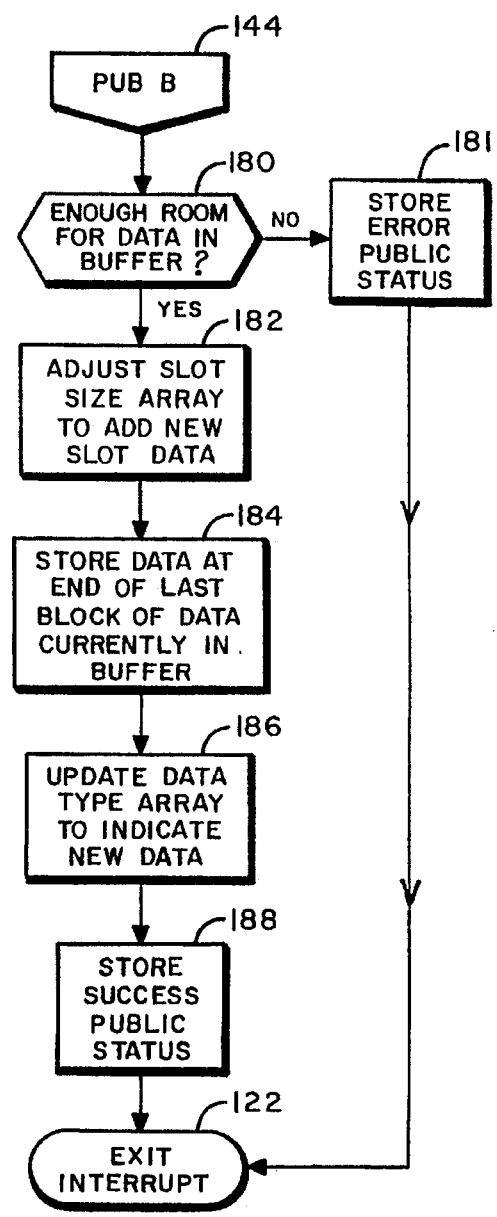

FIG. 5 shows a block diagram of the HOLDER program. Either the KERNEL program or an application program may call the HOLDER program by executing programmed interrupt, 63h. At block 102, a test is made of register AH to determine what action is being requested by the calling program. If the request code is for one of the public functions as determined by decision block 104, then the operations represented by blocks 106 and 108 are executed. If the request code is for one of the private functions as determined by decision block 110, then the operations called for by blocks 112 and 114 are executed. Recall that public functions, i. e., operations performed on the public buffer, support inter-program communication while private functions support dynamic scheduling. If the test of block 116 determines that the request code equals 100, the operation of block 118 is executed to retrieve the signature and version of the HOLDER program. If the request code is invalid, the operation of block 120 is executed to store an invalid request status. Each path through the program causes the information requested by the calling program to be loaded into the CPU registers specified by the HOLDER command function. The HOLDER program terminates by executing a return from interrupt instruction at block 122 thereby returning control to the calling program.

Several features have been incorporated into the HOLDER program to make it compact, efficient and versatile. For each buffer, i.e., the one kilobyte private buffer and the one kilobyte public buffer, a slot table is maintained which contains the identifier and block size for each slot. The slot table contains the buffer address corresponding to the end of the data plus one for a given slot. For each slot table, the HOLDER program maintains two indices; the current slot index and the next slot index. The slot table and its indices are initialized as follows:

| SLOT | 0 | 1 | 2 | 3 ... | 31 |
|---|---|---|---|---|---|
| | 0 | 1024 | 1024 | 1024 | 1024 |

CURRENT SLOT = 0   NEXT SLOT = 0

If, for example, the HOLDER program receives a command to store 20 bytes of data in the next slot, the data is entered into the buffer at addresses 0–19, the next slot index is incremented, and the slot table is updated as follows:

| SLOT | 0 | 1 | 2 | 3 ... | 31 |
|---|---|---|---|---|---|
| | 0 | 20 | 1024 | 1024 | 1024 |

CURRENT SLOT = 0   NEXT SLOT = 1

If, for example, the HOLDER program next receives a command to store 30 bytes of data in the next slot, this data is stored in the buffer starting at address 20 per the contents of slot one of the slot table as specified by the value of the next slot index. Both the current slot index and the next slot index are incremented and the slot is updated as follows:

| SLOT | 0 | 1 | 2 | 3 ... | 31 |
|---|---|---|---|---|---|
| | 0 | 20 | 50 | 1024 | 1024 |

CURRENT SLOT = 1   NEXT SLOT = 2

If the HOLDER program receives a command to delete the data in the current slot, the contents of the next slot minus the current slot are placed in the current slot and the data in the buffer is moved to reflect this change. This process is reiterated for each successive slot until the first unused slot is encountered, i.e., contents of the slot table entry equals 1024. This method of buffer management, known in the art as "garbage collection", allows the slot boundaries to be continuously adjusted to conform to the size of the message data while nevertheless allowing the HOLDER program to readily identify the beginning and end of a message using the slot indices and the slot table entries.

This allows the relatively small buffers to be used to provide a large virtual mailbox capability. Any slot may use any fraction of the total one kilobyte buffer space and the contents of any slot may be either the actual data, a vector which identifies the location of the data elsewhere in random access memory, or a file handle which identifies the location of the data in disk memory. Preferably the identifier is used to interpret which of these conventions should be applied to the contents of a given slot. Storing the data directly in the slot provides the fastest response while storing the data on disk conserves more valuable random access memory space. Thus, since each user of the public mailbox facility, i.e., the application programs, is able to judiciously balance the need for performance with the demand placed upon the communal public buffer space, the total buffer space may be relatively small. The identifiers provide a form of mailbox addresses which simplify the HOLDER program, making it both fast and compact. The operation of the HOLDER program is analogous to a file clerk who is able to store and retrieve information using a very limited and simple set of rules. The HOLDER program is also made compact by using the same buffer organization and control strategy for both the public and the private buffers, thus allowing portions of the program code to be shared.

FIGS. 6 and 7A through 7E show a more detailed block diagram of operations represented by blocks 104 and 106 in FIG. 5. The software represented by the flow chart of FIG. 6 interprets the specific function requested by testing the value of the identifier passed in register DL and then branching to the respective entry points represented by blocks 142–150, as labeled as Pub A through Pub E. FIGS. 7A through 7E each correspond to one of these entry points. If a request to get data from the public buffer A has been received, the operation represented by block 160 (FIG. 7A) is executed which sequentially searches the public slot table to find the first occurrence, if any, of a matching identifier. If none is found, control passes to block 164 to store the error status. If the identifier is found, the operation of block 166 is executed which accesses the slot table to find the location of the slot data in the public buffer. Then the slot data is moved from its slot location in the public buffer to the destination location specified by the calling program via the registers ES and DI. When the operation of block 168 is executed it stores the status of a successful transfer of data. If a request to store data in the public buffer has been received operation 180 is executed (FIG. 7B) which compare the free space in the public buffer with the contents of register CX which contains the number of bytes requested to be stored. If there is sufficient free space to satisfy the request step 182 is executed which appends a new entry to the slot table which is comprised of the identifier and the slot size, i. e., the number of bytes to be stored. The operations called for by blocks 184 and 186 use the contents of the DS and SI registers to locate the source of the data to be stored and the contents of the slot table to locate the destination of the data in the public buffer and performs the transfer. The slot table and the public buffer now contain the requisite information to allow another application program to retrieve the stored data using the previously described get data function. The execution of the operation indicated by block 188 stores the status of a successful transfer of data.

FIG. 7C shows the "GARBAGE COLLECTION" functions of HOLDER. This provides for very efficient use by the small buffers. GARBAGE COLLECTION occurs, as needed, without external intervention to prevent for augmentation of the buffer space. If a request to clear the current slot from the public buffer has been received, operation 200 (FIG. 7C) is executed which copies the contents of the next slot over the current slot. Operation 202 updates the slot table to reflect the new location in the public buffer of the next slot data. Next, the operations called for by blocks 200 and 202 are re-iterated until the test made at decision block 204 determines that the next slot is empty. If it is, operation 206 clears the unused buffer space while operation 208 results in the new state of the public buffer being entered in the slot table. At this point the public buffer has been restored to the state which existed just before data was last stored in the current slot. Execution of the operation indicated in block 210 stores the status of a successful clear operation.

If a "request to get" status has been received, the operation of block 220 (FIG. 7D) is executed which recovers the status stored during the execution of operations 168, 188, 210 or 236 and returns it to the application program. Also returned are the size of the public buffer, the number of bytes currently stored in the public buffer and the identifier of the data stored in the current slot. If a "request to get data" of the same type, i. e., having the same identifier, from the next slot of the public buffer has been received, the operation of block 230 is executed (FIG. 7E) which causes the public slot table to be sequentially searched to find the next occurrence, if any, of a matching identifier. If none is found as determined by the test identified in block 232, the operation of block 233 is executed to store the error status. Otherwise, the slot table is accessed to find the location of the slot data in the public buffer (block 234). Then the slot data is moved from its slot location in the public buffer to the destination location specified by the calling program via the registers ES and DI. The operation of block 236 stores the status of a successful transfer of data.

The private buffer functions fully correspond with the public buffer functions, differing only in the operations that are performed on the private buffer. Although it would be possible to employ a less capable private buffer organization, which would minimally satisfy the requirements of the preferred KERNEL program, it is not preferable to do so. Regardless of how simple it might be, a different private buffer organization would reduce sharing of HOLDER program code and, thus, increase its size. Further, it is advantageous to maintain the versatility of the public buffer organization for the private buffer since it provides a more open-ended architecture which enables the software of the present invention to maintain backward compatibility, while assuming new functions not yet anticipated.

Appendix A to this specification is the source code for the HOLDER and KERNEL programs. It is submitted as further satisfaction of the disclosure requirements of 35 U.S.C. 112.

Figure 8:
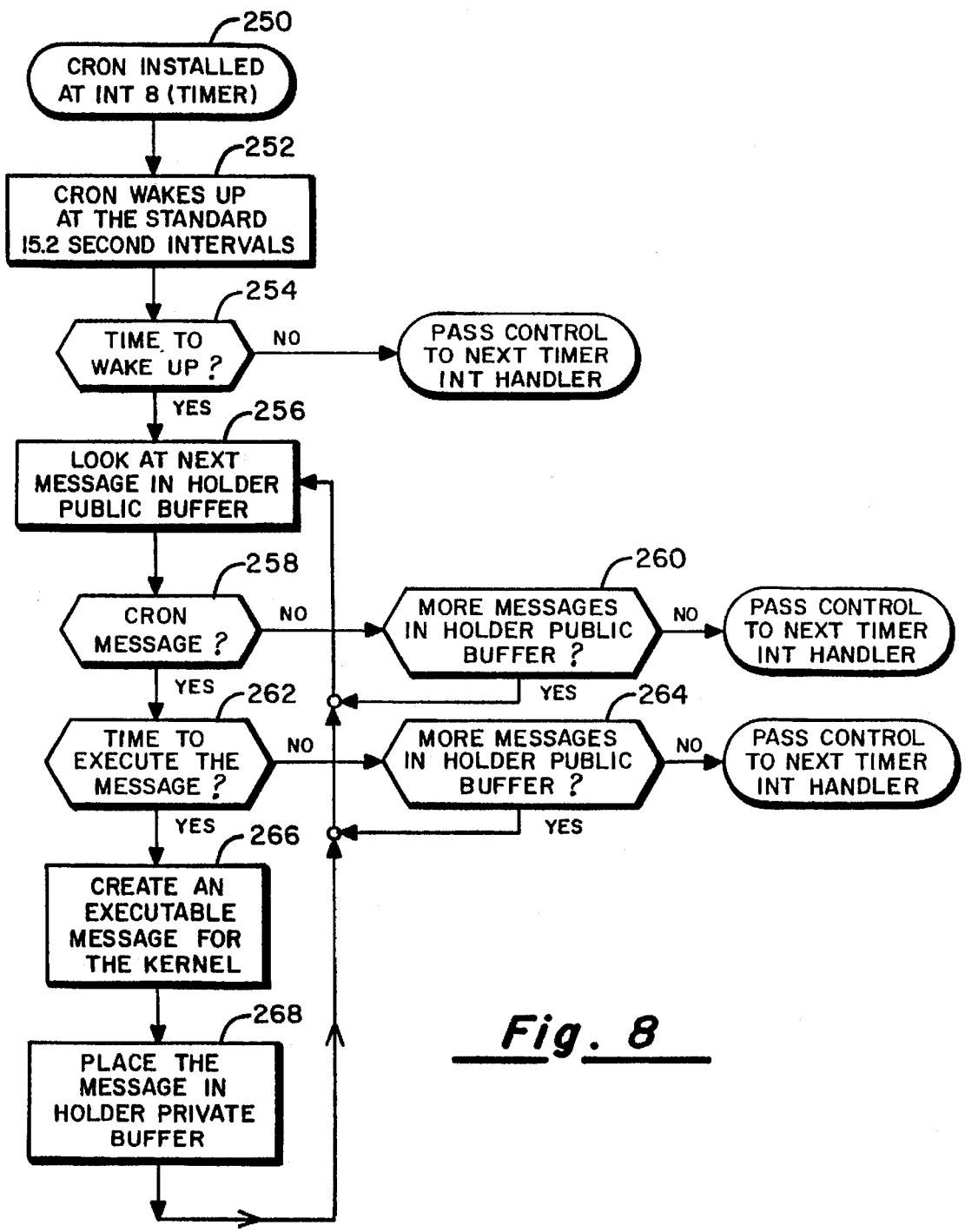
FIG. 8 is a software flow chart illustrating the CHRON program.

The following discussion is both an alternative embodiment of the invention and an illustration of the versatility of the invention to incorporate additional functionality without modification of the basic control program. The TSR program CHRON adds the capability of dynamic scheduling relative to the value of the computer real-time clock. The function on the CHRON program is to periodically scan the public buffer for time-stamped messages and, at the designated time, interpret these messages to compose an executable message to be added to the execution thread contained in the private buffer. Any application program, including the MENU program, may place a time-stamped message in the public buffer. Such a message may be a directive to execute an application program once at a specified future time. Alternatively, the message may direct the execution of an application program N times, or an indefinite number of times, at a specified interval starting at a specified future time. Time-stamped messages are distinguished by the value of their identifier. FIG. 8 shows a flow diagram of the CHRON program. Entry point 250 indicates that the interrupt vector table is modified such that the CHRON program intercepts the interrupt vector intended for the normal timer interrupt. This causes the CHRON program to be called, i.e., it gets a "wake-up" call, every 18.2 times per second, i.e., when the normal timer interrupt would otherwise be called. Although it would be possible to execute the CHRON routine at each 0.05 second interval, this adds processing overhead which may be unproductive. Rather, the operation represented by block 254 counts each wake-up call and passes control to block 256 only for the $n^{th}$ wake-up call. For example, if n=1000, control passes to the operation of block 256 every 50 seconds. For all intervening wake-up calls, control is passed directly to the next timer interrupt handler. At block 256, the HOLDER program is called to determine whether the next slot contains a time-stamped message. If not, then the operation of block 260 determines whether there are more messages in the public buffer by testing the value of the CX register. Recall that this register will have been returned with a value of zero if there had been no more data to be scanned. In this event, control passes to the next timer interrupt handler. Otherwise the program loops back to block 256. If a CHRON message is found, the time stamp is tested to determine whether it is now time to execute the message. If not, the program conditionally loops back to operation 256, via block 264, in the manner described for operation block 260. When it is determined that it is now time to execute a message, control passes to block 266 which creates an executable message for the KERNEL program. Specifically, the name of the application program found in the CHRON message is added to the private buffer to become part of the execution thread.

The execution message may optionally contain various forms of precedence data which may be extracted from the CHRON message. If precedence data is made available in the private buffer, then any application program, while it is executing, may periodically examine the private buffer to detect when the CHRON program has added a higher precedence program to the execution thread. This provides the opportunity for a lower precedence program to terminate to allow a higher precedence program to be executed.

The private buffer functions fully correspond with the public buffer functions, differing only in that the operations are perform on the private buffer. Although it would be possible to employ a less capable private buffer organization, which would minimally satisfy the requirements of the preferred KERNEL program, it is not preferable to do so. Regardless of how simple it might be, a different private buffer organization would reduce sharing of HOLDER program code and, thus, increase its size. Further it is advantageous to maintain the versatility of the public buffer organization for the private buffer since it provides a more open-ended architecture which enables the software of the present invention to maintain backward compatibility, while assuming new functions not yet anticipated.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Appendix A

```
        IDEAL
        JUMPS

; Copyright (c) 1991-92 by Network Systems Corporation

INCLUDE "HOLDER.INC"

;
; THIS HOLDER TSR ACTUALLY PROVIDES TWO BUFFERS FOR STORAGE.  THERE IS
; THE PUBLIC BUFFER, AND AN IDENTICAL PRIVATE BUFFER WITH THE SAME TYPE
; OF FUNCTION CALLS.  THE TWO CAN CO-EXIST WITHOUT ANY INTERACTION.  THE
; PRIVATE VERSION IS USED BY NSCTOOLS AND NSCMENU FOR INTERNAL COMMUNICA-
; TION AND CONTROL.  THE PUBLIC BUFFER IS USED BY ANY PROGRAM.
;
; HOLDER PROVIDES FOR 32 DATA SLOTS IN EACH OF THESE BUFFERS.  THE BUFFERS
; PLACE NEW DATA ON A FIRST FIT BASIS.  THAT IS, SEARCHING FOR THE FIRST
; OPEN (0 DATA TYPE) SLOT STARTS WITH SLOT 0.  WHEN AN OPEN SLOT IS FOUND,
; IF THE SPACE AVAILABLE TO IT IS LARGE ENOUGH TO HOLD THE NEW DATA, IT IS
; USED.  IF NOT, THE SEARCH CONTINUES.  DURING A SESSION, THE BUFFER CAN
; BECOME FRAGMENTED.  IF A SLOT LARGE ENOUGH IS NOT FOUND, HOLDER WILL
; COMPACT THE EXISTING SLOTS BY MOVING THEM ALL TOWARD THE BEGINNING AND
; RESTRUCTURING TO CREATE ONE LARGE OPEN SLOT FROM ANY FREE SPACE.  IT WILL
; THEN TRY TO FIT THE DATA IN THIS NEW SPACE.  ONLY AFTER THIS EFFORT WILL
; A FAILURE BE REPORTED.
;
; RETRIEVAL OF DATA OCCURS ON A FIRST FIND BASIS.  THAT IS, STARTING FROM
; THE FIRST SLOT, THE FIRST PIECE OF AVAILABLE DATA MATCHING THE SPECIFIED
; TYPE IS RETRIEVED.  THE GETNEXT FUNCTION WILL RETRIEVE THE NEXT PIECE OF
; DATA MATCHING THE CURRENT DATA TYPE.
;
; THERE ARE GLOBAL VARIABLES WHICH REFLECT THE RESULTS OF THE LAST DATA
; ACCESS FROM EITHER DIRECTION.  THE INFORMATION INCLUDES THE SLOT, ACTUAL
; SLOT SIZE, AMOUNT OF DATA (IN BYTES) IN THE SLOT, THE TYPE OF DATA IN THE
; SLOT, THE ACTUAL INDEX INTO THE BUFFER (2 BYTES PER SLOT - 0, 2, 4...),
```

```
; THE ERROR CODE (0 - SUCCESS), AND FUNCTION CODE OF LAST ACCESS.
;

; EQUATES FOR STUFFING REGISTER VALUES ON STACK

SETAX       EQU      [WORD BP-2]      ; LOCATION OF PUSHED AX
SETBX       EQU      [WORD BP-4]      ; LOCATION OF PUSHED BX
SETCX       EQU      [WORD BP-6]      ; LOCATION OF PUSHED CX
SETDX       EQU      [WORD BP-8]      ; LOCATION OF PUSHED DX
SETSI       EQU      [WORD BP-10]     ; LOCATION OF PUSHED SI
SETDI       EQU      [WORD BP-12]     ; LOCATION OF PUSHED DI
SETDS       EQU      [WORD BP-14]     ; LOCATION OF PUSHED DS
SETES       EQU      [WORD BP-16]     ; LOCATION OF PUSHED ES
SETFLAGS    EQU      [WORD BP+6]      ; LOCATION OF PUSHED FLAGS
SETCF       EQU      01H              ; VALUE TO SET PUSHED CF FLAG
RESETCF     EQU      NOT SETCF        ; VALUE TO RESET PUSHED CF FLAG
SETZF       EQU      40H              ; VALUE TO SET PUSHED ZF FLAG
RESETZF     EQU      NOT SETZF        ; VALUE TO RESET PUSHED ZF FLAG

; RESIDENT PORTION

SEGMENT     TSR_CODE 'TSRCODE'

;
; TSR'S INTERRUPT SERVICE ROUTINE
;
; INPUT:   AH = FUNCTION CODE (1, 2, 3, 4, 5)
;          NOTE: SEE INDIVIDUAL FUNCTIONS FOR REGISTER REQUIREMENTS
;          NOTE: USES 00 BYTES OF CALLER'S STACK
;
; OUTPUT:  CF = 0  (NO ERROR)
;          CF = 1  (ERROR: USE FUNCTION 4 TO DETERMINE CAUSE)
;          ZF = 0  (NOT IN PROGRESS)
;          ZF = 1  (IN PROGRESS -- RETRY)
;          NOTE: CF AND ZF ARE MEANINGLESS FOR FUNCTION 4
;
; REGISTERS: CF, ZF, CX, DX (SEE INDIVIDUAL FUNCTIONS FOR DETAILS)
;

PROC        TSR_ISR              FAR
```

```
            ASSUME          CS:TSR_CODE, DS:TSR_DATA
                   STI
                   PUSH     BP
                   MOV      BP,SP
                   PUSH     AX BX CX DX SI DI DS ES
                   MOV      BX,TSR_DATA
                   MOV      DS,BX

CMP      AH,FN_IGETBLOCK
                   JL       TSR_IN1
                   MOV      [MODE_FLG],1                    ; PRIVATE
FUNCTION
                   MOV      [ILASTFUNC],AH                  ; STORE
FUNCTION FOR STATUS
                   JMP      TSR_IN2
TSR_IN1:           MOV      [MODE_FLG],2                    ; PUBLIC
FUNCTION
                   MOV      [PLASTFUNC],AH                  ; STORE
FUNCTION FOR STATUS
; EXECUTE REENTRANT ROUTINES (MAY BE RECURSIVELY)

TSR_IN2:           CMP      AH,FN_SIGNATURE                 ; DO TSR
SIGNATURE FUNCTION
                   JE       GETSIG
                   CMP      AH,FN_STATUS                    ; DO PUBLIC
STATUS FUNCTION
                   JE       STATUS
                   CMP      AH,FN_ISTATUS                   ; DO INTERNAL
STATUS FUNCTION
                   JE       ISTATUS

; CHECK IF TSR IS ALREADY RUNNING
                   AND      SETFLAGS,RESETZF                ; RESET PUSHED ZF TO
0
                   CMP      [INPROGRESS],0                  ; CHECK
INPROGRESS FLAG
                   JE       TSR_INACTIVE                    ; CONTINUE IF FLAG
= 0
;                  OR       SETFLAGS,SETZF                  ; SET PUSHED ZF
TO 1
                   MOV      AX,ERR_TSRBUSY
                   JMP      TSR_ERREXIT
;                  JMP      TSR_QUIT2                       ; QUIT TSR WITHOUT
SETTING
                                                            ; INPROGRESS FLAG

; EXECUTE NON-REENTRANT ROUTINES. THE NEXT INSTRUCTION SHOULD
; BE THE FIRST TO WRITE TO THE TSR'S DATA SEGMENT

TSR_INACTIVE:      INC      [INPROGRESS]                    ;.SET TSR
INPROGRESS FLAG
```

```
                CMP         AH,FN_GETBLOCK              ; DO PUBLIC GETBLOCK FUNCTION
                JE          GETBLOCK
                CMP         AH,FN_GETNEXT               ; DO PUBLIC GETNEXT FUNCTION
                JE          GETNEXT
                CMP         AH,FN_IGETBLOCK             ; DO INTERNAL GETBLOCK FUNCTION
                JE          IGETBLOCK
                CMP         AH,FN_PUTBLOCK              ; DO PUBLIC PUTBLOCK FUNCTION
                JE          PUTBLOCK
                CMP         AH,FN_IPUTBLOCK             ; DO INTERNAL PUTBLOCK FUNCTION
                JE          IPUTBLOCK
                CMP         AH,FN_CLEARBLOCK            ; DO PUBLOCK CLEARBLOCK
                JE          CLEARBLOCK                  ; FUNCTION
                CMP         AH,FN_ICLEARBLOCK           ; DO INTERNAL CLEARBLOCK
                JE          ICLEARBLOCK                 ; FUNCTION
                CMP         AH,FN_IRESET                ; DO PRIVATE COMPLETE RESET
                CALL        FAR IRESET                  ; FUNCTION
                JMP         TSR_EXIT
                MOV         AX,ERR_BADFUNCTION          ; REPORT BAD FUNCTION NUMBER

; ALL ERRORS EXCEPT IN PROGRESS EXIT FROM HERE

TSR_ERREXIT:    PUSH        AX
                MOV         AL,[MODE_FLG]
                CMP         AL,1
                JNE         TSR_ERR1
                POP         AX
                MOV         [IBUFCODE],AX               ; SAVE ERROR CODE - PRIVATE
                JMP         TSR_ERR2
TSR_ERR1:       POP         AX
                MOV         [PBUFCODE],AX               ; SAVE ERROR CODE - PUBLIC
TSR_ERR2:       AND         SETFLAGS,RESETCF            ; SET PUSHED CF BIT TO 0
                JMP         SHORT TSR_QUIT              ; SKIP NEXT SECTION

; ALL NONERRORS EXCEPT STATUS REQUEST EXIT FROM HERE

TSR_EXIT:       PUSH        AX
                MOV         AL,[MODE_FLG]
                CMP         AL,1
                JNE         TSR_EX1
                POP         AX
                MOV         [IBUFCODE],0                ; RESET ERROR
```

```
CODE - PRIVATE
                JMP             TSR_EX2
TSR_EX1:        POP             AX
                MOV             [PBUFCODE],0            ; RESET ERROR
CODE - PUBLIC
TSR_EX2:        AND             SETFLAGS,RESETCF        ; SET PUSHED CF BIT
TO 0
TSR_QUIT:       MOV             [INPROGRESS],0          ; RESET
INPROGRESS FLAG

; STATUS REQUEST, SIGNATURE FUNCTION, AND IN-PROGRESS ERROR EXIT
FROM HERE

TSR_QUIT2:      POP     ES DS DI SI DX CX BX AX BP
                IRET
ENDP            TSR_ISR

;
; THIS IS THE GETBLOCK FUNCTION. IT GETS A BLOCK OF DATA FROM THE
TSR AND
; STORES IT IN THE CALLER'S PBUFFER.  GETBLOCK GETS THE FIRST
OCCURANCE
; OF THE SPECIFIED DATA TYPE IT FINDS.  THIS THEN BECOMES THE
CURRENT
; DATA TYPE FOR OTHER FUNCTIONS UNTIL CHANGED BY ANOTHER FUNCTION.
THE
; REGISTERS TO BE SET AND THEIR MEANINGS ARE:
;
;       INPUT:     AH = 1 (FN_GETBLOCK)
;                  CX = SIZE OF DESTINATION BLOCK (IN BYTES)
;                  DX = DATA TYPE TO GET
;               ES:DI = DESTINATION ADDRESS
;                NOTE:   DESTINATION MUST BE LARGE ENOUGH TO HOLD AT
LEAST CX BYTES.
;                        THERE WILL NEVER BE MORE THAN CX BYTES
TRANSFERRED.  THE
;                        CONTENTS OF THE STORED DATA WILL NOT BE
DISTURBED.
;
;       OUTPUT:    CF = 0 (NO ERROR)
;                  CF = 1 (ERROR: USE FUNCTION 4 TO DETERMINE CAUSE)
;                  CX = NUMBER OF BYTES ACTUALLY TRANSFERRED
;                NOTE:   IF CX = 0, THEN PBUFFER WAS EMPTY, AND NO DATA
WAS
;                        TRANSFERRED TO THE DESTINATION.
;
; REGISTERS:    CX
;
; NOTE: SINCE WE ARE WORKING WITH THE CURRENT DATA TYPE, IT WON'T
CHANGE
;       AS A RESULT OF THIS FUNCTION SO WE DON'T SAVE IT.
;

PROC            GETBLOCK
```

```
; SEARCH THRU PUBLIC TYPE CODES
            PUSH       CX                      ; PRESERVE TRANSFER SIZE
            MOV        BX,0                    ; FOR FIRST NON-ZERO
            MOV        CX,0                    ; BX IS INDEX, CX IS SLOT COUNT
GETBLOCK_1: CMP        [PTYPE+BX],DX           ; CHECK FOR SPECIFIED DATA TYPE
            JE         GETBLOCK_2              ; EXIT LOOP IF MATCHED TYPE
            INC        BX                      ; NEXT SLOT (2 BYTES)
            INC        BX
            INC        CX                      ; INC COUNT
            CMP        CX,NSLOTS               ; IF ALL SLOTS CHECKED
            JE         GETBLOCK_2              ; EXIT
            JMP        GETBLOCK_1              ; ELSE CONTINUE
GETBLOCK_2: CMP        CX,NSLOTS               ; IF NO DATA FOUND, EXIT
            JNE        GETBLOCK_3              ; ELSE, PROCESS
            MOV        AX,0                    ; EXIT WITH 0 BYTES IF NO DATA
            POP        CX                      ; CLEAR STACK
            JMP        GETBLOCK_99
GETBLOCK_3: MOV        [PBUFINDEX],BX          ; CURRENT TRUE INDEX
            MOV        AX,[PSIZE+BX]           ; GET SIZE OF DATA BLOCK
            POP        CX                      ; GET DEST XFER SIZE
            CMP        CX,AX                   ; IS DEST >= BUFFCOUNT ?
            JGE        GETBLOCK_10             ; JUMP IF YES
            MOV        AX,ERR_TOOMUCHDATA      ; NOT ENOUGH ROOM IN TARGET
            JMP        TSR_ERREXIT
;           MOV        CX,AX                   ; ELSE LIMIT CX TO PBUFCOUNT
GETBLOCK_10: PUSH      DX
            CALL       CALCSIZE                ; GET ACTUAL SLOT SIZE
            MOV        [PBUFSSIZE],DX          ; UPDATE SIZE OF CURRENT SLOT
            POP        DX
            MOV        CX,AX                   ; CX EQUAL ACTUAL PBUFCOUNT
            MOV        AX,CX                   ; SAVE TRANSFER COUNT
            JCXZ       GETBLOCK_99             ; EXIT IF CX = 0
            MOV        [PBUFCOUNT],CX          ; SAVE COUNT IF > 0
            MOV        SI,OFFSET PBUFFER       ; DS:SI SOURCE ADDRESS
```

```
                ADD        SI,[POFFSET+BX]              ; START OF
DATA
                CLD                                     ; MOVE IN FORWARD
DIRECTION
                REP        MOVSB                        ; BYTE SIZE
TRANSFER
                MOV        [PBUFTYPE],DX                ; STORE TYPE
                MOV        [PNEXTTYPE],DX
                MOV        [PBUFINDEX],BX
GETBLOCK_99:    MOV        SETCX,AX                     ; SET CX = BYTES
TRANSFERRED
                JMP        TSR_EXIT                     ; NORMAL EXIT - NO
ERRORS
ENDP            GETBLOCK
```

;
; THIS IS THE GETNEXT FUNCTION. IT GETS A BLOCK OF DATA FROM THE TSR AND
; STORES IT IN THE CALLER'S PBUFFER.  GETNEXT GETS THE NEXT OCCURANCE OF
; THE CURRENT DATA TYPE IT FINDS.  THE REGISTERS TO BE SET
; AND THEIR MEANINGS ARE:
;
;      INPUT:    AH = 7 (FN_GETNEXT)
;                CX = SIZE OF DESTINATION BLOCK (IN BYTES)
;             ES:DI = DESTINATION ADDRESS
;              NOTE:  DESTINATION MUST BE LARGE ENOUGH TO HOLD AT LEAST CX BYTES.
;                     THERE WILL NEVER BE MORE THAN CX BYTES TRANSFERRED. THE
;                     CONTENTS OF THE STORED DATA WILL NOT BE DISTURBED.
;
;      OUTPUT:   CF = 0 (NO ERROR)
;                CF = 1 (ERROR: USE FUNCTION 4 TO DETERMINE CAUSE)
;                CX = NUMBER OF BYTES ACTUALLY TRANSFERRED
;              NOTE:  IF CX = 0, THEN PBUFFER WAS EMPTY, AND NO DATA WAS
;                     TRANSFERRED TO THE DESTINATION.
;
; REGISTERS:    CX
;
; NOTE: SINCE WE ARE WORKING WITH THE CURRENT DATA TYPE, IT WON'T CHANGE
;       AS A RESULT OF THIS FUNCTION SO WE DON'T SAVE IT.
;

```
PROC            GETNEXT
; SEARCH THRU PUBLIC TYPE CODES
                PUSH       CX                           ; PRESERVE TRANSFER
SIZE
                MOV        CX,1                         ; BX IS INDEX, CX
```

```
             IS SLOT COUNT
             MOV         BX,[PBUFINDEX]
             INC         BX
             INC         BX                        ; INDEX NEXT SLOT
             MOV         DX,[PNEXTTYPE]            ; SEARCH FOR
CURRENT TYPE
GETNEXT_1:   CMP         [PTYPE+BX],DX             ; CHECK FOR
SPECIFIED DATA TYPE
             JE          GETNEXT_2                 ; EXIT LOOP IF
MATCHED TYPE
             INC         BX                        ; NEXT SLOT (2
BYTES)
             INC         BX
             INC         CX                        ; INC COUNT
             CMP         CX,NSLOTS                 ; IF ALL SLOTS
CHECKED
             JE          GETNEXT_2                 ; EXIT
             JMP         GETNEXT_1                 ; ELSE CONTINUE
GETNEXT_2:   CMP         CX,NSLOTS                 ; IF NO DATA
FOUND, EXIT
             JNE         GETNEXT_3                 ; ELSE, PROCESS
             MOV         AX,0                      ; EXIT WITH 0
BYTES IF NO DATA
             POP         CX                        ; CLEAR STACK
             JMP         GETNEXT_99
GETNEXT_3:   MOV         [PBUFINDEX],BX            ; CURRENT
TRUE INDEX
             MOV         AX,[PSIZE+BX]             ; GET SIZE OF
DATA BLOCK
             POP         CX                        ; GET DEST XFER SIZE
             CMP         CX,AX                     ; IS DEST >=
BUFFCOUNT ?
             JGE         GETNEXT_10                ; JUMP IF YES
             MOV         AX,ERR_TOOMUCHDATA        ; NOT ENOUGH ROOM
IN TARGET
             JMP         TSR_ERREXIT
;            MOV         CX,AX                     ; ELSE LIMIT CX
TO PBUFCOUNT
GETNEXT_10:  PUSH        DX
             CALL        CALCSIZE                  ; GET ACTUAL SLOT
SIZE
             MOV         [PBUFSSIZE],DX            ; UPDATE SIZE
OF CURRENT SLOT
             POP         DX
             MOV         CX,AX                     ; CX EQUAL ACTUAL
PBUFCOUNT
;            MOV         AX,CX                     ; SAVE TRANSFER
COUNT
             JCXZ        GETNEXT_99                ; EXIT IF CX = 0
             MOV         [PBUFCOUNT],CX            ; SAVE COUNT IF
> 0
             MOV         SI,OFFSET PBUFFER         ; DS:SI SOURCE
ADDRESS
             ADD         SI,[POFFSET+BX]           ; START OF
```

```
DATA
                CLD                                  ; MOVE IN FORWARD
DIRECTION
                REP     MOVSB                        ; BYTE SIZE
TRANSFER
                MOV     [PBUFTYPE],DX                ; STORE TYPE
                MOV     [PNEXTTYPE],DX
                MOV     [PBUFINDEX],BX
GETNEXT_99:     MOV     SETCX,AX                     ; SET CX = BYTES
TRANSFERRED
                JMP     TSR_EXIT                     ; NORMAL EXIT - NO
ERRORS
ENDP            GETNEXT

;
; THIS IS THE PUTBLOCK FUNCTION. IT PUTS A BLOCK OF DATA FROM THE
CALLER'S
; PBUFFER AND PUTS IT IN THE TSR'S PBUFFER. PUTBLOCK SEARCHES FOR
THE
; FIRST NON-ZERO DATA TYPE SLOT LARGE ENOUGH TO FIT THE DATA BLOCK.
IF THE
; NEXT SLOT IS OPEN (TYPE ZERO) AND ITS OFFSET IS PBUFSIZE, ITS
OFFSET IS
; SET TO THE CURRENT SLOTS OFFSET PLUS SIZE.
;
; THE REGISTERS TO BE SET AND THEIR MEANINGS ARE:
;
;     INPUT:    AH = 2 (FN_PUTBLOCK)
;               CX = NUMBER OF BYTES TO TRANSFER
;               DX = DATA TYPE CODE (0 = UNTYPED - EMPTY SLOT)
;            DS:SI = SOURCE ADDRESS
;             NOTE:   VALUE IN CX MUST BE <= PBUFFER SIZE. IF CX =
0, THE
;                     PBUFFER IS ERASED.
;
;     OUTPUT:   CF = 0 (NO ERROR)
;               CX = NUMBER OF BYTES ACTUALLY SAVED
;
; REGISTERS:    CX
;

PROC            PUTBLOCK
; SEARCH THRU PUBLIC TYPE CODES
                PUSH    DX                           ; SAVE DATA TYPE
CODE
                MOV     BX,0                         ; FOR FIRST
NON-ZERO
                MOV     AX,0                         ; BX IS INDEX, AX
IS SLOT COUNT
PUTBLOCK_1:     CMP     [PTYPE+BX],0                 ; CHECK FOR
0 DATA TYPE
                JNE     PUTBLOCK_1A                  ; CONTINUE IF
NON-ZERO
```

```
                CALL        CALCSIZE            ; GET ACTUAL SLOT
SIZE
                CMP         CX,DX               ; CHECK FOR SLOT
SIZE
                JLE         PUTBLOCK_2          ; IF ITS A FIT, USE
IT
PUTBLOCK_1A:    INC         BX                  ; NEXT SLOT (2
BYTES)
                INC         BX
                INC         AX                  ; INC COUNT
                CMP         AX,NSLOTS           ; IF ALL SLOTS
CHECKED
                JE          PUTBLOCK_2          ; EXIT
                JMP         PUTBLOCK_1          ; ELSE CONTINUE
PUTBLOCK_2:     CMP         AX,NSLOTS           ; IF NO DATA
SLOT FIT FOUND,
                JL          PUTBLOCK_3          ; EXIT ELSE PROCESS
                POP         DX                  ; RESTORE STACK
                MOV         CX,0                ; EXIT WITH 0
BYTES IF NO
                MOV         AX,ERR_TOOMUCHDATA  ; NOT ENOUGH ROOM
IN TARGET
                JMP         TSR_ERREXIT
;               MOV         [PBUFSSIZE],DX      ; STORE ACTUAL
SLOT SIZE
;               POP         DX                  ; RESTORE DX ON
ERROR
;               MOV         CX,0                ; EXIT WITH 0
BYTES IF NO
;               JMP         PUTBLOCK_99         ; DATA STORED
PUTBLOCK_3:     MOV         [PBUFSSIZE],DX      ; STORE
ACTUAL SLOT SIZE
                POP         DX                  ; RESTORE TYPE CODE
;
; NORMAL STORAGE OCCURS HERE -- BX CONTAINS INDEX TO SLOT, CX
CONTAINS
; THE COUNT, AND DX CONTAINS THE DATA TYPE
;
                MOV         [PTYPE+BX],DX       ; SAVE DATA TYPE
CODE
PUTBLOCK_10:    MOV         AX,[POFFSET+BX]     ; GET
SLOT OFFSET
                PUSH        DS                  ; SET ES TO TSR'S
DATA SEG
                POP         ES
                MOV         DI,OFFSET PBUFFER   ; ES:DI =
DESTINATION
                ADD         DI,AX               ; ADD OFFSET TO
OUR SLOT
                MOV         [PSIZE+BX],CX       ; SAVE DATA SIZE
COUNT
                MOV         SETCX,CX            ; SAVE COUNT IN STACK
                MOV         [PBUFCOUNT],CX      ; SAVE COUNT IF
```

```
                                                            > 0
                MOV     AX,SETDS            ; GET SAVED DS FROM STACK
                MOV     DS,AX               ; DS:SI = SOURCE ADDRESS
                JCXZ    PUTBLOCK_99         ; EXIT IF COUNT = 0
                CLD                         ; MOVE IN FORWARD DIRECTION
                REP     MOVSB               ; BYTE TRANSFERS
PUTBLOCK_99:    PUSH    ES                  ; RESTORE TSR'S DATA SEGMENT
                POP     DS                  ; FROM ES TO DS
                MOV     [PBUFTYPE],DX       ; SAVE CURRENT TYPE AND INDEX
                MOV     [PNEXTTYPE],DX
                MOV     [PBUFINDEX],BX      ; IF SUCCESSFUL
                MOV     AX,BX               ; IF NEXT SLOT HAS NOT BEEN
                INC     AX                  ; USED, UPDATE ITS OFFSET
                INC     AX

;
; CHECK FOR LAST HERE. IF LAST SLOT, WRAPAROUND [NEXTSLOT].
;
                CMP     AX,NDEX             ; LAST SLOT?
                JGE     PUTBLOCK_99A        ; YES, EXIT
                MOV     [NEXTSLOT],AX       ; INDEX FOR NEXT SLOT
                PUSH    BX
                MOV     BX,[NEXTSLOT]
                MOV     AX,[PTYPE+BX]
                POP     BX
                CMP     AX,0                ; IS SLOT IN USE?
                JNE     PUTBLOCK_99A        ; NO, EXIT
                MOV     AX,[POFFSET+BX]     ; NEXT OFFSET IS CURRENT
                ADD     AX,[PSIZE+BX]       ; PLUS ITS SIZE
                CMP     AX,BUF_SIZE         ; IF NEXT OFFSET IS AT END OF
                JGE     PUTBLOCK_99A        ; BUFFER, THEN EXIT
                PUSH    BX
                MOV     BX,[NEXTSLOT]
                MOV     [POFFSET+BX],AX     ; STORE NEW OFFSET
                POP     BX
PUTBLOCK_99A:   JMP     TSR_EXIT            ; NORMAL EXIT - NO ERRORS
                ENDP    PUTBLOCK

;
```

```
; THIS IS THE CLEARBLOCK FUNCTION. IT CLEARS THE DATA STORED IN THE
CURRENT
; PBUFFER SLOT.  IF THE CLEARED SLOT WAS THE LAST ACTIVE SLOT IN
THE ARRAY,
; THEN SET ITS OFFSET BACK TO MAX BUF SIZE.
;
; CLEARBLOCK WILL ALSO COMPACT THE BUFFER BY MOVING THE FILLED
SLOTS
; BACK DOWN OVER THE EMPTY, REMOVING IT FROM THE ARRAY.  THE
VARIABLES
; WILL THEN BE UPDATED.
;
; THE REGISTERS TO BE SET AND THEIR MEANINGS ARE:
;
;     INPUT:     AH = 3 (FN_CLEARBLOCK)
;     OUTPUT:    CF = 0 (NO ERROR)
;
; REGISTERS:    NONE
;

PROC            CLEARBLOCK
                PUSH       ES
                PUSH       DI
                PUSH       SI

;
; THERE ARE THREE POSSIBLE SCENARIOS:
;
;   CLEAR FIRST SLOT:
;
;     1. ZERO SLOT DATA
;     2. SET OFFSET TO NEXT SLOT TO 1024
;     3. SET SLOT TYPE TO 0
;     4. SET SLOT SIZE TO 0
;
;   CLEAR LAST SLOT:
;
;     1. ZERO SLOT DATA
;     2. (IF LAST SLOT -- BUT NOT SLOT 31)
;        SET OFFSET TO NEXT SLOT TO 1024
;     3. SET SLOT TYPE TO 0
;     4. SET SLOT SIZE TO 0
;
;   CLEAR MIDDLE SLOT:    (NOTE THAT THE FIRST SLOT IS TREATED AS A
;                          MIDDLE SLOT IF THERE IS A DATA SLOT
;                          FOLLOWING IT).
;
;     1. MOVE ALL FOLLOWING SLOTS RIGHT TO LEFT, WRITING OVER SLOT
TO DELETE:
;          LOOP FROM NEXT SLOT TO LAST SLOT --
;            - COPY NEXT SLOT CONTENTS TO THIS SLOT
;            - COPY NEXT SLOT TYPE TO THIS SLOT TYPE
;            - COPY NEXT SLOT SIZE TO THIS SLOT SIZE
;            - CALCULATE NEW NEXT SLOT OFFSET AND SET IT
```

```
;       EXAMPLE OF THIS:
;
;       BEFORE REMOVING SLOT 2:
;
;       SLOT    1   2   3   4   5    6   ...
;       TYPE    1   2   3   4   0    0
;       SIZE    10  20  30  40  0    0
;       OFFSET  0   10  30  60  100  1024
;
;
;       AFTER REMOVING SLOT 2:
;
;       SLOT    1   2   3   4    5    6   ...
;       TYPE    1   3   4   0    0    0
;       SIZE    10  30  40  0    0    0
;       OFFSET  0   10  60  100  1024 1024
;
;     2. LAST OPEN SLOT OFFSET IS NOW START OF OPEN AREA TO ZERO
FILL.
;        TREAT IT AS CLEARING LAST SLOT.
;
;
; THE ACTUAL CODE LOGIC WILL BE THIS:
;
;   1. IF MIDDLE SLOT, DO THE SLOT MOVES SO THAT THE SLOT TO BE
;      CLEARED IS AT THE END.  A MIDDLE SLOT HAS VALID SLOTS
;      BEFORE AND AFTER IT.
;
;   2. CLEAR THE LAST SLOT.  IT IS POSSIBLE FOR THE LAST SLOT TO
;      BE ONE OF THREE POSSIBILITIES:
;
;       - THE FIRST AND LAST (ONLY) SLOT
;       - THE LAST OF MORE THAN ONE SLOT BUT LESS THAN 32 SLOTS
;       - THE LAST OF MORE THAN ONE SLOTS AS SLOT 32
;
;
; THE VARIABLES USED HERE ARE:
;
;   [IBUFINDEX] = CURRENT SLOT TO BE DELETED
;   [NEXTSLOT]  = TEMP HOLDER FOR SOURCE SLOT WHEN DOING COPY
;   [PREVSLOT]  = TEMP HOLDER FOR DESTINATION SLOT WHEN DOING COPY
;   [ISIZE]     = SIZE IN BYTES OF SLOT
;   [IOFFSET]   = OFFSET FROM BEGINNING OF BUFFER TO BEGINNING OF
SLOT
;   [ITYPE]     = TYPE OF DATA IN SLOT (0 = EMPTY)
;   [IBUFFER]   = COMPLETE BUFFER
;
CLEARBLK_1:  MOV      BX,[PBUFINDEX]           ; CURRENT SLOT
             MOV      [PREVSLOT],BX            ; ZEROING
ROUTINE COUNTS ON
                                               ; THIS
             MOV      AX,[PSIZE+BX]            ; STORE SLOT
```

SIZE FOR LATER
                MOV     [TSIZE],AX                      ; REFERENCE

;
; DETERMINE IF THE SLOT IS A MIDDLE SLOT (DOES IT HAVE VALID SLOTS
; BEFORE AND AFTER IT).
;
                CMP     BX,0            ; FIRST SLOT?
                JNE     CLEARBLK_1A     ; NO

MOV     AX,[PTYPE+BX+2] ; ONLY SLOT?
                CMP     AX,0
                JE      CLEARBLK_20     ; YES
                JMP     CLEARBLK_1B     ; HANDLE AS "MIDDLE SLOT"

CLEARBLK_1A:    MOV     AX,NDEX         ; LAST SLOT (32) ?
                SUB     AX,2            ; SINCE WE START AT 0,
                                        ; LAST SLOT INDEX IS ACTUALLY
                                        ; (NSLOTS - 1) * 2
                CMP     BX,AX           ; LAST SLOT?
                JGE     CLEARBLK_20     ; YES

;
; SLOT IS NOT THE FIRST OR LAST (32).  IS IT LAST < 32 OR MIDDLE SLOT?
;

CLEARBLK_1B:    INC     BX              ; LOOK AT NEXT SLOT TYPE
                INC     BX
                MOV     AX,[PTYPE+BX]
                DEC     BX              ; RESTORE BX TO CURRENT SLOT
                DEC     BX
                CMP     AX,0            ; IS NEXT SLOT EMPTY?
                JE      CLEARBLK_20     ; YES, LAST SLOT < 32
;
; WE NOW KNOW THE SLOT IS A MIDDLE SLOT: IT IS NOT FIRST OR LAST.
; NEXT STEP IS TO PERFORM THE RIGHT TO LEFT SHIFT OF THE FOLLOWING
; SLOTS TO REMOVE THE CURRENT SLOT, MAKING FREE SPACE AS AN END SLOT
; TO BE ZEROED.
;
; THIS IS A COPY OF THE COMMENTS FROM THE MAIN COMMENT AREA FOR THIS
; CODE - JUST TO MAKE THE OPERATION CLEAR.
;
;   CLEAR MIDDLE SLOT:
;
;     1. MOVE ALL FOLLOWING SLOTS RIGHT TO LEFT, WRITING OVER SLOT
; TO DELETE:
;           LOOP FROM NEXT SLOT TO LAST SLOT --
;             - COPY NEXT SLOT CONTENTS TO THIS SLOT
;             - COPY NEXT SLOT TYPE TO THIS SLOT TYPE
```

```
;       - COPY NEXT SLOT SIZE TO THIS SLOT SIZE
;       - CALCULATE NEW NEXT SLOT OFFSET AND SET IT
;
;       EXAMPLE OF THIS:
;
;       BEFORE REMOVING SLOT 2:
;
;       SLOT    1   2   3   4   5    6   ...
;       TYPE    1   2   3   4   0    0
;       SIZE    10  20  30  40  0    0
;       OFFSET  0   10  30  60  100  1024
;
;
;       AFTER REMOVING SLOT 2:
;
;       SLOT    1   2   3   4    5    6   ...
;       TYPE    1   3   4   0    0    0
;       SIZE    10  30  40  0    0    0
;       OFFSET  0   10  60  100  1024 1024
;

MOV     AX,0                 ; ZERO LASTSLOT
FLAG
              MOV     [LASTSLOT],AX
              MOV     BX,[PBUFINDEX]       ; CURRENT SLOT
              MOV     AX,[PSIZE+BX]
              MOV     [TSIZE],AX           ; STORE ORIGINAL
SLOT SIZE
                                           ; FOR FINAL ZEROING

CLEARBLK_10:  MOV     [PREVSLOT],BX        ; DESTINATION SLOT
              INC     BX
              INC     BX
              MOV     [NEXTSLOT],BX

;
; CHECK IF THIS IS LAST SLOT (32)
;

MOV     AX,NDEX
              SUB     AX,2                 ; SINCE WE START AT 0,
                                           ; LAST   SLOT   INDEX   IS
ACTUALLY
                                           ; (NSLOTS - 1) * 2
              CMP     BX,AX                ; LAST SLOT?
              JL      CLEARBLK_11          ; NO, CONTINUE
              MOV     AX,1                 ; SET LAST SLOT FLAG
              MOV     [LASTSLOT],AX
;
; CHECK TO SEE IF NEXT SLOT IS ACTIVE (NON-ZERO DATA TYPE).
;
CLEARBLK_11:
```

```
                MOV     AX,[PTYPE+BX]           ; NOT LAST SLOT...
                CMP     AX,0                    ; NEXT SLOT EMPTY?
                JE      CLEARBLK_20             ; YES, WE ARE DONE

;
; DO SLOT MOVE FROM RIGHT TO LEFT HERE
;
;               MOV     BX,[PBUFINDEX]          ; CURRENT SLOT
;               MOV     [PREVSLOT],BX           ; CURRENT SLOT
                PUSH    DS                      ; SET ES TO OUR DS
                POP     ES
                MOV     BX,[PREVSLOT]
                MOV     DI,OFFSET PBUFFER       ; SET UP
ES:DI,DS:SI FOR MOVE
                ADD     DI,[POFFSET+BX]         ; SLOT OFFSET
                MOV     BX,[NEXTSLOT]
                MOV     SI,OFFSET PBUFFER
                ADD     SI,[POFFSET+BX]
                MOV     CX,[PSIZE+BX]           ; MOVE BYTE
COUNT
                CLD
                REP     MOVSB

;
; MOVE IS DONE, NOW UPDATE THE VARIABLES.
;
                MOV     BX,[PREVSLOT]           ; UPDATE SLOT SIZE
                MOV     AX,[PSIZE+BX+2]
                MOV     [PSIZE+BX],AX

ADD     AX,[POFFSET+BX]         ; UPDATE START OF
NEXT SLOT
                MOV     [POFFSET+BX+2],AX

MOV     AX,[PTYPE+BX+2]         ; UPDATE SLOT DATA
TYPE
                MOV     [PTYPE+BX],AX

MOV     AX,[LASTSLOT]           ; IF NOT LASTSLOT,
                CMP     AX,0                    ; CONTINUE MOVE
                JNE     CLEARBLK_20
                INC     BX                      ; NEXT SET OF SLOTS
                INC     BX
                JMP     CLEARBLK_10

;
; THIS IS WHERE WE ZERO THE SLOT AND RESET THE APPROPRIATE
VARIABLES.
; AT THIS POINT, THE SLOT TO BE ZEROED IS ALWAYS THE LAST SLOT (BUT
```

```
; NOT NECESSARILY SLOT 32).
;
;
; AT THIS POINT, BX DOES NOT CONTAIN OFFSET TO SLOT WE NEED TO
ZERO.
; SIZE IS CONTAINED IN THE [TSIZE] VARIABLE.
;

CLEARBLK_20:
                MOV     BX,[PREVSLOT]
                MOV     [PTYPE+BX],0            ; OPEN SLOT NOW
                MOV     CX,[TSIZE]              ; GET CURRENT
BUFSIZE
                MOV     [PSIZE+BX],0            ; NO DATA IN IT
                MOV     AL,0
                MOV     DI,OFFSET PBUFFER       ; ES:DI =
DESTINATION
                ADD     DI,[POFFSET+BX]         ; GET TO OUR
SLOT
                PUSH    DS                      ; SET ES TO TSR'S
DATA SEG
                POP     ES
                CLD
                REP     STOSB                   ; ZERO THE SLOT
                POP     SI
                POP     DI
                POP     ES

;
; NOW UPDATE THE OFFSET VARIABLE IF THIS IS THE LAST SLOT.
;
                MOV     AX,NDEX
                SUB     AX,2                    ; SINCE WE START
AT 0,
                                                ; LAST SLOT INDEX IS
ACTUALLY
                                                ; (NSLOTS - 1) * 2
                CMP     BX,AX                   ; LAST SLOT?
                JGE     CLEARBLK_99             ; YES
                MOV     AX,1024                 ; NO, SET NEXT SLOT'S
OFFSET TO MAX
                MOV     [POFFSET+BX+2],AX

;
; SINCE WE ARE AT THE LAST SLOT IN THE ARRAY, SET THE GLOBAL
VARIABLES TO
; ACCESS THE FIRST SLOT, EMPTY OR NOT.
;

CLEARBLK_99:    MOV     BX,0
```

- 17 -

```
                MOV     [PBUFINDEX],0
                MOV     AX,[PSIZE+BX]
                MOV     [PBUFCOUNT],AX
                MOV     AX,[PTYPE+BX]
                MOV     [PBUFTYPE],AX
                MOV     [PNEXTTYPE],AX          ; THIS IS FOR GETNEXT SEARCH
                CALL    CALCSIZE                ; GET ACTUAL SLOT SIZE
                MOV     [PBUFSSIZE],DX          ; UPDATE SIZE OF CURRENT SLOT
                JMP     TSR_EXIT                ; NORMAL EXIT - NO ERRORS
ENDP            CLEARBLOCK
```

;
; THIS IS THE GET STATUS FUNCTION. IT RETRIEVES THE STATUS INFORMATION
; FROM THE PREVIOUS OPERATION (ERROR CODE, DATA TYPE CODE, NUMBER OF BYTES
; STORED IN THE PBUFFER). THE REGISTERS TO BE SET AND THEIR MEANINGS ARE:
;
;     INPUT:    AH = 4 (FN_STATUS)
;           NOTE:   THIS ROUTINE DOES NOT WRITE TO THE TSR'S DATA SEGMENT.
;                   THEREFORE, IT CAN BE CALLED RECURSIVELY (THIS ROUTINE
;                   IS REENTRANT).
;
;     OUTPUT:   AX = ERROR CODE FROM PREVIOUS OPERATION
;               DX = DATA TYPE CODE FOR CURRENT SLOT
;               CX = NUMBER OF BYTES STORED IN CURRENT SLOT
;               BX = FUNCTION OF LAST OPERATION
;
; REGISTERS:    CX,DX
;

```
PROC            STATUS
                MOV     AX,[PBUFCOUNT]          ; GET COUNT OF BYTES IN CURRENT
                                                ; SLOT
                MOV     SETCX,AX                ; STUFF INTO PUSHED CX ON LOCAL
                                                ; STACK
                MOV     AX,[PBUFTYPE]           ; GET CURRENT SLOT DATA TYPE
                MOV     SETDX,AX                ; STUFF INTO PUSHED DX ON LOCAL
                                                ; STACK
                                                ; STACK
                MOV     AX,[PBUFCODE]           ; GET CURRENT SLOT ERROR CODE
```

```
                MOV         SETAX,AX              ; STUFF INTO PUSHED
AX ON LOCAL
                                                  ; STACK

MOV         BX,[PBUFINDEX]        ; CURRENT INDEX
                XOR         AX,AX                 ; ZERO AX
                MOV         AL,[PLASTFUNC]        ; FUNCTION CODE
FOR LAST OP
                MOV         SETBX,AX              ; STUFF INTO PUSHED
BX ON LOCAL
                                                  ; STACK
                JMP         TSR_EXIT              ; EXIT AND CLEAR
STATUS
ENDP            STATUS
```

;
; THIS PROCEDURE CALCULATES THE ACTUAL SIZE OF THE SPECIFIED SLOT. IT IS
; ONLY CALLED INTERNALLY.  IT WORKS AS FOLLOWS:
;
;    LOOK AT NEXT OFFSET IN TABLE.  IF THIS IS THE LAST SLOT IN THE ARRAY,
;    THEN SUBTRACT THE SIZE OF THE BUFFER FROM THE BUFFER.
;
;    SUBTRACT THE CURRENT OFFSET (LOWER LIMIT) FROM THE UPPER LIMIT AND STUFF
;    THE VALUE IN THE DX REGISTER.
;
; ALL REGISTERS USED ARE SAVED AND RESTORED, SO NO EFFECT ON CALLER EXCEPT
; FOR RETURNED VALUE IN DX.
;
;    INPUT:    BX = SLOT TO CALCULATE
;
;    OUTPUT:   DX = ACTUAL SIZE IN BYTES OF SLOT
;

```
PROC            CALCSIZE
                PUSH        AX
                MOV         DX,NSLOTS
                DEC         DX
                MOV         AX,2
                MUL         DX
                CMP         BX,AX                 ; END OF SLOTS?
                JNE         SIZE_1                ; NO, CONTINUE
                MOV         DX,BUF_SIZE           ; YES, SUBTRACT
FROM END OF
                JMP         SIZE_2                ; BUFFER
SIZE_1:         MOV         DX,[POFFSET+BX+2]     ; LOOK AT
NEXT SLOT OFFSET
```

;
; DX NOW CONTAINS THE LARGER OF THE OFFSETS

```
;
SIZE_2:              SUB       DX,[POFFSET+BX]              ;
SUBTRACT CURRENT OFFSET
                                             ; RESULT IS IN DX
              POP       AX
              RET
ENDP          CALCSIZE

;
; THIS IS THE GET SIGNATURE FUNCTION. IT RETRIEVES THE TSR
SIGNATURE
; WHICH INDICATES TO THE CALLER THAT THE TSR IS ACTUALLY INSTALLED
AND WORKING.
; THE REGISTERS TO BE SET AND THEIR MEANINGS ARE:
;
;     INPUT:    AH = 5 (FN_SIGNATURE)
;         NOTE:   THIS ROUTINE DOES NOT WRITE TO THE TSR'S DATA
SEGMENT.
;                 THEREFORE, IT CAN BE CALLED RECURSIVELY (THIS
ROUTINE
;                 IS REENTRANT).
;
;     OUTPUT:   DH = TSR MAJOR VERSION NUMBER
;               DL = TSR MINOR VERSION NUMBER
;                 EXAMPLE: VERSION 1.2 -- DH = 1 AND DL = 2
;               CX = TSR SIGNATURE = 6996
;               BX = SIZE OF INTERNAL BUFFER
;
; REGISTERS:    CX,DX,BX
;

PROC          GETSIG
              MOV       AX,SIGNATURE                 ; SIGNATURE OF
TSR
              MOV       SETCX,AX          ,          ; STUFF INTO PUSHED
CX ON LOCAL
                                             ; STACK
              MOV       AH,MAJ_VERSION               ; GET TSR
VERSION
              MOV       AL,MIN_VERSION
              MOV       SETDX,AX                     ; STUFF INTO PUSHED
DX ON LOCAL
                                             ; STACK
              MOV       AX,BUF_SIZE                  ; TELL USER HOW
BIG OUR BUFFER
                                             ; IS
              MOV       SETBX,AX
              JMP       TSR_QUIT2                    ; ALTERNATE EXIT
ENDP          GETSIG

;
;***************************************************************
***
```

- 20 -

; FROM THIS POINT ON, THE ROUTINES ARE FOR THE INTERNAL INTER PROGRAM
; USE: NSCTOOL, NSCMENU, ETC. AND NOT FOR PUBLIC CONSUMPTION.
;
;***************************************************************

;
; THIS IS THE GETBLOCK FUNCTION. IT GETS A BLOCK OF DATA FROM THE TSR AND
; STORES IT IN THE CALLER'S PBUFFER. GETBLOCK GETS THE FIRST OCCURANCE
; OF THE SPECIFIED DATA TYPE IT FINDS. THIS THEN BECOMES THE CURRENT
; DATA TYPE FOR OTHER FUNCTIONS UNTIL CHANGED BY ANOTHER FUNCTION. THE
; REGISTERS TO BE SET AND THEIR MEANINGS ARE:
;
;     INPUT:    AH = 101 (FN_IGETBLOCK)
;               CX = SIZE OF DESTINATION BLOCK (IN BYTES)
;               DX = DATA TYPE TO GET
;               ES:DI = DESTINATION ADDRESS
;               NOTE:   DESTINATION MUST BE LARGE ENOUGH TO HOLD AT LEAST CX BYTES.
;                       THERE WILL NEVER BE MORE THAN CX BYTES TRANSFERRED. THE
;                       CONTENTS OF THE STORED DATA WILL NOT BE DISTURBED.
;
;     OUTPUT:   CF = 0 (NO ERROR)
;               CF = 1 (ERROR: USE FUNCTION 4 TO DETERMINE CAUSE)
;               CX = NUMBER OF BYTES ACTUALLY TRANSFERRED
;               NOTE:   IF CX = 0, THEN PBUFFER WAS EMPTY, AND NO DATA WAS
;                       TRANSFERRED TO THE DESTINATION.
;
; REGISTERS:    CX
;
; NOTE: SINCE WE ARE WORKING WITH THE CURRENT DATA TYPE, IT WON'T CHANGE
;       AS A RESULT OF THIS FUNCTION SO WE DON'T SAVE IT.
;

PROC            IGETBLOCK
; SEARCH THRU PUBLIC TYPE CODES
                PUSH       CX                    ; PRESERVE TRANSFER SIZE
                MOV        BX,0                  ; FOR FIRST NON-ZERO
                MOV        CX,0                  ; BX IS INDEX, CX IS SLOT COUNT
IGETBLOCK_1:    CMP        [ITYPE+BX],DX         ; CHECK FOR SPECIFIED DATA TYPE

```
                JE      IGETBLOCK_2             ; EXIT LOOP IF MATCHED TYPE
                INC     BX                      ; NEXT SLOT (2 BYTES)
                INC     BX
                INC     CX                      ; INC COUNT
                CMP     CX,NSLOTS               ; IF ALL SLOTS CHECKED
                JE      IGETBLOCK_2             ; EXIT
                JMP     IGETBLOCK_1             ; ELSE CONTINUE
IGETBLOCK_2:    CMP     CX,NSLOTS               ; IF NO DATA FOUND, EXIT
                JNE     IGETBLOCK_3             ; ELSE, PROCESS
                MOV     AX,0                    ; EXIT WITH 0 BYTES IF NO DATA
                POP     CX                      ; CLEAR STACK
                JMP     IGETBLOCK_99
IGETBLOCK_3:    MOV     [IBUFINDEX],BX          ; CURRENT TRUE INDEX
                MOV     AX,[ISIZE+BX]           ; GET SIZE OF DATA BLOCK
                POP     CX                      ; GET DEST XFER SIZE
                CMP     CX,AX                   ; IS DEST >= BUFFCOUNT ?
                JGE     IGETBLOCK_10            ; JUMP IF YES
                MOV     AX,ERR_TOOMUCHDATA      ; NOT ENOUGH ROOM IN TARGET
                JMP     TSR_ERREXIT
                MOV     CX,AX                   ; ELSE LIMIT CX TO PBUFCOUNT
IGETBLOCK_10:   PUSH    DX
                CALL    ICALCSIZE               ; GET ACTUAL SLOT SIZE OF CURRENT SLOT
                MOV     [IBUFSSIZE],DX          ; UPDATE SIZE
                POP     DX
                MOV     CX,AX                   ; CX EQUAL ACTUAL PBUFCOUNT
                MOV     AX,CX                   ; SAVE TRANSFER COUNT
                JCXZ    IGETBLOCK_99            ; EXIT IF CX = 0
                MOV     [IBUFCOUNT],CX          ; SAVE COUNT IF > 0
                MOV     SI,OFFSET IBUFFER       ; DS:SI SOURCE ADDRESS
                ADD     SI,[IOFFSET+BX]         ; START OF DATA
                CLD                             ; MOVE IN FORWARD DIRECTION
                REP     MOVSB                   ; BYTE SIZE TRANSFER
                MOV     [IBUFTYPE],DX           ; STORE TYPE
                MOV     [INEXTTYPE],DX
```

- 22 -

```
                MOV         [IBUFINDEX],BX
IGETBLOCK_99:   MOV         SETCX,AX              ; SET CX =
BYTES TRANSFERRED
                JMP         TSR_EXIT              ; NORMAL EXIT - NO
ERRORS
ENDP            IGETBLOCK

;
; THIS IS THE GETNEXT FUNCTION. IT GETS A BLOCK OF DATA FROM THE
TSR AND
; STORES IT IN THE CALLER'S PBUFFER.  GETNEXT GETS THE NEXT
OCCURANCE OF
; THE CURRENT DATA TYPE IT FINDS.  THE REGISTERS TO BE SET
; AND THEIR MEANINGS ARE:
;
;       INPUT:    AH = 107 (FN_IGETNEXT)
;                 CX = SIZE OF DESTINATION BLOCK (IN BYTES)
;              ES:DI = DESTINATION ADDRESS
;                NOTE:   DESTINATION MUST BE LARGE ENOUGH TO HOLD AT
LEAST CX BYTES.
;                        THERE WILL NEVER BE MORE THAN CX BYTES
TRANSFERRED.  THE
;                        CONTENTS OF THE STORED DATA WILL NOT BE
DISTURBED.
;
;       OUTPUT:   CF = 0 (NO ERROR)
;                 CF = 1 (ERROR: USE FUNCTION 4 TO DETERMINE CAUSE)
;                 CX = NUMBER OF BYTES ACTUALLY TRANSFERRED
;              NOTE:   IF CX = 0, THEN PBUFFER WAS EMPTY, AND NO DATA
WAS
;                      TRANSFERRED TO THE DESTINATION.
;
; REGISTERS:    CX
;
; NOTE: SINCE WE ARE WORKING WITH THE CURRENT DATA TYPE, IT WON'T
CHANGE
;       AS A RESULT OF THIS FUNCTION SO WE DON'T SAVE IT.
;

PROC            IGETNEXT
; SEARCH THRU PUBLIC TYPE CODES
                PUSH        CX                    ; PRESERVE TRANSFER
SIZE
                MOV         CX,1                  ; BX IS INDEX, CX
IS SLOT COUNT
                MOV         BX,[IBUFINDEX]
                INC         BX
                INC         BX                    ; INDEX NEXT SLOT
                MOV         DX,[INEXTTYPE]        ; SEARCH FOR
CURRENT TYPE
IGETNEXT_1:     CMP         [ITYPE+BX],DX         ; CHECK FOR
SPECIFIED DATA TYPE
```

```
             JE        IGETNEXT_2              ; EXIT LOOP IF
MATCHED TYPE
             INC       BX                      ; NEXT SLOT (2
BYTES)
             INC       BX
             INC       CX                      ; INC COUNT
             CMP       CX,NSLOTS               ; IF ALL SLOTS
CHECKED
             JE        IGETNEXT_2              ; EXIT
             JMP       IGETNEXT_1              ; ELSE CONTINUE
IGETNEXT_2:  CMP       CX,NSLOTS               ; IF NO DATA
FOUND, EXIT
             JNE       IGETNEXT_3              ; ELSE, PROCESS
             MOV       AX,0                    ; EXIT WITH 0
BYTES IF NO DATA
             POP       CX                      ; CLEAR STACK
             JMP       IGETNEXT_99
IGETNEXT_3:  MOV       [IBUFINDEX],BX          ; CURRENT
TRUE INDEX
             MOV       AX,[ISIZE+BX]           ; GET SIZE OF
DATA BLOCK
             POP       CX                      ; GET DEST XFER SIZE
             CMP       CX,AX                   ; IS DEST >=
BUFFCOUNT ?
             JGE       IGETNEXT_10             ; JUMP IF YES
             MOV       AX,ERR_TOOMUCHDATA      ; NOT ENOUGH ROOM
IN TARGET
             JMP       TSR_ERREXIT
;            MOV       CX,AX                   ; ELSE LIMIT CX
TO PBUFCOUNT
IGETNEXT_10: PUSH      DX
             CALL      ICALCSIZE               ; GET ACTUAL SLOT
SIZE
             MOV       [IBUFSSIZE],DX          ; UPDATE SIZE
OF CURRENT SLOT
             POP       DX
             MOV       CX,AX                   ; CX EQUAL ACTUAL
PBUFCOUNT
;            MOV       AX,CX                   ; SAVE TRANSFER
COUNT
             JCXZ      IGETNEXT_99             ; EXIT IF CX = 0
             MOV       [IBUFCOUNT],CX          ; SAVE COUNT IF
> 0
             MOV       SI,OFFSET IBUFFER       ; DS:SI SOURCE
ADDRESS
             ADD       SI,[IOFFSET+BX]         ; START OF
DATA
             CLD                               ; MOVE IN FORWARD
DIRECTION
             REP       MOVSB                   ; BYTE SIZE
TRANSFER
             MOV       [IBUFTYPE],DX           ; STORE TYPE
             MOV       [INEXTTYPE],DX
             MOV       [IBUFINDEX],BX
```

```
IGETNEXT_99:       MOV      SETCX,AX              ; SET CX = BYTES TRANSFERRED
                   JMP      TSR_EXIT              ; NORMAL EXIT - NO ERRORS
ENDP               IGETNEXT

;
; THIS IS THE PUTBLOCK FUNCTION. IT PUTS A BLOCK OF DATA FROM THE CALLER'S
; PBUFFER AND PUTS IT IN THE TSR'S PBUFFER.  PUTBLOCK SEARCHES FOR THE
; FIRST NON-ZERO DATA TYPE SLOT LARGE ENOUGH TO FIT THE DATA BLOCK. IF THE
; NEXT SLOT IS OPEN (TYPE ZERO) AND ITS OFFSET IS PBUFSIZE, ITS OFFSET IS
; SET TO THE CURRENT SLOTS OFFSET PLUS SIZE.
;
; THE REGISTERS TO BE SET AND THEIR MEANINGS ARE:
;
;      INPUT:    AH = 102 (FN_IPUTBLOCK)
;                CX = NUMBER OF BYTES TO TRANSFER
;                DX = DATA TYPE CODE (0 = UNTYPED - EMPTY SLOT)
;             DS:SI = SOURCE ADDRESS
;               NOTE:  VALUE IN CX MUST BE <= PBUFFER SIZE.  IF CX = 0, THE
;                      PBUFFER IS ERASED.
;
;      OUTPUT:   CF = 0 (NO ERROR)
;                CX = NUMBER OF BYTES ACTUALLY SAVED
;
; REGISTERS:    CX
;
PROC               IPUTBLOCK
; SEARCH THRU PUBLIC TYPE CODES
                   PUSH     DX                    ; SAVE DATA TYPE CODE
                   MOV      BX,0                  ; FOR FIRST NON-ZERO
                   MOV      AX,0                  ; BX IS INDEX, AX IS SLOT COUNT
IPUTBLOCK_1:       CMP      [ITYPE+BX],0          ; CHECK FOR 0 DATA TYPE
                   JNE      IPUTBLOCK_1A          ; CONTINUE IF NON-ZERO
                   CALL     ICALCSIZE             ; GET ACTUAL SLOT SIZE
                   CMP      CX,DX                 ; CHECK FOR SLOT SIZE
                   JLE      IPUTBLOCK_2           ; IF ITS A FIT, USE IT
IPUTBLOCK_1A:      INC      BX                    ; NEXT SLOT (2 BYTES)
```

```
                    INC     BX
                    INC     AX                      ; INC COUNT
                    CMP     AX,NSLOTS                   ; IF ALL SLOTS
CHECKED
                    JE      IPUTBLOCK_2             ; EXIT
                    JMP     IPUTBLOCK_1                 ; ELSE CONTINUE
IPUTBLOCK_2:        CMP     AX,NSLOTS                   ; IF NO DATA
SLOT FIT FOUND,
                    JL      IPUTBLOCK_3             ; EXIT ELSE PROCESS
                    POP     DX                      ; RESTORE STACK
                    MOV     CX,0                        ; EXIT WITH 0
BYTES IF NO
                    MOV     AX,ERR_TOOMUCHDATA      ; NOT ENOUGH ROOM
IN TARGET
                    JMP     TSR_ERREXIT
;                   MOV     [IBUFSSIZE],DX              ; STORE ACTUAL
SLOT SIZE
;                   POP     DX                      ; RESTORE DX ON
ERROR
;                   MOV     CX,0                    ; EXIT WITH 0
BYTES IF NO
;                   JMP     IPUTBLOCK_99            ; DATA STORED
IPUTBLOCK_3:        MOV     [IBUFSSIZE],DX              ; STORE
ACTUAL SLOT SIZE
                    POP     DX                      ; RESTORE TYPE CODE
;
; NORMAL STORAGE OCCURS HERE -- BX CONTAINS INDEX TO SLOT, CX
CONTAINS
; THE COUNT, AND DX CONTAINS THE DATA TYPE
;
                    MOV     [ITYPE+BX],DX           ; SAVE DATA TYPE
CODE
IPUTBLOCK_10:       MOV     AX,[IOFFSET+BX]             ; GET
SLOT OFFSET
                    PUSH    DS                      ; SET ES TO TSR'S
DATA SEG
                    POP     ES
                    MOV     DI,OFFSET IBUFFER       ; ES:DI =
DESTINATION
                    ADD     DI,AX                   ; ADD OFFSET TO
OUR SLOT
                    MOV     [ISIZE+BX],CX           ; SAVE DATA SIZE
COUNT
                    MOV     SETCX,CX                ; SAVE COUNT IN STACK
                    MOV     [IBUFCOUNT],CX          ; SAVE COUNT IF
> 0
                    MOV     AX,SETDS                ; GET SAVED DS FROM
STACK
                    MOV     DS,AX                   ; DS:SI = SOURCE
ADDRESS
                    JCXZ    IPUTBLOCK_99            ; EXIT IF COUNT
= 0
                    CLD                             ; MOVE IN FORWARD
```

```
            DIRECTION
                    REP         MOVSB                      ; BYTE TRANSFERS
            IPUTBLOCK_99:       PUSH        ES             ; RESTORE
            TSR'S DATA SEGMENT
                    POP         DS                         ; FROM ES TO DS
                    MOV         [IBUFTYPE],DX              ; SAVE CURRENT
            TYPE AND INDEX
                    MOV         [INEXTTYPE],DX
                    MOV         [IBUFINDEX],BX             ; IF SUCCESSFUL
                    MOV         AX,BX                      ; IF NEXT SLOT
            HAS NOT BEEN
                    INC         AX                         ; USED, UPDATE ITS
            OFFSET
                    INC         AX

;
            ; CHECK FOR LAST HERE.  IF LAST SLOT, WRAPAROUND [NEXTSLOT].
            ;
                    CMP         AX,NDEX                    ; LAST SLOT?
                    JGE         IPUTBLOCK_99A              ; YES, EXIT
                    MOV         [NEXTSLOT],AX              ; INDEX FOR NEXT
            SLOT
                    PUSH        BX
                    MOV         BX,[NEXTSLOT]
                    MOV         AX,[ITYPE+BX]
                    POP         BX
                    CMP         AX,0                       ; IS SLOT IN USE?
                    JNE         IPUTBLOCK_99A              ; NO, EXIT
                    MOV         AX,[IOFFSET+BX]            ; NEXT OFFSET
            IS CURRENT
                    ADD         AX,[ISIZE+BX]              ; PLUS ITS SIZE
                    CMP         AX,BUF_SIZE                ; IF NEXT OFFSET
            IS AT END OF
                    JGE         IPUTBLOCK_99A              ; BUFFER, THEN
            EXIT
                    PUSH        BX
                    MOV         BX,[NEXTSLOT]
                    MOV         [IOFFSET+BX],AX            ; STORE NEW
            OFFSET
                    POP         BX
            IPUTBLOCK_99A:       JMP        TSR_EXIT       ; NORMAL EXIT
            - NO ERRORS
            ENDP                IPUTBLOCK

;
            ; THIS IS THE CLEARBLOCK FUNCTION. IT CLEARS THE DATA STORED IN THE
            CURRENT
            ; PBUFFER SLOT.  IF THE CLEARED SLOT WAS THE LAST ACTIVE SLOT IN
            THE ARRAY,
            ; THEN SET ITS OFFSET BACK TO MAX BUF SIZE.
            ;
            ; CLEARBLOCK WILL ALSO COMPACT THE BUFFER BY MOVING THE FILLED
            SLOTS
```

```
; BACK DOWN OVER THE EMPTY, REMOVING IT FROM THE ARRAY.  THE VARIABLES
; WILL THEN BE UPDATED.
;
; THE REGISTERS TO BE SET AND THEIR MEANINGS ARE:
;
;     INPUT:      AH = 103 (FN_ICLEARBLOCK)
;    OUTPUT:      CF = 0 (NO ERROR)
;
; REGISTERS:      NONE
;
        PROC            ICLEARBLOCK
                PUSH            ES
                PUSH            DI
                PUSH            SI

;
; THERE ARE THREE POSSIBLE SCENARIOS:
;
;   CLEAR FIRST SLOT:
;
;     1. ZERO SLOT DATA
;     2. SET OFFSET TO NEXT SLOT TO 1024
;     3. SET SLOT TYPE TO 0
;     4. SET SLOT SIZE TO 0
;
;   CLEAR LAST SLOT:
;
;     1. ZERO SLOT DATA
;     2. (IF LAST SLOT -- BUT NOT SLOT 31)
;        SET OFFSET TO NEXT SLOT TO 1024
;     3. SET SLOT TYPE TO 0
;     4. SET SLOT SIZE TO 0
;
;   CLEAR MIDDLE SLOT:      (NOTE THAT THE FIRST SLOT IS TREATED AS A
;                            MIDDLE SLOT IF THERE IS A DATA SLOT
;                            FOLLOWING IT).
;
;     1. MOVE ALL FOLLOWING SLOTS RIGHT TO LEFT, WRITING OVER SLOT
; TO DELETE:
;          LOOP FROM NEXT SLOT TO LAST SLOT --
;            - COPY NEXT SLOT CONTENTS TO THIS SLOT
;            - COPY NEXT SLOT TYPE TO THIS SLOT TYPE
;            - COPY NEXT SLOT SIZE TO THIS SLOT SIZE
;            - CALCULATE NEW NEXT SLOT OFFSET AND SET IT
;
;          EXAMPLE OF THIS:
;
;          BEFORE REMOVING SLOT 2:
;
;          SLOT     1   2   3   4   5   6   ...
;          TYPE     1   2   3   4   0   0
;          SIZE    10  20  30  40   0   0
```

```
;       OFFSET     0   10   30   60   100 1024
;
;
;     AFTER REMOVING SLOT 2:
;
;       SLOT       1    2    3    4    5    6   ...
;       TYPE       1    3    4    0    0    0
;       SIZE      10   30   40    0    0    0
;       OFFSET     0   10   60  100 1024 1024
;
;    2. LAST OPEN SLOT OFFSET IS NOW START OF OPEN AREA TO ZERO
FILL.
;       TREAT IT AS CLEARING LAST SLOT.
;
;
;  THE ACTUAL CODE LOGIC WILL BE THIS:
;
;    1. IF MIDDLE SLOT, DO THE SLOT MOVES SO THAT THE SLOT TO BE
;       CLEARED IS AT THE END.  A MIDDLE SLOT HAS VALID SLOTS
;       BEFORE AND AFTER IT.
;
;    2. CLEAR THE LAST SLOT.  IT IS POSSIBLE FOR THE LAST SLOT TO
;       BE ONE OF THREE POSSIBILITIES:
;
;       - THE FIRST AND LAST (ONLY) SLOT
;       - THE LAST OF MORE THAN ONE SLOT BUT LESS THAN 32 SLOTS
;       - THE LAST OF MORE THAN ONE SLOTS AS SLOT 32
;
;  THE VARIABLES USED HERE ARE:
;
;    [IBUFINDEX] = CURRENT SLOT TO BE DELETED
;    [NEXTSLOT]  = TEMP HOLDER FOR SOURCE SLOT WHEN DOING COPY
;    [PREVSLOT]  = TEMP HOLDER FOR DESTINATION SLOT WHEN DOING COPY
;    [ISIZE]     = SIZE IN BYTES OF SLOT
;    [IOFFSET]   = OFFSET FROM BEGINNING OF BUFFER TO BEGINNING OF
SLOT
;    [ITYPE]     = TYPE OF DATA IN SLOT (0 = EMPTY)
;    [IBUFFER]   = COMPLETE BUFFER
;

ICLEARBLK_1:    MOV        BX,[IBUFINDEX]             ; CURRENT SLOT
                MOV        [PREVSLOT],BX              ; ZEROING
ROUTINE COUNTS ON
                                                      ; THIS
                MOV        AX,[ISIZE+BX]              ; STORE SLOT
SIZE FOR LATER
                MOV        [TSIZE],AX                 ; REFERENCE

;
; DETERMINE IF THE SLOT IS A MIDDLE SLOT (DOES IT HAVE VALID SLOTS
; BEFORE AND AFTER IT).
;
                CMP        BX,0          ; FIRST SLOT?
```

```
                    JNE      ICLEARBLK_1A    ; NO

MOV      AX,[ITYPE+BX+2] ; ONLY SLOT?
                    CMP      AX,0
                    JE       ICLEARBLK_20    ; YES
                    JMP      ICLEARBLK_1B    ; HANDLE AS "MIDDLE SLOT"

ICLEARBLK_1A:       MOV      AX,NDEX         ; LAST SLOT (32) ?
                    SUB      AX,2            ; SINCE WE START AT 0,
                                             ;   LAST  SLOT  INDEX  IS
ACTUALLY
                                             ; (NSLOTS - 1) * 2
                    CMP      BX,AX           ; LAST SLOT?
                    JGE      ICLEARBLK_20    ; YES

;
; SLOT IS NOT THE FIRST OR LAST (32).  IS IT LAST < 32 OR MIDDLE
SLOT?
;

ICLEARBLK_1B:       INC      BX              ; LOOK AT NEXT SLOT TYPE
                    INC      BX
                    MOV      AX,[ITYPE+BX]
                    DEC      BX              ; RESTORE BX TO CURRENT
SLOT
                    DEC      BX
                    CMP      AX,0            ; IS NEXT SLOT EMPTY?
                    JE       ICLEARBLK_20    ; YES, LAST SLOT < 32
;
; WE NOW KNOW THE SLOT IS A MIDDLE SLOT: IT IS NOT FIRST OR LAST.
; NEXT STEP IS TO PERFORM THE RIGHT TO LEFT SHIFT OF THE FOLLOWING
; SLOTS TO REMOVE THE CURRENT SLOT, MAKING FREE SPACE AS AN END
SLOT
; TO BE ZEROED.
;
; THIS IS A COPY OF THE COMMENTS FROM THE MAIN COMMENT AREA FOR
THIS
; CODE - JUST TO MAKE THE OPERATION CLEAR.
;
;   CLEAR MIDDLE SLOT:
;
;   1. MOVE ALL FOLLOWING SLOTS RIGHT TO LEFT, WRITING OVER SLOT
TO DELETE:
;           LOOP FROM NEXT SLOT TO LAST SLOT --
;             - COPY NEXT SLOT CONTENTS TO THIS SLOT
;             - COPY NEXT SLOT TYPE TO THIS SLOT TYPE
;             - COPY NEXT SLOT SIZE TO THIS SLOT SIZE
;             - CALCULATE NEW NEXT SLOT OFFSET AND SET IT
;
;           EXAMPLE OF THIS:
;
;           BEFORE REMOVING SLOT 2:
;
;           SLOT    1   2   3   4   5   6   ...
```

- 30 -

```
;       TYPE    1   2   3   4   0   0
;       SIZE   10  20  30  40   0   0
;       OFFSET  0  10  30  60 100 1024
;
;
;       AFTER REMOVING SLOT 2:
;
;       SLOT    1   2   3   4   5    6  ...
;       TYPE    1   3   4   0   0    0
;       SIZE   10  30  40   0   0    0
;       OFFSET  0  10  60 100 1024 1024
;
                MOV     AX,0                    ; ZERO LASTSLOT
FLAG
                MOV     [LASTSLOT],AX
                MOV     BX,[IBUFINDEX]          ; CURRENT SLOT
                MOV     AX,[ISIZE+BX]
                MOV     [TSIZE],AX              ; STORE ORIGINAL
SLOT SIZE
                                                ; FOR FINAL ZEROING

ICLEARBLK_10:   MOV     [PREVSLOT],BX           ; DESTINATION SLOT
                INC     BX
                INC     BX
                MOV     [NEXTSLOT],BX

;
; CHECK IF THIS IS LAST SLOT (32)
;
                MOV     AX,NDEX
                SUB     AX,2                    ; SINCE WE START AT 0,
                                                ;  LAST SLOT INDEX IS
ACTUALLY
                                                ; (NSLOTS - 1) * 2
                CMP     BX,AX                   ; LAST SLOT?
                JL      ICLEARBLK_11            ; NO, CONTINUE
                MOV     AX,1                    ; SET LAST SLOT FLAG
                MOV     [LASTSLOT],AX
;
; CHECK TO SEE IF NEXT SLOT IS ACTIVE (NON-ZERO DATA TYPE).
;

ICLEARBLK_11:
                MOV     AX,[ITYPE+BX]           ; NOT LAST SLOT...
                CMP     AX,0                    ; NEXT SLOT EMPTY?
                JE      ICLEARBLK_20            ; YES, WE ARE DONE

;
; DO SLOT MOVE FROM RIGHT TO LEFT HERE
```

- 31 -

```
;
;               MOV     BX,[IBUFINDEX]          ; CURRENT SLOT
;               MOV     [PREVSLOT],BX           ; CURRENT SLOT
                PUSH    DS                      ; SET ES TO OUR DS
                POP     ES
                MOV     BX,[PREVSLOT]
                MOV     DI,OFFSET IBUFFER       ; SET UP
ES:DI,DS:SI FOR MOVE
                ADD     DI,[IOFFSET+BX]         ; SLOT OFFSET
                MOV     BX,[NEXTSLOT]
                MOV     SI,OFFSET IBUFFER
                ADD     SI,[IOFFSET+BX]
                MOV     CX,[ISIZE+BX]           ; MOVE BYTE
COUNT
                CLD
                REP     MOVSB

;
; MOVE IS DONE, NOW UPDATE THE VARIABLES.
;
                MOV     BX,[PREVSLOT]           ; UPDATE SLOT SIZE
                MOV     AX,[ISIZE+BX+2]
                MOV     [ISIZE+BX],AX

ADD     AX,[IOFFSET+BX]         ; UPDATE START OF
NEXT SLOT
                MOV     [IOFFSET+BX+2],AX

MOV     AX,[ITYPE+BX+2]         ; UPDATE SLOT DATA
TYPE
                MOV     [ITYPE+BX],AX

MOV     AX,[LASTSLOT]           ; IF NOT LASTSLOT,
                CMP     AX,0                    ; CONTINUE MOVE
                JNE     ICLEARBLK_20
                INC     BX                      ; NEXT SET OF SLOTS
                INC     BX
                JMP     ICLEARBLK_10

;
; THIS IS WHERE WE ZERO THE SLOT AND RESET THE APPROPRIATE
VARIABLES.
; AT THIS POINT, THE SLOT TO BE ZEROED IS ALWAYS THE LAST SLOT (BUT
; NOT NECESSARILY SLOT 32).
;

;
; AT THIS POINT, BX DOES NOT CONTAIN OFFSET TO SLOT WE NEED TO
ZERO.
; SIZE IS CONTAINED IN THE [TSIZE] VARIABLE.
;
```

```
ICLEARBLK_20:
            MOV       BX,[PREVSLOT]
            MOV       [ITYPE+BX],0              ; OPEN SLOT NOW
            MOV       CX,[TSIZE]                ; GET CURRENT
BUFSIZE
            MOV       [ISIZE+BX],0              ; NO DATA IN IT
            MOV       AL,0
            MOV       DI,OFFSET IBUFFER         ; ES:DI =
DESTINATION
            ADD       DI,[IOFFSET+BX]           ; GET TO OUR
SLOT
            PUSH      DS                        ; SET ES TO TSR'S
DATA SEG
            POP       ES
            CLD
            REP       STOSB                     ; ZERO THE SLOT
            POP       SI
            POP       DI
            POP       ES

;
; NOW UPDATE THE OFFSET VARIABLE IF THIS IS THE LAST SLOT.
;
            MOV       AX,NDEX
            SUB       AX,2                      ; SINCE WE START
AT 0,
                                                ; LAST SLOT INDEX IS
ACTUALLY
                                                ; (NSLOTS - 1) * 2
            CMP       BX,AX                     ; LAST SLOT?
            JGE       ICLEARBLK_99              ; YES
            MOV       AX,1024                   ; NO, SET NEXT SLOT'S
OFFSET TO MAX
            MOV       [IOFFSET+BX+2],AX

;
; SINCE WE ARE AT THE LAST SLOT IN THE ARRAY, SET THE GLOBAL
VARIABLES TO
; ACCESS THE FIRST SLOT, EMPTY OR NOT.
;

ICLEARBLK_99:   MOV       BX,0
            MOV       [IBUFINDEX],0
            MOV       AX,[ISIZE+BX]
            MOV       [IBUFCOUNT],AX
            MOV       AX,[ITYPE+BX]
            MOV       [IBUFTYPE],AX
            MOV       [INEXTTYPE],AX            ; THIS IS FOR
GETNEXT SEARCH
            CALL      ICALCSIZE                 ; GET ACTUAL SLOT
SIZE
```

```
                MOV     [IBUFSSIZE],DX              ; UPDATE SIZE OF
CURRENT SLOT
                JMP     TSR_EXIT                    ; NORMAL EXIT - NO
ERRORS
ENDP            ICLEARBLOCK

;
; THIS IS THE GET STATUS FUNCTION. IT RETRIEVES THE STATUS
INFORMATION
; FROM THE PREVIOUS OPERATION (ERROR CODE, DATA TYPE CODE, NUMBER
OF BYTES
; STORED IN THE PBUFFER).  THE REGISTERS TO BE SET AND THEIR
MEANINGS ARE:
;
;    INPUT:    AH = 104 (FN_ISTATUS)
;           NOTE:  THIS ROUTINE DOES NOT WRITE TO THE TSR'S DATA
SEGMENT.
;                  THEREFORE, IT CAN BE CALLED RECURSIVELY (THIS
ROUTINE
;                  IS REENTRANT).
;
;    OUTPUT:   AX = ERROR CODE FROM PREVIOUS OPERATION
;              DX = DATA TYPE CODE FOR CURRENT SLOT
;              CX = NUMBER OF BYTES STORED IN CURRENT SLOT
;              BX = FUNCTION OF LAST OPERATION
;
; REGISTERS:   CX,DX
;

PROC            ISTATUS
                MOV     AX,[IBUFCOUNT]              ; GET COUNT OF
BYTES IN CURRENT
                                                    ; SLOT
                MOV     SETCX,AX                    ; STUFF INTO PUSHED
CX ON LOCAL
                                                    ; STACK
                MOV     AX,[IBUFTYPE]               ; GET CURRENT
SLOT DATA TYPE
                MOV     SETDX,AX                    ; STUFF INTO PUSHED
DX ON LOCAL
                                                    ; STACK
                                                    ; STACK
                MOV     AX,[IBUFCODE]               ; GET CURRENT
SLOT ERROR CODE
                MOV     SETAX,AX                    ; STUFF INTO PUSHED
AX ON LOCAL
                                                    ; STACK

MOV     BX,[IBUFINDEX]              ; CURRENT INDEX
                XOR     AX,AX                       ; ZERO AX
                MOV     AL,[ILASTFUNC]              ; FUNCTION CODE
FOR LAST OP
                MOV     SETBX,AX                    ; STUFF INTO PUSHED
```

```
                BX ON LOCAL
                                                        ; STACK
                        JMP         TSR_EXIT            ; EXIT AND CLEAR
STATUS
ENDP                    ISTATUS

;
; THIS PROCEDURE CALCULATES THE ACTUAL SIZE OF THE SPECIFIED SLOT.
IT IS
; ONLY CALLED INTERNALLY.  IT WORKS AS FOLLOWS:
;
;    LOOK AT NEXT OFFSET IN TABLE.  IF THIS IS THE LAST SLOT IN THE
ARRAY,
;    THEN SUBTRACT THE SIZE OF THE BUFFER FROM THE BUFFER.
;
;    SUBTRACT THE CURRENT OFFSET (LOWER LIMIT) FROM THE UPPER LIMIT
AND STUFF
;    THE VALUE IN THE DX REGISTER.
;
; ALL REGISTERS USED ARE SAVED AND RESTORED, SO NO EFFECT ON CALLER
EXCEPT
; FOR RETURNED VALUE IN DX.
;
;    INPUT:     BX = SLOT TO CALCULATE
;
;    OUTPUT:    DX = ACTUAL SIZE IN BYTES OF SLOT
;

PROC                    ICALCSIZE
                PUSH        AX
                MOV         DX,NSLOTS
                DEC         DX
                MOV         AX,2
                MUL         DX
                CMP         BX,AX                       ; END OF SLOTS?
                JNE         ISIZE_1                     ; NO, CONTINUE
                MOV         DX,BUF_SIZE                 ; YES, SUBTRACT
FROM END OF
                JMP         ISIZE_2                     ; BUFFER
ISIZE_1:        MOV         DX,[IOFFSET+BX+2]           ; LOOK AT NEXT
SLOT OFFSET

;
; DX NOW CONTAINS THE LARGER OF THE OFFSETS
;
ISIZE_2:        SUB         DX,[IOFFSET+BX]             ; SUBTRACT
CURRENT OFFSET
                                                        ; RESULT IS IN DX
                POP         AX
                RET
ENDP                    ICALCSIZE
```

```
;
; THIS PROCEDURE COMPLETELY RESETS THE HOLDER BUFFERS - BOTH PUBLIC AND
; PRIVATE.  IT IS CALLED ONLY BY KERNEL.ASM.  THIS IS NECESSARY SINCE
; HOLDER REMAINS INSTALLED AS LONG AS THE PC IS ON AND HAS NOT BEEN RESET.
; IT IS POSSIBLE TO EXIT KERNEL AND LATER RE-ENTER IT.  IF OLD STUFF IS
; LAYING AROUND, THE RESULTS COULD BE UNPREDICTABLE.  SO KERNEL WILL
; RESET HOLDER ON STARTUP.
;
; ALL REGISTERS USED ARE SAVED AND RESTORED, SO NO EFFECT ON CALLER.
;
;       INPUT:     NONE
;
;       OUTPUT:    NONE
;

PROC            IRESET          FAR

;
; INITIALIZE BUFFER VARIABLES:
;
;   BUF SIZE: ALL SLOTS HAVE ZERO BYTES OF DATA IN THEM
;   OFFSET:   FIRST SLOT IS 0 AND REMAINING ARE MAX
;   DATA TYPES ARE ALL ZERO
;   CURRENT DATA TYPE IS ZERO AND CURRENT INDEX IS ZERO
;
                PUSH    DS
                PUSH    ES
                PUSH    SI
                PUSH    DI
                PUSH    CX
                MOV     AX,TSR_DATA             ; INITIALIZE DS TO TSR'S
                MOV     DS,AX                   ; DATA SEGMENT
                ASSUME  DS:TSR_DATA
                MOV     AX,0
                MOV     [PSIZE],AX
                MOV     [ISIZE],AX
                MOV     CX,NSLOTS
                MOV     DI,OFFSET PSIZE
                PUSH    DS                      ; SET ES TO TSR'S DATA SEG
                POP     ES
                CLD
                REP     STOSW                   ; ZERO THE SLOT BYTE COUNTS

MOV     [POFFSET],0
```

```
                MOV     AX,BUF_SIZE
                MOV     CX,NSLOTS
                DEC     CX
                MOV     DI,OFFSET POFFSET
                INC     DI
                INC     DI
                PUSH    DS                      ; SET ES TO TSR'S
DATA SEG
                POP     ES
                CLD
                REP     STOSW                   ; ZERO THE
REMAINING OFFSETS
                                                ; TO END OF BUFFER

;
; SET ALL TYPES TO 0
;
                MOV     AX,0
                MOV     CX,NSLOTS
                DEC     CX
                MOV     DI,OFFSET PTYPE
;               INC     DI
;               INC     DI
                PUSH    DS                      ; SET ES TO TSR'S
DATA SEG
                POP     ES
                CLD
                REP     STOSW                   ; ZERO THE
REMAINING OFFSETS
                                                ; TO END OF BUFFER

;
; SET ALL TYPES TO 0
;
                MOV     AX,0
                MOV     CX,NSLOTS
                DEC     CX
                MOV     DI,OFFSET ITYPE
;               INC     DI
;               INC     DI
                PUSH    DS                      ; SET ES TO TSR'S
DATA SEG
                POP     ES
                CLD
                REP     STOSW                   ; ZERO THE
REMAINING OFFSETS
                                                ; TO END OF BUFFER

;
; ZERO THE PUBLIC BUFFER
;
```

```
                        MOV        CX,BUF_SIZE
                        MOV        AL,0
                        MOV        DI,OFFSET PBUFFER         ; ES:DI =
DESTINATION
                        PUSH       DS                        ; SET ES TO TSR'S
DATA SEG
                        POP        ES
                        CLD
                        REP        STOSB                     ; ZERO THE SLOT

MOV        CX,NSLOTS
                        MOV        DI,OFFSET ISIZE
                        PUSH       DS                        ; SET ES TO TSR'S
DATA SEG
                        POP        ES
                        CLD
                        REP        STOSW                     ; ZERO THE SLOT
BYTE COUNTS

MOV        [IOFFSET],0
                        MOV        AX,BUF_SIZE
                        MOV        CX,NSLOTS
                        DEC        CX
                        MOV        DI,OFFSET IOFFSET
                        INC        DI
                        INC        DI
                        PUSH       DS                        ; SET ES TO TSR'S
DATA SEG
                        POP        ES
                        CLD
                        REP        STOSW                     ; ZERO THE
REMAINING OFFSETS
                                                             ; TO END OF BUFFER

;
; ZERO THE PPRIVATE BUFFER
;
                        MOV        CX,BUF_SIZE
                        MOV        AL,0
                        MOV        DI,OFFSET IBUFFER         ; ES:DI =
DESTINATION
                        PUSH       DS                        ; SET ES TO TSR'S
DATA SEG
                        POP        ES
                        CLD
                        REP        STOSB                     ; ZERO THE SLOT

POP        CX
                        POP        DI
                        POP        SI
                        POP        ES
```

```
                POP       DS
                RET
ENDP            IRESET

;
;*******************************************************************
;***
; ALL ROUTINES MUST GO BEFORE THIS OR THEY WILL NOT BE IN THE CODE
; SEGMENT.
;
;*******************************************************************
;***

ENDS            TSR_CODE

;
; THIS IS THE TSR'S DATA SEGMENT
;

SEGMENT         TSR_DATA  'TSRDATA'
DOSVERSION      DW    0                   ; MAJOR AND MINOR
VERSION
                                          ; NUMBERS
INPROGRESS      DB    0                           ; 0 = TSR NOT
ACTIVE
                                          ; 1 = TSR ACTIVE
MODE_FLG        DB    0                           ; MODE FLAG = 1
PRIVATE
                                          ;           2 PUBLIC

;
; THESE ARE SIMPLY INDEX PLACE HOLDERS TO SAVE REGISTERS AND
RECALCULATIONS
; WHILE ADDING NEW DATA.  THEY ARE NOT GLOBAL DATA TO REMEMBERED
BEYOND THE
; CURRENT ACTIVITY.
;

PREVSLOT        DW    0
NEXTSLOT        DW    0

;
; LAST FUNCTION PERFORMED - SAME FOR EITHER PUBLIC OR PRIVATE
;

PLASTFUNC       DB           0            ; LAST PUBLIC FUNC
PERFORMED
ILASTFUNC       DB           0            ; LAST PRIVATE FUNC
PERFORMED
```

```
;
; THESE ARE THE GLOBAL RESULTS OF THE LAST OPERATION AND ARE THEREFORE
; REFERRING TO THE LAST ACCESSED SLOT.
;

PBUFCOUNT       DW              0               ; NUMBER OF BYTES STORED
PBUFSSIZE       DW              0               ; SLOT SIZE
PBUFTYPE        DW              0               ; PBUFFER DATA TYPE CODE
PNEXTTYPE       DW              0               ; SEPARATE FOR GETNEXT
                                                ; OR CLEAR WILL FORCE TYPE
                                                ; TO 0
PBUFINDEX       DW              0               ; TRUE INDEX (BX) INTO BUFFER
PBUFCODE        DW              0               ; PREVIOUS OPERATION CODE

IBUFCOUNT       DW              0               ; NUMBER OF BYTES STORED
IBUFSSIZE       DW              0               ; SLOT SIZE
IBUFTYPE        DW              0               ; IBUFFER DATA TYPE CODE
INEXTTYPE       DW              0               ; SEPARATE FOR GETNEXT
                                                ; OR CLEAR WILL FORCE TYPE
                                                ; TO 0
IBUFINDEX       DW              0               ; TRUE INDEX (BX) INTO BUFFER
IBUFCODE        DW              0               ; PREVIOUS OPERATION CODE

;
; THE TSR'S PUBLIC BUFFER
;

PTYPE           DW              NSLOTS DUP(0)   ; TYPE CODE ARRAY
POFFSET         DW              NSLOTS DUP(0)   ; OFFSET FOR EACH DATA
PSIZE           DW              NSLOTS DUP(0)   ; SIZE OF DATA (NOT SLOT SIZE)
PBUFFER         DB              BUF_SIZE DUP(0)

;
; THE TSR'S INTERNAL BUFFER
;
ITYPE           DW              NSLOTS DUP(0)   ; TYPE CODE
```

```
ARRAY
IOFFSET              DW              NSLOTS DUP(0)       ; OFFSET
FOR EACH DATA
ISIZE                DW              NSLOTS DUP(0)'      ; SIZE OF
EACH PIECE
IBUFFER              DB              BUF_SIZE DUP(0)
TSIZE                    DW     0                        ; TEMP SLOT
SIZE FOR
                                                         ;    CLEAR
SLOT ROUTINES
LASTSLOT             DW     0                            ; LAST SLOT
FLAG FOR
                                                         ;    CLEAR
SLOT ROUTINES
ENDS                 TSR_DATA

;
; THIS IS THE TRANSIENT PORTION OF THE TSR
;

SEGMENT              LOADER_CODE 'CODE'
PROC            LOAD_TSR
                ASSUME       CS:LOADER_CODE, DS:TSR_DATA

MOV     AX,TSR_DATA            ; DS = TSR SEGMENT
                MOV     DS,AX
                ASSUME  DS:TSR_DATA
                CALL    CHECKVERSION           ; ABORT IF DOS
= 1.XX
                MOV     AX,[WORD DOSVERSION]   ; CHECK DOS
VERSION
                CMP     AL,02                  ; MAJOR VERSION
                JGE     LTSR_10                ; JMP IF CF =
0 (NO ERROR)
                MOV     AL,1                   ; ERROR #1 DOS =
1.XX
                JMP     ERROREXIT
LTSR_10:        PUSH    ES                     ; SAVE PSP ADDR ON
STACK
                                               ; THIS WILL LATER POP OFF
                                               ; INTO AX TO CALC THE
SIZE
                                               ; OF THE TSR
                PUSH.   DS                     ; SAVE TSR DATA
SEGMENT

;
; INSTALL INTERRUPT SERVICE ROUTINE
;

MOV     AL,TSRINT              ; GET CURRENT INT
VECTOR
                MOV     AH,35H
                INT     21H
```

```
                MOV     BX,ES                           ; IF SEG OF CURRENT VECTOR
                OR      BX,BX                           ; IS 0, WE CAN USE VECTOR
                JZ      LTSR_20                         ; OTHERWISE, VECTOR IS
                                                        ; ALREADY USED, AND WE
                                                        ; ERROR WITH CODE 2.
                POP     DS
                POP     ES
                MOV     AL,2
                JMP     ERROREXIT
LTSR_20:        MOV     AX,TSR_CODE                     ; SET VECTOR TO OUR TSR
                MOV     DS,AX
                ASSUME     DS:TSR_CODE
                MOV     DX,OFFSET TSR_ISR
                MOV     AL,TSRINT
                MOV     AH,25H
                INT     21H
                POP     DS

CALL    IRESET                          ; RESET THE BUFFERS AND VARS

;
; NOW WE GO TERMINATE AND STAY RESIDENT
;
                MOV     AX,LOADER_DATA                  ; INITIALIZE DS TO LOADER'S
                MOV     DS,AX                           ; DATA SEGMENT
                ASSUME     DS:LOADER_DATA
                MOV     DX,OFFSET DONEMSG1              ; DISPLAY TSR LOADED MSG
                MOV     AH,09H
                INT     21H
                MOV     DX,OFFSET DONEMSG2              ; DISPLAY TSR LOADED MSG
                MOV     AH,09H
                INT     21H
                POP     AX                              ; RESTORE PSP ADDR TO AX
                MOV     DX,CS                           ; DX = TRANSIENT START ADDR
                SUB     DX,AX                           ; DX = RESIDENT SIZE
                MOV     AX,3100H                        ; DOS TERMINATE FUNCTION
                INT     21H                             ; AL = 0 FOR RET CODE
                ENDP    LOAD_TSR
;
```

- 42 -

```
; THIS ROUTINE EXITS WITH ERROR MSG AND ERROR CODE IN AL
;
;       INPUT:    AL = ERROR CODE 1..N
;                 DS = ADDRESS OF TSR'S DATA SEGMENT
;                 ES = PSP SEGMENT ADDRESS (DOS 1.X ONLY)
;
;       OUTPUT:   NONE - PROGRAM HALTED
;
; REGISTERS:      NONE PRESERVED
;
        PROC        ERROREXIT      NEAR
                    ASSUME         DS:TSR_DATA
                    PUSH           [DOSVERSION]               ; SAVE DOS VERSION ON STACK
                    PUSH           AX                         ; SAVE ERROR CODE ON STACK
                    MOV            AX,LOADER_DATA             ; INITIALIZE DS TO LOADER'S
                    MOV            DS,AX                      ; DATA SEGMENT
                    ASSUME         DS:LOADER_DATA
                    MOV            DX,OFFSET ERRORMSG         ; ADDR "ERROR: " STRING
                    MOV            AH,09H                     ; PRINT STRING
                    INT            21H
                    POP            AX                         ; SAVE ERROR CODE
                    PUSH           AX
                    CMP            AL,1                       ; ERROR CODE = 1 ?
                    JNE            TEST2                      ; NO, TEST NEXT CODE
                    MOV            DX,OFFSET ERRMSG1
                    JMP            EXIT
        TEST2:      CMP            AL,2                       ; ERROR CODE 2 ?
                    JNE            TEST3                      ; NO, CHECK NEXT CODE
                    MOV            DX,OFFSET ERRMSG2
                    JMP            EXIT
        TEST3:      MOV            DX,OFFSET DEFAULTMSG       ; DEFAULT ERRORS
        EXIT:       MOV            AH,09H                     ; DISPLAY SPECIFIC ERROR MSG
                    INT            21H
                    POP            AX                         ; RESTORE ERROR CODE TO AL
                    POP            BX                         ; RESTORE DOS VERSION TO BX
                    CMP            BL,2                       ; DOS 2.XX OR BETTER ?
                    JB             EXITDOS1X                  ; NO, VERSION 1.X
                    MOV            AH,4CH                     ; TERMINATE FOR DOS 2.X
                    INT            21H
```

```
EXITDOS1X:       PUSH       ES                        ; EXIT FOR DOS
1.X
                 XOR        AX,AX
                 PUSH       AX
                 RETF
ENDP             ERROREXIT

;
; THIS ROUTINE CHECKS THE DOS VERSION.
;
;    INPUT:      DS = ADDRESS OF TSR'S DATA SEGMENT
;
;    OUTPUT:     DOSVERSION = VERSION NUMBER
;                AX = VERSION NUMBER
;                CF = 0 - DOS VERSION 2.X OR HIGHER
;                CF = 1 - DOS VERSION 1.X
;
; REGISTERS:     AX
;

PROC             CHECKVERSION     NEAR
                 ASSUME     DS:TSR_DATA
                 MOV        AH,30H                    ; GET DOS
VERSION NUMBER
                 INT        21H
                 MOV        [WORD DOSVERSION],AX      ; SAVE IN TSR
DATA SEG
                 CMP        AL,20H                    ; MAJOR REV
NUMBER
                 RET                                  ; CF = 0 IF AL >= 2
                                                     ; ELSE CF = 1
ENDP             CHECKVERSION
ENDS             LOADER_CODE

;
; THIS IS THE LOADER'S DATA SEGMENT
;

SEGMENT          LOADER_DATA 'DATA'

DONEMSG1         DB         CR,LF,'HOLDER - TSR VERSION
',MAJ_VPRT,'.',MIN_VPRT,' LOADED','$'
DONEMSG2         DB         CR,LF,'Copyright (c) 1991 by Network
Systems Corporation',CR,LF,'$'
ERRORMSG         DB         CR,LF,'ERROR: ','$'
ERRMSG1          DB         'REQUIRES DOS 2.0 OR LATER',CR,LF,'$'
ERRMSG2          DB         'INTERRUPT VECTOR IN USE',CR,LF,'$'
DEFAULTMSG       DB         'UNKNOWN CAUSE',CR,LF,'$'
ENDS             LOADER_DATA

;
; THIS IS THE TSR LOADER'S STACK SEGMENT
;
```

```
SEGMENT         LOADER_STACK      STACK 'STACK'
        DB      STACK_SIZE DUP(?)
ENDS    LOADER_STACK
END     LOAD_TSR
```

- 45 -

```
; Copyright (c) 1991-92 by Network Systems Corporation
;
;
; THSES ARE THE INCLUDES USED BY HOLDER.ASM AND SHARED BY
KERNEL.ASM
;

CR              EQU     13              ; ASCII CARRIAGE RETURN
LF              EQU     10              ; ASCII LINE FEED
TSRINT          EQU     063H            ; TSR'S INT NUMBER
STACK_SIZE      EQU     2048            ; TSR LOADER'S STACK
SIZE
BUF_SIZE        EQU     1024            ; SIZE OF PUBLIC AND
PRIVATE
                                        ; STORAGE BUFFERS
NSLOTS          EQU     32              ; NUMBER OF DATA
SLOTS IN PUBLIC
                                        ; AND PRIVATE BUFFERS
NDEX            EQU     64              ; NSLOTS * 2 FOR
COMPARISONS

;
; TSR VERSION AND SIGNATURE -- VERSION 1.1
;

MAJ_VERSION     EQU     1
MIN_VERSION     EQU     3
MAJ_VPRT        EQU     31H
MIN_VPRT        EQU     33H
SIGNATURE       EQU     6996

;
; FUNCTION NUMBERS FOR INT 63H CALLS TO TSR
;

FN_GETBLOCK     EQU     1               ; GET STORED DATA FROM
TSR
FN_PUTBLOCK     EQU     2               ; SAVE DATA IN TSR
FN_CLEARBLOCK   EQU     3               ; CLEAR DATA STORED IN
TSR
FN_STATUS       EQU     4               ; RETRIEVE TSR'S STATUS
FN_GETNEXT      EQU     5               ; GET NEXT ITEM OF SAME
DATA TYPE
FN_SIGNATURE    EQU     100             ; NOTIFY CALLER TSR
IS PRESENT

;
; THESE FUNCTIONS ARE STRICTLY FOR INTERNAL USE BY MY UNDERLYING
SUPPORT
; CODE SUCH AS NSCTOOL AND NSCMENU. THESE NUMBERS WILL GROW
DOWNWARD.
;

FN_IGETBLOCK    EQU     101             ; GET STORED DATA
```

```
FROM TSR
FN_IPUTBLOCK        EQU     102             ; SAVE DATA IN TSR
FN_ICLEARBLOCK      EQU     103             ; CLEAR DATA STORED
IN TSR
FN_ISTATUS          EQU     104             ; RETRIEVE TSR'S STATUS
FN_IGETNEXT         EQU     105             ; GET NEXT ITEM OF
SAME DATA TYPE
FN_IRESET           EQU     200             ; RESET HOLDER BUFFERS
AND VARS

; ERROR CODES

ERR_BADFUNCTION     EQU     1               ; BAD FUNCTION
NUMBER IN AH
ERR_TOOMUCHDATA     EQU     2               ; TOO MUCH DATA FOR
AVAILABLE SPACE
                                            ; CAN  BE  TRUE  IN  EITHER
DIRECTION
ERR_TSRBUSY         EQU     3               ; TSR IS BUSY
ERR_MEM             EQU     4               ; MEMORY ALLOCATION
ERROR

;
; THESE ARE THE USEABLE DATA TYPES FOR KERNEL THROUGH HOLDER
;

NO_TYPE             EQU     0               ; NOTHING - IGNORE
THIS
PROG_TYPE           EQU     1               ; PROGRAM TO SPAWN
CMD_TYPE            EQU     2               ; CMD TO EXECUTE
PATH_TYPE           EQU     3               ; CURRENT PATH
ERROR_TYPE          EQU     4               ; NSCTOOL OR KERNEL ERROR
COM1_TYPE           EQU     5               ; COM1 DRIVER FILE HANDLE
COM2_TYPE           EQU     6               ; COM2 DRIVER FILE HANDLE
COM3_TYPE           EQU     7               ; COM3 DRIVER FILE HANDLE
COM4_TYPE           EQU     8               ; COM4 DRIVER FILE HANDLE
DIY_TYPE            EQU     9               ; DO IT YOURSELF COM OPEN
MSG
ARG_TYPE            EQU     10              ; ARGS FOR DEFAULT SPAWN
PROGRAM
CPROG_TYPE          EQU     11              ; PROGRAM TO SPAWN - CRON
ORIGINATED
CCMD_TYPE           EQU     12              ; CMD TO EXECUTE - CRON
ORIGINATED
```

- 47 -

```
            IDEAL
            JUMPS

; Copyright (c) 1991-92 by Network Systems Corporation

INCLUDE "HOLDER.INC"

MODEL       SMALL
            STACK       200H

SEGMENT             DATA        'DATA'

;
; THIS IS THE COMMAND TABLE. THERE MUST BE A ROUTINE ASSOCIATED
WITH THE
; COMMAND TO PROCESS IT.
;
; COMMANDS          EQU         $

COMMANDS    DB          'DOS',0                 ; CMD WITH NULL
TERMINATION
            DW          DOS_CMD                 ; OFFSET OF
HANDLER FOR CMD
            DB          'EXIT',0
            DW          EXIT_CMD
            DB          'SHELL',0
            DW          SHELL_CMD
            DB          'HOME',0
            DW          HOME_CMD
            DB          'RESET',0
            DW          RESET_CMD
            DB          'HELP',0
            DW          HELP_CMD
            DB          0                       ; CMD TABLE ENDS WITH
NULL

EXITFLG             DW          0               ; TRUE WHEN
EXITING TO DOS
                                                ; AS SET BY EXIT CMD IN
SHELL

SHFLG               DW          0               ; TRUE WHEN
CTRL-C SETS IT
                                                ;   TO   FORCE   SHELL
EXECUTION

RETFLG              DW          0               ; TRUE WHEN RET
CMD SETS IT TO
                                                ; RET TO HOLDER LOOP

ERRTRIES            DW          0               ; KEEP TRACK OF WHICH
```

```
                 PATH TYPE WE
                                              ; ARE TRYING TO SPAWN
        FROM.

CUR_DIR          DB       67 DUP(0)             ; STORE
        CURRENT DIR HERE
        CUR_DRIVE   DB    0                  ; 0 = DEFAULT DRIVE
        DIR_LEN          DW       64                    ; ACTUAL
        OPERATING LENGTH OF
                                              ; CUR_DRIVE

DEF_DIR          DB       67 DUP(0)             ; STORE
        CURRENT DIR HERE
        DEF_LEN          DW       64                    ; ACTUAL
        OPERATING LENGTH OF
                                              ; DEF_DIR

EXECERRFLG       DW       0                     ; FORCE EXIT ON
        EXEC ERROR

COM_VAR          DB       'COMSPEC=',0          ; SEARCH
        STRING FOR COMSPEC

COM_SPEC    DB            80 DUP (0)            ; STORAGE FOR
        COMSPEC

DPVAR            DB       'NSCTOOL='            ; ENVIRONMENT VAR
        CONTAINING
                                              ; NSCTOOL PATH
        DPVAR_SZ         DW       8                     ; LENGTH OF
        ENVIRONMENT VAR

DPNAME           DB       'NSCMENU.EXE'         ; DEFAULT NAME
        OF PROGRAM TO
                                              ; EXECUTE
        DPNAME_SIZE      DW       11                    ; TRUE LENGTH OF
        PROG NAME
        DPARG            DB       256 DUP (0)           ; ARGS FOR DEFAULT
        PROGRAM TO
                                              ; EXECUTE
        DPARG_SIZE       DW       0                     ; LENGTH OF ARG
        STRING

UPNAME           DB       15 DUP (0)            ; USER DEFAULT
        PROG NAME
        UPFLG            DW       0                     ; IF TRUE, PPNAME
        GETS CONTENTS
                                              ; OF UPNAME, ELSE IT GETS
        DPNAME
        PPNAME           DB       80 DUP (0)            ; WILL HOLD
        ACTUAL DEFAULT PROG
                                              ; NAME
        PNAME            DB       80 DUP (0)            ; FULL PATH AND
```

- 49 -

```
                PROGRAM NAME
                PLNAME              DW      80                      ; LENGTH OF
                PATH AND PROG NAME

OUR_CMD             DB      80 DUP(0)               ; FOR ARGS CMD
                TAIL

NULTAIL             DB      0,CR

CMD_TAIL    DB      0,' /C'                         ; BUILD FOR DOS
                CMD

INP_BUF             DB      80 DUP (0)              ; USER INPUT
                BUFFER
                INP_LEN             DB      0

FCB1        DB      0
                            DB      11 DUP (' ')
                            DB      25 DUP (0)

FCB2        DB      0
                            DB      11 DUP (' ')
                            DB      25 DUP (0)

; INP_BUF_LENGTH      EQU         ($-OFFSET INP_BUF)
                ; CMD_TAIL_LENGTH     EQU         ($-OFFSET CMD_TAIL-1)

PROMPT              DB      CR,LF,'NSCTOOL-> '
                PROMPT_LEN  DB      0
                ; PROMPT_LENGTH       EQU         ($-OFFSET PROMPT)

INPB_LENGTH         DW      0
                PT_LENGTH           DW      0
                CT_LENGTH           DW      0

ENV_SEG             DW      0

;
                ; THIS IS THE SAVED CTRL-C VECTOR TO RESTORE ON EXIT
                ;

CTLCINT             DD      ?

;
                ; THESE ARE THE ERROR MSGS
                ;

MSG1                DB      CR,LF
                            DB      'UNABLE TO DE-ALLOCATE MEMORY.'
                            DB      CR,LF
                MSG1_LENGTH         EQU         ($-OFFSET MSG1)
                M1_LENGTH           DW      MSG1_LENGTH
```

```
MSG2              DB         CR,LF
                  DB         'EXEC OF COMMAND.COM FAILED.'
                  DB         CR,LF
MSG2_LENGTH       EQU        ($-OFFSET MSG2)
M2_LENGTH         DW         MSG2_LENGTH

MSG3              DB         CR,LF
                  DB         'NO COMSPEC VARIABLE IN ENVIRONMENT.'
                  DB         CR,LF
MSG3_LENGTH       EQU        ($-OFFSET MSG3)
M3_LENGTH         DW         MSG3_LENGTH

MSG4              DB         CR,LF
                  DB         'HOLDER TSR NOT INSTALLED.'
                  DB         CR,LF
MSG4_LENGTH       EQU        ($-OFFSET MSG4)
M4_LENGTH         DW         MSG4_LENGTH

MSG5              DB         CR,LF
                  DB         'FAILED TO SPAWN NSCMENU SELECTION.'
                  DB         CR,LF
MSG5_LENGTH       EQU        ($-OFFSET MSG5)
M5_LENGTH         DW         MSG5_LENGTH

;
; THESE ARE FOR THE HELP CMD
;
MSG6              DB         CR,LF
                  DB         'HOME      - RETURN TO NSCTOOL HOME DIRECTORY'
MSG6_LENGTH       EQU        ($-OFFSET MSG6)
M6_LENGTH         DW         MSG6_LENGTH

MSG7              DB         CR,LF
                  DB         'RESET     - CLEAR ALL NSCTOOL AND HOLDER TSR BUFFERS'
MSG7_LENGTH       EQU        ($-OFFSET MSG7)
M7_LENGTH         DW         MSG7_LENGTH

MSG8              DB         CR,LF
                  DB         'HELP      - PRINT THIS LIST'
MSG8_LENGTH       EQU        ($-OFFSET MSG8)
M8_LENGTH         DW         MSG8_LENGTH

MSG9              DB         CR,LF
                  DB         'SHELL     - ENTER NSCTOOL COMMAND MODE'
MSG9_LENGTH       EQU        ($-OFFSET MSG9)
M9_LENGTH         DW         MSG9_LENGTH

MSG10             DB         CR,LF
                  DB         'DOS       - SHELL TO DOS FROM NSCTOOL COMMAND MODE'
MSG10_LENGTH      EQU        ($-OFFSET MSG10)
M10_LENGTH        DW         MSG10_LENGTH
```

- 51 -

```
;
; NOTE THAT LAST ITEM HAS SECOND CRLF FOLLOWING MESSAGE
;

MSG11           DB          CR,LF
                DB          'EXIT      - EXIT NSCTOOL COMMAND MODE AND
RETURN TO THE APPLICATION LEVEL'
                DB          CR,LF
MSG11_LENGTH    EQU         ($-OFFSET MSG11)
M11_LENGTH      DW          MSG11_LENGTH

;
; LEAVE PLENTY OF ROOM FOR ADDING NEW COMMANDS HERE
;

;
; MSG20 INDICATES THE START OF ERROR MSGS AGAIN.
;

MSG20           DB          CR,LF
                DB          'ERROR OPENING COM1 DRIVER.'
                DB          CR,LF
MSG20_LENGTH    EQU         ($-OFFSET MSG20)
M20_LENGTH      DW          MSG20_LENGTH

MSG21           DB          CR,LF
                DB          'ERROR OPENING COM2 DRIVER.'
                DB          CR,LF
MSG21_LENGTH    EQU         ($-OFFSET MSG21)
M21_LENGTH      DW          MSG21_LENGTH

;
; MSG FOR FAILURE OF NSCMENU - SPAWNED BUT HAD PROBLEMS
;

MSG50           DB          CR,LF
                DB          'NSCTOOL FAILED'
                DB          CR,LF
MSG50_LENGTH    EQU         ($-OFFSET MSG50)
M50_LENGTH      DW          MSG50_LENGTH

MSG51           DB          CR,LF
                DB          'NSCTOOL KERNEL VERSION 1.6'
                DB          CR,LF
                DB          'Copyright (c) 1991 by Network Systems
Corporation'
                DB          CR,LF
MSG51_LENGTH    EQU         ($-OFFSET MSG51)
M51_LENGTH      DW          MSG51_LENGTH

;
```

```
; SAVE ANY REGISTERS.  THAT IS DONE HERE.  THE RESULTS OF ANY OF
THESE
; OPERATIONS ARE STORED IN THE GLOBAL VARIABLES.
;
; NOTE THAT SINCE EACH OF THESE ROUTINES AUTOMATICALLY CALLS THE
APPROPRIATE
; STATUS ROUTINE AND PLACES THE RESULTS ACCORDINGLY, IT IS RARELY
NECESSARY
; FOR THE CALLER TO DO THIS.
;
;
;****************************************************************
*********
;
;
; THIS PROCEDURE GETS THE FIRST BLOCK OF DATA FROM THE PRIVATE
BUFFER
; WHICH CONFORMS TO THE SPECIFIED TYPE.
;
;
;
; THE FOLLOWING MUST SET BY THE CALLER:
;
;       H_ITYPE
;
; THE FOLLOWING ARE SET ON RETURN TO CALLER:
;
;       H_ISTATUS
;       H_ITYPE
;       H_ISIZE
;       H_ILFUNC
;
; POSSILBE STATUS HERE:
;
;   0               SUCCESS
;   1 - 99          HOLDER ERROR CODE
;   H_ERRSYSINT    SYSTEM SW INTERRUPT ERROR
;
PROC            IGETBLK
                PUSH        AX
                PUSH        CX
                PUSH        DX
                PUSH        BX
                PUSH        DI
                PUSH        ES

PUSH        DS
                POP         ES
                MOV         AH,FN_IGETBLOCK
                MOV         CX,BUF_SIZE
                MOV         DX,[H_ITYPE]
```

```
                    MOV         DI,OFFSET TSRBUF
                    INT         TSRINT
                    CMP         CX,0
                    JNE         IG_BLK1
                    MOV         [H_ISTAT],H_ERRNOTFOUND      ; DATA NOT
STORED
                    JMP         IG_BLK2
IG_BLK1:            MOV         AH,FN_ISTATUS                ; GET STATUS
                    INT         TSRINT
                    MOV         [H_ISTAT],AX
                    MOV         [H_ISIZE],CX
                    MOV         [H_ITYPE],DX
                    MOV         [H_ILFUNC],BX

IG_BLK2:            POP         ES
                    POP         DI
                    POP         BX
                    POP         DX
                    POP         CX
                    POP         AX
                    RET

ENDP                IGETBLK

;
; THIS PROCEDURE GETS THE FIRST BLOCK OF DATA FROM THE PUBLIC
BUFFER
; WHICH CONFORMS TO THE SPECIFIED TYPE.
;
;
; THE FOLLOWING MUST SET BY THE CALLER:
;
;     H_PTYPE
;
; THE FOLLOWING ARE SET ON RETURN TO CALLER:
;
;     H_PSTATUS
;     H_PTYPE
;     H_PSIZE
;     H_PLFUNC
;
; POSSILBE STATUS HERE:
;
;   0              SUCCESS
;   1 - 99         HOLDER ERROR CODE
;   H_ERRSYSINT    SYSTEM SW INTERRUPT ERROR
;
PROC                PGETBLK
                    PUSH        AX
                    PUSH        CX
                    PUSH        DX
```

```
                    PUSH        BX
                    PUSH        DI
                    PUSH        ES

PUSH        DS
                    POP         ES
                    MOV         AH,FN_GETBLOCK
                    MOV         CX,BUF_SIZE
                    MOV         DX,[H_PTYPE]
                    MOV         DI,OFFSET TSRBUF
                    INT         TSRINT
                    CMP         CX,0
                    JNE         PG_BLK1
                    MOV         [H_PSTAT],H_ERRNOTFOUND      ; DATA NOT
STORED
                    JMP         PG_BLK2
PG_BLK1:            MOV         AH,FN_STATUS                 ; GET STATUS
                    INT         TSRINT
                    MOV         [H_PSTAT],AX
                    MOV         [H_PSIZE],CX
                    MOV         [H_PTYPE],DX
                    MOV         [H_PLFUNC],BX

PG_BLK2:            POP         ES
                    POP         DI
                    POP         BX
                    POP         DX
                    POP         CX
                    POP         AX
                    RET

ENDP                PGETBLK

;
; THIS PROCEDURE GETS THE NEXT BLOCK OF DATA FROM THE PRIVATE
BUFFER
; WHICH CONFORMS TO THE CURRENT TYPE.
;
;
; THE FOLLOWING MUST SET BY THE CALLER:
;
;       NONE
;
;
; THE FOLLOWING ARE SET ON RETURN TO CALLER:
;
;       H_ISTATUS
;       H_ITYPE
;       H_ISIZE
;       H_ILFUNC
;
; POSSILBE STATUS HERE:
```

- 55 -

```
;
;    0            SUCCESS
;    1 - 99       HOLDER ERROR CODE
;    H_ERRSYSINT  SYSTEM SW INTERRUPT ERROR
;
PROC            IGETNXT

PUSH    AX
                PUSH    CX
                PUSH    DX
                PUSH    BX
                PUSH    DI
                PUSH    ES

PUSH    DS
                POP     ES
                MOV     AH,FN_IGETNEXT
                MOV     CX,BUF_SIZE
                MOV     DI,OFFSET TSRBUF
                INT     TSRINT
                CMP     CX,0
                JNE     IGN_BLK1
                MOV     [H_ISTAT],H_ERRNOTFOUND      ; DATA NOT STORED
                JMP     IGN_BLK2
IGN_BLK1:       MOV     AH,FN_ISTATUS                ; GET STATUS
                INT     TSRINT
                MOV     [H_ISTAT],AX
                MOV     [H_ISIZE],CX
                MOV     [H_ITYPE],DX
                MOV     [H_ILFUNC],BX

IGN_BLK2:       POP     ES
                POP     DI
                POP     BX
                POP     DX
                POP     CX
                POP     AX
                RET

ENDP            IGETNXT

;
; THIS PROCEDURE GETS THE NEXT BLOCK OF DATA FROM THE PUBLIC BUFFER
; WHICH CONFORMS TO THE CURRENT TYPE.
;
;
; THE FOLLOWING MUST SET BY THE CALLER:
;       NONE
;
```

```
;
; THE FOLLOWING ARE SET ON RETURN TO CALLER:
;
;       H_PSTATUS
;       H_PTYPE
;       H_PSIZE
;       H_PLFUNC
;
; POSSILBE STATUS HERE:
;
;   0              SUCCESS
;   1 - 99         HOLDER ERROR CODE
;   H_ERRSYSINT    SYSTEM SW INTERRUPT ERROR
;
PROC            PGETNXT

PUSH        AX
                PUSH        CX
                PUSH        DX
                PUSH        BX
                PUSH        DI
                PUSH        ES

PUSH        DS
                POP         ES
                MOV         AH,FN_GETNEXT
                MOV         CX,BUF_SIZE
                MOV         DI,OFFSET TSRBUF
                INT         TSRINT
                CMP         CX,0
                JNE         PGN_BLK1
                MOV         [H_PSTAT],H_ERRNOTFOUND     ; DATA NOT
STORED
                JMP         PGN_BLK2
PGN_BLK1:       MOV         AH,FN_STATUS               ; GET STATUS
                INT         TSRINT
                MOV         [H_PSTAT],AX
                MOV         [H_PSIZE],CX
                MOV         [H_PTYPE],DX
                MOV         [H_PLFUNC],BX

PGN_BLK2:       POP         ES
                POP         DI
                POP         BX
                POP         DX
                POP         CX
                POP         AX
                RET

ENDP            PGETNXT

;
```

```
; THIS PROCEDURE STORES THE SPECIFIED BLOCK OF DATA TO THE PRIVATE
BUFFER.
;
;
; THE FOLLOWING MUST SET BY THE CALLER:
;
;       H_ISIZE     SIZE OF ACTUAL TRANSFER (NOT BUFFER SIZE)
;       H_ITYPE
;       DATA        MUST RESIDE IN TSRBUF
;
; THE FOLLOWING ARE SET ON RETURN TO CALLER:
;
;       H_ISTATUS
;       H_ITYPE
;       H_ISIZE
;       H_ILFUNC
;
; POSSILBE STATUS HERE:
;
;   0              SUCCESS
;   1 - 99         HOLDER ERROR CODE
;   H_ERRSYSINT    SYSTEM SW INTERRUPT ERROR
;

PROC            IPUTBLK

PUSH        AX
                PUSH        CX
                PUSH        DX
                PUSH        BX
                PUSH        SI
                MOV         AH,FN_IPUTBLOCK
                MOV         CX,[H_ISIZE]
                MOV         DX,[H_ITYPE]
                MOV         SI,OFFSET TSRBUF
                ; DS IS ALREADY POINTING TO OUR DATA SEGMENT
                INT         TSRINT
                CMP         CX,0
                JNE         IP_BLK1
                MOV         [H_ISTAT],H_ERRNOTSTORED        ; DATA NOT
STORED
                JMP         IP_BLK2
IP_BLK1:        MOV         AH,FN_ISTATUS                   ; GET STATUS
                INT         TSRINT
                MOV         [H_ISTAT],AX
                MOV         [H_ISIZE],CX
                MOV         [H_ITYPE],DX
                MOV         [H_ILFUNC],BX

IP_BLK2:        POP         SI
                POP         BX
                POP         DX
                POP         CX
                POP         AX
```

```
                    RET
ENDP            IPUTBLK

;
; THIS PROCEDURE STORES THE SPECIFIED BLOCK OF DATA TO THE PUBLIC
BUFFER.
;
;
; THE FOLLOWING MUST SET BY THE CALLER:
;
;       H_PSIZE    SIZE OF ACTUAL TRANSFER (NOT BUFFER SIZE)
;       H_PTYPE
;       DATA       MUST RESIDE IN TSRBUF
;
; THE FOLLOWING ARE SET ON RETURN TO CALLER:
;
;       H_PSTATUS
;       H_PTYPE
;       H_PSIZE
;       H_PLFUNC
;
; POSSILBE STATUS HERE:
;
;       0          SUCCESS
;       1 - 99     HOLDER ERROR CODE
;       H_ERRSYSINT  SYSTEM SW INTERRUPT ERROR
;

PROC            PPUTBLK
                PUSH       AX
                PUSH       CX
                PUSH       DX
                PUSH       BX
                PUSH       SI
                MOV        AH,FN_PUTBLOCK
                MOV        CX,[H_PSIZE]
                MOV        DX,[H_PTYPE]
                MOV        SI,OFFSET TSRBUF
                ; DS IS ALREADY POINTING TO OUR DATA SEGMENT
                INT        TSRINT
                CMP        CX,0
                JNE        P_BLK1
                MOV        [H_PSTAT],H_ERRNOTSTORED    ; DATA NOT STORED
                JMP        P_BLK2
P_BLK1:         MOV        AH,FN_STATUS                ; GET STATUS
                INT        TSRINT
                MOV        [H_PSTAT],AX
                MOV        [H_PSIZE],CX
                MOV        [H_PTYPE],DX
```

```
                    MOV         [H_PLFUNC],BX
P_BLK2:             POP         SI
                    POP         BX
                    POP         DX
                    POP         CX
                    POP         AX
                    RET

ENDP                PPUTBLK

;
; THIS PROCEDURE CLEARS THE CURRENT BLOCK OF DATA IN THE PRIVATE
BUFFER.
;
;
; THE FOLLOWING MUST SET BY THE CALLER:
;
;       NONE
;
; THE FOLLOWING ARE SET ON RETURN TO CALLER:
;
;       H_ISTATUS
;       H_ITYPE
;       H_ISIZE
;       H_ILFUNC
;
; POSSILBE STATUS HERE:
;
;       0               SUCCESS
;       1 - 99          HOLDER ERROR CODE
;       H_ERRSYSINT     SYSTEM SW INTERRUPT ERROR
;

PROC                ICLRBLK
                    PUSH        AX
                    PUSH        CX
                    PUSH        DX
                    PUSH        BX

MOV         AH,FN_ICLEARBLOCK
                    INT         TSRINT
                    MOV         AH,FN_ISTATUS           ; GET STATUS
                    INT         TSRINT
                    MOV         [H_ISTAT],AX
                    MOV         [H_ISIZE],CX
                    MOV         [H_ITYPE],DX
                    MOV         [H_ILFUNC],BX

POP         BX
                    POP         DX
```

```
                    POP     CX
                    POP     AX
                    RET

ENDP            ICLRBLK

;
; THIS PROCEDURE CLEARS THE CURRENT BLOCK OF DATA IN THE PUBLIC
BUFFER.
;
;
; THE FOLLOWING MUST SET BY THE CALLER:
;
;       NONE
;
; THE FOLLOWING ARE SET ON RETURN TO CALLER:
;
;       H_PSTATUS
;       H_PTYPE
;       H_PSIZE
;       H_PLFUNC
;
; POSSILBE STATUS HERE:
;
;   0               SUCCESS
;   1 - 99          HOLDER ERROR CODE
;   H_ERRSYSINT     SYSTEM SW INTERRUPT ERROR
;

PROC            PCLRBLK
                    PUSH    AX
                    PUSH    CX
                    PUSH    DX
                    PUSH    BX
                    MOV     AH,FN_CLEARBLOCK
                    INT     TSRINT
                    MOV     AH,FN_STATUS            ; GET STATUS
                    INT     TSRINT
                    MOV     [H_PSTAT],AX
                    MOV     [H_PSIZE],CX
                    MOV     [H_PTYPE],DX
                    MOV     [H_PLFUNC],BX

POP     BX
                    POP     DX
                    POP     CX
                    POP     AX
                    RET
ENDP            PCLRBLK
```

- 61 -

```
;
; THIS PROCEDURE GETS THE STATUS OF THE LAST OPERATION ON DATA IN
THE PRIVATE
; BUFFER.
;
; THE FOLLOWING MUST SET BY THE CALLER:
;
;     NONE
;
; THE FOLLOWING ARE SET ON RETURN TO CALLER:
;
;     H_ISTATUS
;     H_ITYPE
;     H_ISIZE
;     H_ILFUNC
;
; POSSILBE STATUS HERE:
;
;   0              SUCCESS
;   1 - 99         HOLDER ERROR CODE
;   H_ERRSYSINT    SYSTEM SW INTERRUPT ERROR
;

PROC              ISTAT
                  PUSH    AX
                  PUSH    CX
                  PUSH    DX
                  PUSH    BX
                  MOV     AH,FN_ISTATUS
                  INT     TSRINT
                  MOV     [H_ISTAT],AX
                  MOV     [H_ISIZE],CX
                  MOV     [H_ITYPE],DX
                  MOV     [H_ILFUNC],BX
                  POP     BX
                  POP     DX
                  POP     CX
                  POP     AX
                  RET

ENDP              ISTAT

;
; THIS PROCEDURE GETS THE STATUS OF THE LAST OPERATION ON DATA IN
THE PUBLIC
; BUFFER.
;
; THE FOLLOWING MUST SET BY THE CALLER:
;
;     NONE
;
; THE FOLLOWING ARE SET ON RETURN TO CALLER:
```

```
;       H_PSTATUS
;       H_PTYPE
;       H_PSIZE
;       H_PLFUNC
;
; POSSILBE STATUS HERE:
;
;       0               SUCCESS
;       1 - 99           HOLDER ERROR CODE
;       H_ERRSYSINT     SYSTEM SW INTERRUPT ERROR
;

PROC            PSTAT

PUSH    AX
                PUSH    CX
                PUSH    DX
                PUSH    BX
                MOV     AH,FN_STATUS
                INT     TSRINT
                MOV     [H_PSTAT],AX
                MOV     [H_PSIZE],CX
                MOV     [H_PTYPE],DX
                MOV     [H_PLFUNC],BX
                POP     BX
                POP     DX
                POP     CX
                POP     AX
                RET

ENDP            PSTAT

;
; THIS PROCEDURE GETS THE STATUS OF THE LAST OPERATION ON DATA IN THE PUBLIC
; BUFFER.
;
; THE FOLLOWING MUST SET BY THE CALLER:
;
;       NONE
;
; THE FOLLOWING ARE SET ON RETURN TO CALLER:
;
;       H_ISTATUS
;       H_ITYPE
;       H_ISIZE
;       H_ILFUNC
;
; POSSILBE STATUS HERE:
;
```

```
;       0               SUCCESS
;       1 - 99          HOLDER ERROR CODE
;       H_ERRSYSINT     SYSTEM SW INTERRUPT ERROR
;

PROC            IRST

PUSH            AX
                PUSH            CX
                PUSH            DX
                PUSH            BX
                MOV             AH,FN_IRESET
                INT             TSRINT
                MOV             AH,FN_ISTATUS
                INT             TSRINT
                MOV             [H_PSTAT],AX
                MOV             [H_PSIZE],CX
                MOV             [H_PTYPE],DX
                MOV             [H_PLFUNC],BX
                POP             BX
                POP             DX
                POP             CX
                POP             AX
                RET

ENDP            IRST

;
; THIS PROCEDURE CHECKS FOR THE PRESENCE OF THE HOLDER TSR.
;
; THE FOLLOWING MUST SET BY THE CALLER:
;
;       NONE
;
; THE FOLLOWING ARE SET ON RETURN TO CALLER:
;
;       H_ISTATUS
;       H_ITYPE
;       H_ISIZE
;       H_ILFUNC
;
; POSSILBE STATUS HERE:
;
;   0               SUCCESS
;   1 - 99          HOLDER ERROR CODE
;   H_ERRSYSINT     SYSTEM SW INTERRUPT ERROR
;

PROC            PCHKTSR
```

```
                    PUSH      AX
                    PUSH      CX
                    PUSH      DX
                    PUSH      BX
;
; CHECK FOR THE PRESENCE AND OPERATION OF HOLDER TSR
;
                    PUSH      ES
                    PUSH      DI
                    XOR       AX,AX
                    MOV       ES,AX
                    MOV       AX,TSRINT           ; CHECK FOR PRESENCE
OF HOLDER
                    MOV       CX,4                ; INT - IF 0, NOT
INSTALLED
                    MUL       CX
                    ADD       AX,2                ; LOOK AT SEGMENT
                    MOV       DI,AX
                    MOV       AX,[ES:DI]
                    POP       DI
                    POP       ES
                    CMP       AX,0
                    JNE       TCHK1               ; SOMETHING IS
INSTALLED
                    MOV       [H_PSTAT],H_ERRNOTSR ; NO TSR HERE
                    JMP       TCHK3
TCHK1:              MOV       AH,FN_SIGNATURE     ; GET
TSR SIGNATURE AND VERSION
                    INT       TSRINT
                    CMP       CX,6996
                    JE        TCHK2               ; IT IS OUR TSR
                    MOV       [H_PSTAT],H_ERRNOTSR ; NOT OUR TSR
                    JMP       TCHK3
TCHK2:              MOV       AH,FN_ISTATUS
                    INT       TSRINT
                    MOV       [H_PSTAT],AX
                    MOV       [H_PSIZE],CX
                    MOV       [H_PTYPE],DX
                    MOV       [H_PLFUNC],BX
TCHK3:              POP       BX
                    POP       DX
                    POP       CX
                    POP       AX
                    RET

ENDP                PCHKTSR

ENDS

SEGMENT             ZSEG
ENDS                ZSEG
```

END     PROGRAMSTART

```
; THIS IS THE PARAMETER BLK FOR EXECUTING A DOS CMD
;

; PAR_BLK           EQU         $
PAR_BLK             DW          0
PAR_CMD             DW              OFFSET CMD_TAIL
            DW          SEG CMD_TAIL
            DW          OFFSET FCB1
            DW          SEG FCB1
            DW          OFFSET FCB2
            DW          SEG FCB2
;           DD          -1
;           DD          -1

;
; EXBUF CONTAINS THE FINAL PROGRAM STRING TO SPAWN.
; THIS IS NEEDED ALONG WITH ERRTRIES SO WE CAN TRY TO FIND THE PROGRAM
; ALONG DIFFERENT PATHS TO LAUNCH IT WITHOUT FAILURE.
;

EXBUF               DB          BUF_SIZE DUP(0)

;
; TSRBUF CONTAINS INFORMATION FROM HOLDER
;

TSRBUF              DB          BUF_SIZE DUP (0)
;
; THESE ARE THE EQUIVALENT OF THE HLD STRUCTURE IN HOLDERIF.H
;

; PRIVATE

H_ISTAT             DW          0                   ; HOLDER STATUS
H_ISIZE             DW          0                   ; ACTUAL DATA SIZE
H_ITYPE             DW          0                   ; DATA TYPE
H_ILFUNC    DW          0                           ; LAST FUNCTION

; PUBLIC

H_PSTAT             DW          0                   ; HOLDER STATUS
H_PSIZE             DW          0                   ; ACTUAL DATA SIZE
H_PTYPE             DW          0                   ; DATA TYPE
H_PLFUNC    DW          0                           ; LAST FUNCTION

;
; THESE ARE FOR HANDLING THE COM DRIVER - BOTH COM1 AND COM2
;
```

```
DEVNM1          DB          'ASY1',0
HANDLE1         DW          0

DEVNM2          DB          'ASY2',0
HANDLE2         DW          0

H_ERRNOTSR      EQU         100                     ; NO HOLDER TSR
FOUND
H_ERRSYSINT     EQU         101                     ; SYSTEM SW INT
ERROR
H_ERRNOTFOUND   EQU         102                     ; DATA NOT
FOUND
H_ERRNOTSTORED  EQU         103                     ; DATA NOT
STORED

STDIN           EQU         0
STDOUT          EQU         1
STDERR          EQU         2

BLANK           EQU         20H
LESC            EQU         01BH

MAXTRIES        EQU         2                       ; MAX SEARCH
ALGORITHMS FOR
                                                    ; A PROGRAM PATH TO
SPAWN

ENDS            DATA

SEGMENT                     CODE        'CODE'
                ASSUME      CS:CODE, DS:DATA
PROGRAMSTART:
                MOV         AX,DATA                 ; AT ENTRY DS
= ES = PSP
                MOV         DS,AX                   ; DS = OUR DATA
SEG
                MOV         AX,[ES:002CH]           ; GET AND SAVE
SEGMENT OF
                MOV         [ENV_SEG],AX            ; ENVIRONMENT
BLOCK FROM PSP
;
; DETERMINE IF CMD LINE ARG FOR USER-DEFINED PROGRAM NAME
;
                MOV         AL,[ES:0080H]           ; LENGTH OF CMD
LINE STRING
                CMP         AL,0                    ; ANYTHING THERE?
                JE          PSTRT1                  ; NO
;
; CHECK FOR PROPER FORMAT: -S PROGRAM NAME
;
                MOV         AL,[ES:0081H]           ; SHOULD BE A
```

```
                SPACE
                        CMP     AL,' '
                        JNE     PSTRT1
                        MOV     AL,[ES:0082H]           ; SHOULD BE A
'-'
                        CMP     AL,'-'
                        JNE     PSTRT1
                        MOV     AL,[ES:0083H]           ; SHOULD BE AN
's'
                        CMP     AL,'s'
                        JNE     PSTRT1
                        MOV     AL,[ES:0084H]           ; SHOULD BE A
SPACE
                        CMP     AL,' '
                        JNE     PSTRT1
;
; ASSUME WE NOW A VALID PROGRAM NAME AND IT IS IN THE CURRENT
DIRECTORY
;
                        PUSH    DI
                        PUSH    SI
                        PUSH    CX
                        PUSH    BX
                        PUSH    DS
                        PUSH    ES
                        MOV     SI,0085H                ; START OF PROG NAME
                        MOV     DI,OFFSET UPNAME
                        MOV     CX,0
                        MOV     CL,[ES:0080H]           ; STRING LENGTH
                        SUB     CL,4                    ; REMOVE THE -s
                        MOV     AX,ES                   ; DS:SI POINTS TO
NAME IN
                        MOV     BX,DS                   ; PSP AND ES:DI
POINTS TO
                        MOV     DS,AX                   ; DESTINATION
STRING
                        MOV     ES,BX
                        CLD
                        REP     MOVSB                   ; COPY TO UPNAME

POP     ES
                        POP     DS
                        POP     BX
                        POP     CX
                        POP     SI
                        POP     DI
                        MOV     [UPFLG],1               ; SET USER DEFINE
FLAG
                        JMP     PSTRT2
PSTRT1:                 MOV     [UPFLG],0               ; NO USER
DEFINES

;
```

- 69 -

```
; RELEASE UNEEDED MEMORY:
;
;   ES = SEGMENT PSP AND BX = PARAGRAPHS NEEDED
;   FUNCTION 4AH = MODIFY MEMORY BLOCK
;

PSTRT2:           MOV       AX,ES
         MOV      BX,ZSEG
         SUB      BX,AX

MOV      AH,4AH
         INT      21H
         JNC      SHELL1                     ; CONTINUE IF SUCCESSFUL
         MOV      DX,OFFSET MSG1             ; OTHERWISE, ERROR AND EXIT
         MOV      CX,[M1_LENGTH]
         JMP      SHELL4
SHELL1:           CALL      GET_COMSPEC      ; GET FILE SPEC FOR COMMAND.COM
         JNC      SHELL2                     ; CONTINUE IF SUCCESSFUL
         MOV      DX,OFFSET MSG3             ; OTHERWISE, ERROR AND EXIT
         MOV      CX,[M3_LENGTH]
         JMP      SHELL4
;
; CHECK FOR THE PRESENCE AND OPERATION OF HOLDER TSR
;
SHELL2:           CALL      PCHKTSR
         MOV      AX,[H_PSTAT]
         CMP      AX,H_ERRNOTSR
         JNE      SHELL2A
         MOV      DX,OFFSET MSG4             ; OTHERWISE, ERROR AND EXIT
         MOV      CX,[M4_LENGTH]
         JMP      SHELL4

SHELL2A:    MOV       AX,@DATA
            MOV       DS,AX
            MOV       ES,AX

MOV       [EXECERRFLG],0

MOV       AX,OFFSET PROMPT_LEN
            MOV       BX,OFFSET PROMPT
            SUB       AX,BX
            MOV       [PT_LENGTH],AX

MOV       AX,OFFSET INP_LEN
            MOV       BX,OFFSET INP_BUF
            SUB       AX,BX
            MOV       [INPB_LENGTH],AX
```

```
                        MOV         AX,OFFSET INP_LEN
                        MOV         BX,OFFSET CMD_TAIL
                        SUB         AX,BX
                        MOV         [CT_LENGTH],AX
;
; GET AND STORE THE CURRENT DIRECTORY SO WE CAN RETURN TO IT AS
NECESSARY
;
SHELL2B:                MOV         AH,19H                              ; GET
DEFAULT DRIVE
                        INT         21H
                        MOV         [CUR_DRIVE],AL
                        MOV         AH,47H                              ; GET
CURRENT DIRECTORY
                        MOV         SI,OFFSET CUR_DIR
                        MOV         DL,0                                ; DEFAULT
DRIVE
                        INT         21H
;
; ADD 'D:\' TO FRONT OF CUR_DIR - WHERE D: IS CURRENT DRIVE LETTER
;
                        PUSH        SI
                        PUSH        DI
                        PUSH        CX
                        PUSH        BX
                        PUSH        ES

PUSH        DS
                        POP         ES

MOV         AX,OFFSET CUR_DIR
                        ADD         AX,[DIR_LEN]
                        SUB         AX,1
                        MOV         SI,AX
                        MOV         DI,SI
                        INC         DI
                        INC         DI
                        INC         DI
                        MOV         CX,[DIR_LEN]
                        STD
                        REP         MOVSB
                        MOV         AL,[CUR_DRIVE]
                        ADD         AL,'A'
                        MOV         BX,0
                        MOV         [CUR_DIR+BX],AL
                        INC         BX
                        MOV         AL,':'
                        MOV         [CUR_DIR+BX],AL
                        INC         BX
                        MOV         AL,'\'
                        MOV         [CUR_DIR+BX],AL

;
```

- 71 -

```
; NOW THAT CUR_DIR IS SET, DO DEF_DIR TO ALWAYS FIND DEFAULT
PROGRAM TO
; SPAWN.  FIRST LOOK IN ENVIRONMENT FOR 'NSCTOOL='. IF NOT FOUND,
USE
; CONTENTS OF CUR_DIR.
;
                    PUSH    DS
                    PUSH    SI
                    PUSH    ES
                    PUSH    DI
                    PUSH    DX
                    PUSH    CX

;
; NEED SEGMENT ADDR OF OUR PSP
;
;                   MOV     AH,62H
;                   INT     21H                     ; BX CONTAINS SEG
OF PSP
                    MOV     BX,[ENV_SEG]
                    MOV     ES,BX
                    XOR     DI,DI
                    MOV     AX,OFFSET DPVAR
                    MOV     SI,AX
                    MOV     CX,[DPVAR_SZ]
                    MOV     AX,SEG DPVAR
                    MOV     DS,AX
;
; NOW, ES:DI POINTS TO ENVIRONMENT VARS IN PSP AND DS:SI POINTS TO
; ENV VARIABLE NAME WE ARE LOOKING FOR.  LOOP THROUGH ENV VARS
; DOING STRING COMPARES UNTIL WE EITHER FIND THE VARIABLE OR END OF
; ENV VARS.
;
DEF01:
                    MOV     BX,0
DEF02:              MOV     AL,[ES:DI]
                    CMP     BYTE PTR DS:[SI+BX],AL
                    JNE     DEF03                   ; NO MATCH, FIND
END OF VAR
                                                    ; AND START NEXT
COMPARE
                    INC     DI
                    INC     BX
                    CMP     BX,CX
                    JE      DEF06                   ; FOUND MATCH
                    JMP     DEF02

DEF03:              CMP     BYTE PTR ES:[DI],0
                    JE      DEF04                   ; END OF ENV
VARIABLE
                    INC     DI                      ; KEEP GOING
```

```
                JMP     DEF03
DEF04:          INC     DI                      ; NEXT CHAR AFTER 0
                CMP     BYTE PTR ES:[DI],0
                JNE     DEF05
                INC     DI
DEF05:          CMP     BYTE PTR ES:[DI],1      ; ANY MORE ENV VARS?
                JNE     DEF01                   ; YES, KEEP GOING
                JMP     DEF09                   ; NO, USE CURDIR
;
; FOUND MATCH, COPY CONTENTS OF ENV VAR TO OUR PROGRAM PATH AND
; UPDATE LENGTH TO LATER ADD PROGRAM NAME.  WE ARE NOW AT THE END
; OF THE ENVIRONMENT VAR AND AT START OF VALID DATA, COPY UNTIL
; NULL TERMINATION.  AT THIS POINT, ES:DI POINTS TO OUR DATA.
;
DEF06:          MOV     BX,0
DEF07:          MOV     AL,[ES:DI]
                CMP     AL,0                    ; FOUND MATCH
                JE      DEF08                   ; NULL TERMINATION?
                MOV     [DEF_DIR+BX],AL         ; DONE
                INC     BX
                INC     DI
                JMP     DEF07

DEF08:          POP     CX                      ; CLEAR STACK
                POP     DX
                POP     DI
                POP     ES
                POP     SI
                POP     DS
                MOV     [DEF_LEN],BX
                DEC     BX
                MOV     AL,'\'
                CMP     [DEF_DIR+BX],AL
                JE      FIND01                  ; LAST CHAR IS ALREADY '\'
                INC     BX
                MOV     [DEF_DIR+BX],AL         ; ADD FINAL '\'
                MOV     [DEF_LEN],BX
                JMP     FIND01                  ; NOW ADD PROGRAM NAME

DEF09:                  ; COPY CUR_DIR TO DEF_DIR - COULDN'T FIND 'NSCTOOL='
                ;
                POP     CX                      ; CLEAR STACK
                POP     DX
                POP     DI
                POP     ES
```

```
                        POP     SI
                        POP     DS

PUSH    DS
                        PUSH    SI
                        PUSH    ES
                        PUSH    DI
                        MOV     SI,OFFSET CUR_DIR
                        MOV     CX,[DIR_LEN]
                        MOV     DI,OFFSET DEF_DIR
                        MOV     AX,SEG DEF_DIR
                        MOV     ES,AX
                        MOV     AX,SEG CUR_DIR
                        MOV     DS,AX
                        CLD
                        REP     MOVSB
                        POP     DI
                        POP     ES
                        POP     SI
                        POP     DS
                        MOV     AX,[DIR_LEN]
                        MOV     [DEF_LEN],AX

;
; FIND TRUE END OF DEF_DIR
;
                        MOV     BX,0
                        MOV     AL,0
DEF10:                  CMP     [DEF_DIR+BX],0
                        JE      DEF11
                        INC     BX
                        JMP     DEF10

DEF11:                  MOV     [DEF_LEN],BX
                        DEC     BX
                        MOV     AL,'\'
                        CMP     [DEF_DIR+BX],AL

JE      FIND01                  ; LAST CHAR IS
ALREADY '\'

INC     BX                      ; ADD FINAL '\'
                        MOV     [DEF_DIR+BX],AL
                        .MOV    [DEF_LEN],BX
                        JMP     FIND01                  ; NOW ADD PROGRAM
NAME

;
; BUILD FULL PATH AND PPNAME INTO PNAME. AT THIS POINT DEF_DIR CONTAINS
; PROPER PATH AND FINAL '\'.  BX CONTAINS PROPER LENGTH OF PATH.
;

FIND01:                 MOV     AX,SEG PNAME
```

```
                    MOV     ES,AX
                    MOV     DI,OFFSET PNAME
                    MOV     SI,OFFSET DEF_DIR
                    MOV     AX,SEG DEF_DIR
                    MOV     DS,AX
                    MOV     CX,BX
                    INC     CX
                    CLD
                    REP     MOVSB

MOV     DI,OFFSET PNAME
                    ADD     DI,BX
                    INC     DI
                    MOV     AX,[UPFLG]
                    CMP     AX,0
                    JE      FIND3A

MOV     SI,OFFSET UPNAME        ; USER NAME
                    MOV     CX,15
                    CLD
                    REP     MOVSB

JMP     FIND3B

FIND3A:             MOV     SI,OFFSET DPNAME        ; DEFAULT NAME
                    MOV     CX,11                   ; LENGTH OF NSCMENU.EXE
                    CLD
                    REP     MOVSB

FIND3B:

;
; FIND THE TRUE LENGTH OF PNAME.
;
                    MOV     BX,0
FIND3AA:            CMP     [PNAME+BX],0
                    JE      FIND3AB
                    INC     BX
                    JMP     FIND3AA
FIND3AB:            MOV     [DPNAME_SIZE],BX

POP     ES
                    POP     BX
                    POP     CX
                    POP     DI
                    POP     SI

;
; OPEN COM PORTS AND STORE THE FILE HANDLES AS DATA TYPES COM1_TYPE AND
; COM2_TYPE IN HOLDER'S PUBLIC SLOTS.
```

```
;
        MOV     DX,OFFSET DEVNM1
        MOV     AX,3D02H              ; OPEN COM1 FOR READ/WRITE
        INT     21H
        MOV     [HANDLE1],AX
        JNC     DOCOM2                ; CARRY FLG SET ON ERROR

MOV     DX,OFFSET MSG20       ; OTHERWISE, ERROR AND EXIT
        MOV     CX,[M20_LENGTH]
        JMP     SHELL4

;
; OPEN COM2
;

DOCOM2:    MOV     DX,OFFSET DEVNM2
        MOV     AX,3D02H              ; OPEN COM2 FOR READ/WRITE
        INT     21H
        MOV     [HANDLE2],AX
        JNC     DOCOM3                ; CARRY FLG SET ON ERROR

MOV     DX,OFFSET MSG21       ; OTHERWISE, ERROR AND EXIT
        MOV     CX,[M21_LENGTH]
        JMP     SHELL4

;
; STORE HANDLE IN HOLDER PUBLIC AREA
;

DOCOM3:

PUSH    DS
        PUSH    SI
        PUSH    CX
        PUSH    DX

;
; STORE COM1 HANDLE IN HOLDER
;
        MOV     DX,COM1_TYPE
        PUSH    ES
        PUSH    DI
        MOV     SI,OFFSET HANDLE1
        MOV     DI,OFFSET TSRBUF
        PUSH    DS
        POP     ES
        MOV     CX,2
        REP     MOVSB
```

- 76 -

```
                POP        DI
                POP        ES
                MOV        CX,2
                MOV        SI,OFFSET HANDLE1
                MOV        [H_PSIZE],CX
                MOV        [H_PTYPE],DX
                CALL       PPUTBLK

POP        DX
                POP        CX
                POP        SI
                POP        DS

MOV        AX,[H_PSTAT]
                CMP        AX,H_ERRNOTSTORED       ; NOT STORED
                JNE        DOCOM4

MOV        DX,OFFSET MSG20         ; OTHERWISE, ERROR
        AND EXIT
                MOV        CX,[M20_LENGTH]
                JMP        SHELL4

DOCOM4:
                PUSH       DS
                PUSH       SI
                PUSH       CX
                PUSH       DX

MOV        DX,COM2_TYPE
                PUSH       ES
                PUSH       DI
                MOV        SI,OFFSET HANDLE2
                MOV        DI,OFFSET TSRBUF
                PUSH       DS
                POP        ES
                MOV        CX,2
                REP        MOVSB
                POP        DI
                POP        ES
                MOV        CX,2
                MOV        SI,OFFSET HANDLE2
                MOV        [H_PSIZE],CX
                MOV        [H_PTYPE],DX
                CALL       PPUTBLK

POP        DX
                POP        CX
                POP        SI
                POP        DS

MOV        AX,[H_PSTAT]
                CMP        AX,H_ERRNOTSTORED       ; NOT STORED
```

- 77 -

```
              JNE       MAIN1
        MOV       DX,OFFSET MSG21                  ; OTHERWISE, ERROR
AND EXIT
        MOV       CX,[M21_LENGTH]
        JMP       SHELL4

;
; MAIN LOOP OF COMMAND INTERPRETER
;

MAIN1:            MOV       CX,0
                  CALL      GET_HLDR

;
; RESTORE OUR DIRECTORY
;
              MOV       AH,0EH                        ; SET
DEFAULT DRIVE
              MOV       DL,[CUR_DRIVE]
              INT       21H
              MOV       AH,3BH                        ; SET
CURRENT DIRECTORY
              MOV       DX,OFFSET CUR_DIR
              INT       21H
;
; CLEAR THE PUBLIC AND PRIVATE HOLDER BUFFERS
;

CALL      IRST

;
; CLOSE COM PORTS
;
              MOV       BX,[HANDLE1]
              MOV       AH,3EH
              INT       21H

MOV       AX,4C00H                      ; EXIT FOR NOW
              INT       21H

SHELL4:           MOV       BX,STDERR                 ; ERROR
HANDLER
              MOV       AH,40H
              INT       21H
              MOV       AX,4C01H
              INT       21H
```

- 78 -

```
STK_SEG              DW        0
STK_PTR              DW        0

;
; THIS PROCEDURE IS THE SHELL LOOP
;

PROC          KSHELL
              MOV       DX,OFFSET MSG51              ; COPYRIGHT NOTICE
              MOV       CX,[M51_LENGTH]
              MOV       BX,STDERR
              MOV       AH,40H
              INT       21H
KSHELL1:      MOV       AX,[EXITFLG]
              CMP       [EXITFLG],1
              JE        KSHELL2
              MOV       AX,[RETFLG]                  ; SET BY RET CMD TO RETURN
              CMP       [RETFLG],1                   ; TO NORMAL LOOP ON HOLDER
              JE        KSHELL2
              CALL      GET_CMD                      ; GET CMD FROM USER
              CALL      INT_CMD                      ; IF INT_CMD CMD, PROCESS
              JNC       KSHELL1
              CMP       [EXECERRFLG],1               ; EXEC ERROR ?
              JE        KSHELL2                      ; YES, RETURN
              CALL      EXT_CMD                      ; PASS ON TO DOS SHELL
              CMP       [EXECERRFLG],1               ; EXEC ERROR ?
              JE        KSHELL2                      ; YES, RETURN
              JMP       KSHELL1
KSHELL2:      MOV       [EXITFLG],0                  ; DON'T EXIT FROM WHOLE THING
              RET
ENDP          KSHELL

;
; THIS PROCEDURE HANDLES OUR BUILT-IN COMMANDS
;
; ON RETURN, THE CARRY FLAG IS SET FALSE IF MATCH IN CMD TABLE FOUND,
; AND FALSE IF NOT (WHICH MEANS WE PASS CMD ON TO DOS SHELL).
;

PROC          INT_CMD
              MOV       SI,OFFSET COMMANDS           ; START OF CMD TABLE
INTR1:        CMP       [BYTE SI],0                  ; END OF CMD TABLE?
```

```
                JE      INTR7                   ; YES
                MOV     DI,OFFSET INP_BUF       ; NO, DI IS ADDR OF
USER INPUT
INTR2:          CMP     [BYTE DI],BLANK         ; SKIP
SPACES
                JNE     INTR3
                INC     DI
                JMP     INTR2
INTR3:          MOV     AL,[SI]                 ; GET
NEXT CHAR
                OR      AL,AL                   ; END OF STRING?
                JZ      INTR4                   ; YES, GOOD MATCH
                CMP     AL,[DI]                 ; CMP TO NEXT
USER CHAR
                JNZ     INTR6                   ; NO MATCH, END
OF SEARCH
                INC     SI                      ; CONTINUE TO NEXT
CHARS
                INC     DI
                JMP     INTR3
INTR4:          CMP     [BYTE DI],CR            ; MAKE GOOD
STRING IS SAME
                JE      INTR5                   ; LENGTH - IF LAST
CHAR IS
                CMP     [BYTE DI],BLANK         ; CR OR SPACE,
IT IS GOOD
                JNE     INTR6                   ; ELSE NO MATCH
INTR5:          CALL    [WORD SI+1]             ; EXECUTE
GOOD MATCH
                CMP     [EXECERRFLG],1          ; EXEC ERR SET
?
                JNE     INTR5A                  ; NO RETURN GOOD
STATUS
                STC                             ; CLEAR CARRY FOR
ERROR
                RET                             ; AND RETURN
INTR5A:         CLC                             ; SET CARRY AND
RETURN
                RET
INTR6:          LODSB                           ; NEXT TABLE
ELEMENT
                OR      AL,AL
                JNZ     INTR6
                ADD     SI,2
                JMP     INTR1                   ; CONTINUE SEARCH
INTR7:          STC                             ; CLEAR CARRY
FOR NO MATCH
                RET                             ; AND RETURN
ENDP            INT_CMD
;
; THIS PROCEDURE IS CALLED WHEN NO MATCH IN COMMAND TABLE IN
INT_CMD
; ROUTINE. NOW WE PASS IT ON TO DOS WITH A '/C' PARAMETER.
```

```
;
PROC            EXT_CMD
                MOV         AL,CR                           ; FIND
LENGTH OF CMD
                MOV         CX,[CT_LENGTH]                  ; BY
SCANNING FOR CR
                MOV         DI,OFFSET CMD_TAIL+1
                CLD
                REPNZ       SCASB
                MOV         AX,DI                           ;
CALCULATE LENGTH OF
                SUB         AX,OFFSET CMD_TAIL+2            ; CMD
TAIL WITHOUT CR
                MOV         [CMD_TAIL],AL
                MOV         [PAR_CMD],OFFSET CMD_TAIL       ;
STORE IN FAKE AREA TO
                CALL        EXEC                            ; PASS IT
ON TO DOS
EXT_CMD1:       RET
ENDP            EXT_CMD

;
; THIS ROUTINE IS LIKE EXT_CMD EXCEPT THAT IT GETS ITS INPUT FROM
; THE HOLDER TSR'S BUFFER AREA.  WE KNOW BY NOW THAT HOLDER IS
ACTIVE.
;

PROC            GET_HLDR
                PUSH        DS
                PUSH        ES
                PUSH        CX
                PUSH        DX
                PUSH        BX
GH1:            MOV         AX,[SHFLG]                      ; CHECK FOR
CTRL-C FLG
                CMP         AX,1                            ; IF SET, EXECUTE
THE SHELL
                JNE         GH2                             ; ELSE CONTINUE
                CALL        KSHELL
                CMP         [EXECERRFLG],1     ; EXEC ERROR ?
                JE          GETHLDR99          ; YES, EXIT
                MOV         AX,0
                MOV         [SHFLG],AX                      ; CLEAR SHELL FLAG
                MOV         [RETFLG],AX                     ; CLEAR RETFLG
GH2:            MOV         AX,[EXITFLG]                    ; CHECK FOR
EXIT FLAG
                CMP         AX,1
;               JNE         GH2A
                JNE         GH1A
```

```
              JMP        GETHLDR99              ; EXIT IF SET BY
SHELL EXIT
;
; CHECK THE DATA TYPE -- IF TYPE 0, IT IS NOTHING (PROBABLY MISTYPE
FROM USER)
;                       -- IF TYPE 1, IT IS A PROGRAM TO SPAWN
;                       -- IF TYPE 2, IT IS A COMMAND (EXIT OR SHELL)
;                       -- IF TYPE 9, IT IS A DIY COMMAND
;                             THE DIY (DO IT YOURSELF) COMMAND IS
NECESSARY
;                          BECAUSE IF THE KERNEL SPAWNS A PROGRAM
(SUCH
;                          AS A BATCH FILE) WHICH IN TURN SPAWNS A
PROGRAM
;                             WHICH RETRIEVES THE COM DRIVER FILE
HANDLES FROM
;                             HOLDER AS PLACED BY THE KERNEL, THE
HANDLES WILL
;                          BE INVALID.  THE DIY COMMAND INDICATES TO
THE
;                          APPLICATION TO OPEN THE DRIVER AND CLOSE
IT ON
;                          EXIT.  THE APPLICATION SHOULD NOT DELETE
THE
;                          DIY MESSAGE BECAUSE THE KERNEL NEEDS TO
REFRESH
;                          ITS OWN HANDLES WHEN IT GETS CONTROL AND
THEN IT
;                          ALONE REMVOES THE DIY MESSAGE.
;
;                       -- IF TYPE 10, IT IS DEFAULT PROG ARGUMENT
;                             THIS IS USED TO PROVIDE A RECURRING
ARGUMENT
;                          WHEN SPAWNING THE DEFAULT PROGRAM.
;
;                          NOTE THAT DATA TYPES 11 AND 12 HAVE THE
SAME
;                          PRIORITY AS CRON-ORIGINATED DATA THAT IS
;                          TIME-SENSITIVE.  THE KERNEL SHOULD SEARCH
;                          FOR THESE BEFORE DOING ANYTHING ELSE.
;
;                       -- IF TYPE 11, IT IS A CRON-ORIGINATED
PROGRAM
;                          TO SPAWN AND GETS PRIORITY OVER ANYTHING
ELSE.
;
;                       -- IF TYPE 12, IT IS A CRON-ORIGINATED
COMMAND
;                          AND GETS PRIORITY OVER ANYTHING ELSE.
;
; NOTE THAT THE ORDER IN WHICH SEARCHING IS DONE IS IMPORTANT.
COMMANDS
```

```
; ARE CHECKED FIRST, FOLLOWED BY PROGRAMS TO SPAWN.  IN GENERAL, AS NEW
; DATA TYPES ARE ADDED, PROGRAMS TO SPAWN WILL REMAIN THE LAST ITEM TO
; CHECK.
;

GH1A:           MOV     [H_ITYPE],ARG_TYPE
                CALL    IGETBLK
                MOV     AX,[H_ISTAT]
                CMP     AX,H_ERRNOTFOUND        ; IF NOT FOUND,
                JE      GH2A                    ; CHECK FOR NEXT
DATA TYPE
                PUSH    BX
                MOV     BX,[H_ISIZE]
                MOV     CX,BX
                INC     CX
                MOV     [DPARG_SIZE],CX         ; STORE LENGTH FOR
LATER
                MOV     [TSRBUF+BX],0           ; TERMINATE
STRING
                POP     BX

;
; NEED TO STORE THIS PERMANENTLY AS VALID ARGUMENT TO DEFAULT PROG TO
; SPAWN.  THEN GO ON TO SPAWN THE DEFAULT.  COPY TSRBUF TO DPARG.
; CX NOW CONTAINS LENGTH OF ARGS.
;
                PUSH    ES
                PUSH    SI
                PUSH    DI
                MOV     AX,DS
                MOV     ES,AX
                MOV     DI,OFFSET DPARG
                MOV     SI,OFFSET TSRBUF
                CLD
                REP     MOVSB
                POP     DI
                POP     SI
                POP     ES
                CALL    ICLRBLK                 ; CLEAR THE
TSR DATA BLOCK
;               JMP     GH3

JMP     GH2B                    ; JUST RESPAWN DEFAULT
PROGRAM

;
; CHECK FOR CRON-ORIGINATED CMD-TYPE FIRST
;

GH2A:           MOV     [H_ITYPE],CCMD_TYPE     ; CHECK
FOR DATA TYPE 12
```

```
                    CALL        IGETBLK
                    MOV         AX,[H_ISTAT]
                    CMP         AX,H_ERRNOTFOUND        ; IF NOT FOUND,
                    JE          GH2A1                   ; CHECK FOR
PROGRAM TO SPAWN
                    PUSH        BX
                    MOV         BX,[H_ISIZE]
                    MOV         [TSRBUF+BX],0           ; TERMINATE
STRING
                    POP         BX
                    CALL        ICLRBLK                 ; CLEAR THE
TSR DATA BLOCK
                    JMP         GH3

GH2A1:              MOV         [H_ITYPE],CPROG_TYPE    ; ELSE, CHECK
FOR TYPE 11
                    CALL        IGETBLK
                    PUSH        BX
                    MOV         BX,[H_ISIZE]
                    MOV         [TSRBUF+BX],0           ; TERMINATE
STRING
                    POP         BX
                    MOV         AX,[H_ISTAT]
                    CMP         AX,H_ERRNOTFOUND        ; IF NOT FOUND,
                    JE          GH2A2                   ; CHECK NEXT DATA
TYPE

JMP         GH4                     ; ELSE, SPAWN THE
PROGRAM

GH2A2:              MOV         [H_ITYPE],CMD_TYPE      ; CHECK FOR
DATA TYPE 2
                    CALL        IGETBLK
                    MOV         AX,[H_ISTAT]
                    CMP         AX,H_ERRNOTFOUND        ; IF NOT FOUND,
                    JE          GH2A3                   ; CHECK FOR
PROGRAM TO SPAWN
                    PUSH        BX
                    MOV         BX,[H_ISIZE]
                    MOV         [TSRBUF+BX],0           ; TERMINATE
STRING
                    POP         BX
                    CALL        ICLRBLK                 ; CLEAR THE
TSR DATA BLOCK
                    JMP         GH3

GH2A3:              MOV         [H_ITYPE],PROG_TYPE     ; ELSE,
CHECK FOR TYPE 1
                    CALL        IGETBLK
                    PUSH        BX
                    MOV         BX,[H_ISIZE]
                    MOV         [TSRBUF+BX],0           ; TERMINATE
```

- 84 -

```
           STRING
                       POP       BX
                       MOV       AX,[H_ISTAT]
                       CMP       AX,H_ERRNOTFOUND        ; IF NOT FOUND,
                       JE        GH2B                    ; SPAWN NSCMENU

JMP       GH4                     ; ELSE, SPAWN THE
PROGRAM

;
; COPY DEFAULT PROG NAME OF NSCMENU.EXE TO OUR BUFFER FOR DEFAULT
;
GH2B:                  PUSH      ES
                       PUSH      DS
                       PUSH      DI
                       PUSH      SI
                       PUSH      CX

;
; STORE CURRENT PATH FOR NSCMENU TO GRAB.  THIS IS DONE EVERY TIME
; THE KERNEL SPAWNS NSCMENU SO THAT NSCMENU CAN FIND ITS MENU FILE.
;
                       MOV       CX,[DIR_LEN]
                       INC       CX
                       INC       CX
                       INC       CX
                       MOV       AX,DS
                       MOV       ES,AX
                       MOV       SI,OFFSET CUR_DIR
                       MOV       DI,OFFSET TSRBUF
                       CLD
                       REP       MOVSB
                       MOV       CX,[DIR_LEN]
                       INC       CX
                       INC       CX
                       INC       CX

MOV       DX,PATH_TYPE
                       MOV       SI,OFFSET TSRBUF
                       MOV       [H_PSIZE],CX
                       MOV       [H_PTYPE],DX
                       CALL      PPUTBLK

MOV       AX,[H_PSTAT]
                       CMP       AX,H_ERRNOTSTORED       ; NOT STORED
                       JNE       GH2C

POP       CX
                       POP       SI
                       POP       DI
```

```
                        POP         DS
                        POP         ES

JMP         GETHLDR99

GH2C:           MOV         CX,[PLNAME]
                        MOV         AX,DS
                        MOV         ES,AX
                        MOV         SI,OFFSET PNAME
                        MOV         DI,OFFSET TSRBUF
                        CLD
                        REP         MOVSB
```

;
; IF THERE IS A DATATYPE, COPY THAT TO THE END OF THE NAME IN TSRBUF
; OF THE DEFAULT SPAWN PROGRAM.  IF FIRST BYTE OF DPARG IS 0, THEN
; THERE IS NO ARG TO COPY.  WE NEED TO DO THIS EVERY TIME, SINCE
; AN APPLICATION COULD CHANGE DPARG ANYTIME.
;

```
                        MOV         AL,[DPARG]
                        CMP         AL,0
                        JE          GH2C1
                        MOV         CX,[DPARG_SIZE]
                        MOV         AX,DS
                        MOV         ES,AX
                        MOV         SI,OFFSET DPARG
                        MOV         DI,OFFSET TSRBUF
                        MOV         BX,[DPNAME_SIZE]
                        MOV         [TSRBUF+BX],' '
                        INC         BX
                        ADD         DI,BX
                        CLD
                        REP         MOVSB
                        ADD         BX,[DPARG_SIZE]
                        INC         BX
                        MOV         [TSRBUF+BX],0

GH2C1:          POP         CX
                        POP         SI
                        POP         DI
                        POP         DS
                        POP         ES

JMP         GH4
```

;
; PROCESS CMD
;

```
        GH3:            PUSH        ES
                        PUSH        DS
```

```
                    PUSH        DI
                    PUSH        SI
                    PUSH        CX
                    MOV         CX,79
                    MOV         AX,DS
                    MOV         ES,AX
                    MOV         SI,OFFSET TSRBUF
                    MOV         DI,OFFSET INP_BUF
                    CLD
                    REP         MOVSB
                    INC         DI
                    MOV         AX,0
                    MOV         [DI],AL
                    POP         CX
                    POP         SI
                    POP         DI
                    POP         DS
                    POP         ES

CALL        INT_CMD             ; IF INT_CMD, PROCESS
                    JNC         GH3Z
                    CMP         [EXECERRFLG],1      ; EXEC ERROR ?
                    JE          GETHLDR99           ; YES, EXIT
                    CALL        EXT_CMD             ; PASS ON TO DOS
SHELL IF NOT INTERNAL
                    CMP         [EXECERRFLG],1      ; EXEC ERROR ?
                    JE          GETHLDR99           ; YES, EXIT
GH3Z:               JMP         GH1                 ; CONTINUE LOOP

;
; SPAWN PROGRAM
;

GH4:                MOV         ERRTRIES,0
                    PUSH        ES
                    PUSH        DI
                    PUSH        CX
                    MOV         DI,OFFSET EXBUF     ; CLEAR EXBUF
COMPLETELY
                    MOV         AX,SEG EXBUF
                    MOV         ES,AX
                    XOR         AL,AL
                    MOV         CX,BUF_SIZE
                    REP         STOSB
                    POP         CX
                    POP         DI
                    POP         ES

CALL        ICLRBLK                     ; CLEAR THE
TSR DATA BLOCK

GH4AA1:             PUSH        DS                          ; THIS IS LOOP
POINT FOR
                    PUSH        ES                          ; TRYING NEW PATHS
```

```
EXBUF IS                                                    ; ON FIRST TRY,
                                                            ;     EMPTY.    ON
SUCCESSIVE TRIES
                                                            ; EXBUF CONTAINS A
PATH, ENDING
                                                            ;     WITH    '\',
FOLLOWED BY A 0.
                    PUSH    DS
                    PUSH    ES
                    PUSH    SI
                    PUSH    DI
                    PUSH    CX
                    PUSH    BX

MOV     BX,0
GH4AA4:             MOV     AL,[EXBUF+BX]
                    CMP     AL,0
                    JE      GH4AA3
                    INC     BX
                    JMP     GH4AA4
GH4AA3:             MOV     CX,BUF_SIZE
                    SUB     CX,BX
                    MOV     AX,SEG EXBUF
                    MOV     ES,AX
                    MOV     DI,OFFSET EXBUF
                    ADD     DI,BX
                    MOV     SI,OFFSET TSRBUF
                    MOV     AX,SEG TSRBUF
                    MOV     DS,AX
                    REP     MOVSB

POP     BX
                    POP     CX
                    POP     DI
                    POP     SI
                    POP     ES
                    POP     DS

MOV     AX,OFFSET OUR_CMD               ; FORCE OUR OWN
ARGS
                    MOV     [PAR_CMD],AX
                    MOV     AX,DS
                    MOV     [PAR_CMD+4],AX
                    MOV     BX,0
GH4A:           MOV     AL,[EXBUF+BX]
                    CMP     AL,' '                          ; DO WE HAVE
ARGS?
                    JE      GH4B                            ; YES
                    CMP     AL,0                            ; END WITH NO
ARGS?
                    JNE     GH4A1                           ; NO, CONTINUE
                    MOV     CX,1                            ; SET UP FOR NO
ARGS
```

```
                    JMP         GH4C
GH4A1:                  INC         BX
                    JMP         GH4A

GH4B:               MOV         [EXBUF+BX],0              ; TERMINATE
PROG NAME
                    INC         BX
                    MOV         CX,1                      ; BYTE COUNT FPR
FIRST BYTE
GH4B1:              MOV         AL,[EXBUF+BX]
                    CMP         AL,0                      ; END OF ARGS?
                    JE          GH4C                      ; YES, PROCESS
                    PUSH        BX
                    MOV         BX,CX
                    MOV         [OUR_CMD+BX],AL           ; MOV TO OUR
CMD TAIL
                    INC         BX
                    MOV         CX,BX
                    POP         BX
                    INC         BX                        ; NEXT SPOT IN
TSRBUF
                    JMP         GH4B1
GH4C:                   MOV         BX,CX
                    MOV         [OUR_CMD],BL              ; BYTE COUNT
                    MOV         [OUR_CMD+BX],0DH
                    INC         BX
                    MOV         [OUR_CMD+BX],0

MOV         [CS:STK_SEG],SS           ; SAVE
OUR STACK
                    MOV         [CS:STK_PTR],SP
                    MOV         DX,OFFSET EXBUF           ; PASS ON NAME
OF
                    MOV         BX,OFFSET PAR_BLK         ; PROG TO
EXECUTE
                    MOV         AH,4BH                    ; AND ITS
PARAMS
                    MOV         AL,0
                    INT         21H
                    MOV         SS,[CS:STK_SEG]           ;
RESTORE OUR STUFF
                    MOV         SP,[CS:STK_PTR]
                    POP         ES
                    POP         DS
                    MOV         AX,OFFSET CMD_TAIL        ; RESTORE
CMD TAIL
                    MOV         [PAR_CMD],AX
                    MOV         AX,DS
                    MOV         [PAR_CMD+4],AX

PUSH        ES
                    PUSH        DS
                    POP         ES
                    MOV         AL,0                      ; ZERO
```

- 89 -

```
OUR_CMD
            MOV       CX,0
            MOV       CL,[INP_LEN]
            MOV       DI,OFFSET OUR_CMD
            REP       STOSB
            POP       ES
;
; THIS ERROR WOULD BE FROM DOS. IF A USER TYPED INCORRECTLY, WE WOULD NOT
; KNOW IT.  NEED AN ERROR PASSING MECHANISM HERE VIA HOLDER.
;
            JC        GH5                           ; ERROR
;
; CHECK FOR ERROR FROM NSCMENU ERROR HERE
;
            MOV       [H_ITYPE],ERROR_TYPE          ; CHECK FOR DATA TYPE 4
            CALL      IGETBLK
            MOV       AX,[H_ISTAT]
            CMP       AX,H_ERRNOTFOUND              ; IF NOT FOUND, CONTINUE
            JE        GH4Z
;
; WE NEED TO TRY LAUNCHING THE PROGRAM IN AT LEAST TWO WAYS:
;
;   1. FROM CURRENT DIRECTORY
;   2. FROM DIRECTORY IN DEF_DIR
;   3. FROM DIRECTORIES IN PATH= ENVIRONMENT VARIABLE
;
; WE NEED A GLOBAL VARIABLE INDICATING WHICH OF THESE STEPS WE NEED TO DO
; NEXT.  WHEN THE VARIABLE REACHES ONE GREATER THAN THE STEPS WE CAN TAKE,
; WE EXIT WITH A FAILURE.
;
            INC       ERRTRIES
            CMP       ERRTRIES,MAXTRIES
            JE        ERRTRYDN
;
; TRY NEXT PATH HERE AND LOOP BACK TO PROGRAM LAUNCH
;
            PUSH      ES
            PUSH      DI
            PUSH      CX
            MOV       DI,OFFSET EXBUF               ; CLEAR EXBUF COMPLETELY
            MOV       AX,SEG EXBUF
            MOV       ES,AX
```

```
                    XOR     AL,AL
                    MOV     CX,BUF_SIZE
                    REP     STOSB
                    POP     CX
                    POP     DI
                    POP     ES
;
; FOR NOW, JUST TRY NSCTOOL= (DEF_DIR)
;
                    CMP     DEF_LEN,0
                    JNE     ERRTRY1
                    INC     ERRTRIES
                    JMP     ERRTRYDN

ERRTRY1:            PUSH    DS                          ; COPY DEF_DIR TO
EXBUF FOR
                    PUSH    ES                          ; NEW PATH.
                    PUSH    SI
                    PUSH    DI
                    PUSH    CX
                    MOV     AX,SEG EXBUF
                    MOV     ES,AX
                    MOV     DI,OFFSET EXBUF
                    MOV     CX,DEF_LEN
                    MOV     SI,OFFSET DEF_DIR
                    MOV     AX,SEG DEF_DIR
                    MOV     DS,AX
                    REP     MOVSB
                    POP     CX
                    POP     DI
                    POP     SI
                    POP     ES
                    POP     DS

JMP     GH4AA1                      ; TRY AGAIN TO
SPAWN FROM
;                                                       ; NEW PATH
; FAIL HERE
;

ERRTRYDN:           CALL    ICLRBLK                     ; CLEAR
HOLDER CMD

MOV     DX,OFFSET MSG50             ; EXEC
OF PROGRAM
                    MOV     CX,[M50_LENGTH]             ;
FAILED
                    MOV     BX,STDERR
                    MOV     AH,40H
                    INT     21H
                    JMP     GETHLDR99                   ; AND RETURN
```

- 91 -

```
GH4Z:
;
; CHECK FOR A DIY MSG (DIY_TYPE).  IF PRESENT, DELETE IT.
;
                MOV        [H_ITYPE],DIY_TYPE              ; CHECK FOR
DIY TYPE 9
                CALL       IGETBLK
                MOV        AX,[H_ISTAT]
                CMP        AX,H_ERRNOTFOUND                ; IF NOT FOUND,
                JE         GH1                             ; CONTINUE LOOP
;
; FOUND, DELETE IT AND GO ON TO NEXT ITEM.  NOTE: WE MAY FIND WE
HAVE TO
; CLOSE AND RE-OPEN THE DRIVER.  IF SO, PUT THAT HERE ALSO.  THEN
PLACE
; NEW HANDLES INTO HOLDER FOR APPLICATIONS.
;
                PUSH       BX
                MOV        BX,[H_ISIZE]
                MOV        [TSRBUF+BX],0                   ; TERMINATE
STRING
                POP        BX
                CALL       ICLRBLK                         ; CLEAR THE TSR
DATA BLOCK
                JMP        GH1                             ; CONTINUE
LOOP
;
GH5:

;
; WE NEED TO TRY LAUNCHING THE PROGRAM IN AT LEAST TWO WAYS:
;
;   1. FROM CURRENT DIRECTORY
;   2. FROM DIRECTORY IN DEF_DIR
;   3. FROM DIRECTORIES IN PATH= ENVIRONMENT VARIABLE
;
; WE NEED A GLOBAL VARIABLE INDICATING WHICH OF THESE STEPS WE NEED
TO DO
; NEXT.  WHEN THE VARIABLE REACHES ONE GREATER THAN THE STEPS WE
CAN TAKE,
; WE EXIT WITH A FAILURE.
;
                INC        ERRTRIES
                CMP        ERRTRIES,MAXTRIES
                JE         ERRTRYDN5
;
; TRY NEXT PATH HERE AND LOOP BACK TO PROGRAM LAUNCH
;
                PUSH       ES
```

- 92 -

```
                        PUSH    DI
                        PUSH    CX
                        MOV     DI,OFFSET EXBUF         ; CLEAR EXBUF
COMPLETELY
                        MOV     AX,SEG EXBUF
                        MOV     ES,AX
                        XOR     AL,AL
                        MOV     CX,BUF_SIZE
                        REP     STOSB
                        POP     CX
                        POP     DI
                        POP     ES
;
; FOR NOW, JUST TRY NSCTOOL= (DEF_DIR)
;
                        CMP     DEF_LEN,0
                        JNE     ERRTRY15
                        INC     ERRTRIES
                        JMP     ERRTRYDN5

ERRTRY15:               PUSH    DS                      ; COPY DEF_DIR TO
EXBUF FOR
                        PUSH    ES                      ; NEW PATH.
                        PUSH    SI
                        PUSH    DI
                        PUSH    CX
                        MOV     AX,SEG EXBUF
                        MOV     ES,AX
                        MOV     DI,OFFSET EXBUF
                        MOV     CX,DEF_LEN
                        MOV     SI,OFFSET DEF_DIR
                        MOV     AX,SEG DEF_DIR
                        MOV     DS,AX
                        REP     MOVSB
                        POP     CX
                        POP     DI
                        POP     SI
                        POP     ES
                        POP     DS

JMP     GH4AA1                  ; TRY AGAIN TO
SPAWN FROM
;                                                       ; NEW PATH
; FAIL HERE
;
ERRTRYDN5:              CALL    ICLRBLK                 ; CLEAR
HOLDER CMD
                        MOV     DX,OFFSET MSG5          ; EXEC
OF PROGRAM
                        MOV     CX,[M5_LENGTH]          ; FAILED
                        MOV     BX,STDERR
```

```
                MOV     AH,40H
                INT     21H                             ; JUST FALL
THROUGH
                                                        ; AND RETURN
GETHLDR99:      POP     BX
                POP     DX
                POP     CX
                POP     ES
                POP     DS
                RET
ENDP            GET_HLDR

;
; THIS ROUTINE GETS THE USER INPUT FROM THE CMD LINE
;

PROC            GET_CMD

MOV     DX,OFFSET PROMPT
                MOV     CX,[PT_LENGTH]
                MOV     BX,STDOUT
                MOV     AH,40H
                INT     21H
                MOV     DX,OFFSET INP_BUF
                MOV     CX,[INPB_LENGTH]
                MOV     BX,STDIN
                MOV     AH,3FH
                INT     21H
                MOV     SI,OFFSET INP_BUF
                MOV     CX,[INPB_LENGTH]
GCMD1:          CMP     [BYTE SI],'a'
                JB      GCMD2
                CMP     [BYTE SI],'z'
                JA      GCMD2
                SUB     [BYTE SI],'a'-'A'
GCMD2:          INC     SI
                LOOP    GCMD1
                RET
ENDP            GET_CMD

;
; THIS ROUTINE GETS THE NAME OF THE PROGRAM DEFINED BY THE COMSPEC
; ENVIRONMENT VARIABLE.  THIS SHOULD BE A VALID DOS SHELL NAME.
;

PROC            GET_COMSPEC

MOV     SI,OFFSET COM_VAR
                CALL    GET_ENV
                JC      GCSP2
                MOV     SI,OFFSET COM_SPEC
GCSP1:          MOV     AL,[ES:DI]
                MOV     [SI],AL
                INC     SI
```

```
                INC       DI
                OR        AL,AL
                JNZ       GCSP1
GCSP2:              RET
ENDP            GET_COMSPEC

PROC            GET_ENV

MOV       ES,[ENV_SEG]
                XOR       DI,DI
GENV1:              MOV       BX,SI
                CMP       [BYTE ES:DI],0
                JNE       GENV2
                STC
                RET
GENV2:              MOV       AL,[BX]
                OR        AL,AL
                JZ        GENV3
                CMP       AL,[ES:DI]
                JNE       GENV4
                INC       BX
                INC       DI
                JMP       GENV2
GENV3:              RET
GENV4:              XOR       AL,AL
                MOV       CX,-1
                CLD
                REPNZ     SCASB
                JMP       GENV1
ENDP            GET_ENV

;
; THIS ROUTINE SPAWNS A DOS SHELL AND IS CALLED BY THE DOS_CMD ROUTINE
; IN RESPONSE TO A USER 'DOS' ENTRY.
;
PROC            EXEC

PUSH      DS
                PUSH      ES

MOV       [CS:STK_SEG],SS              ; SAVE OUR STACK
                MOV       [CS:STK_PTR],SP
                MOV       DX,OFFSET COM_SPEC           ; PASS ON NAME OF
                MOV       BX,OFFSET PAR_BLK            ; PROG TO EXECUTE
                MOV       AH,4BH                       ; AND ITS PARAMS
                MOV       AL,0
                INT       21H
```

```
                MOV         SS,[CS:STK_SEG]                     ;
RESTORE OUR STUFF
                MOV         SP,[CS:STK_PTR]
                POP         ES
                POP         DS
                JNC         EXEC1
                MOV         DX,OFFSET MSG2                      ; EXEC
OF COMMAND.COM
                MOV         CX,[M2_LENGTH]                      ; FAILED
                MOV         BX,STDERR
                MOV         AH,40H
                INT         21H
                MOV         [EXECERRFLG],1
EXEC1:
                RET
ENDP            EXEC

;
; THIS ROUTINE FORCES US BACK TO THE HOME DIRECTORY AS SET ON
ENTRANCE
; TO THE KERNEL
;
PROC            HOME_CMD
                MOV         AH,0EH                              ; SET
DEFAULT DRIVE
                MOV         DL,[CUR_DRIVE]
                INT         21H
                MOV         AH,3BH                              ; SET
CURRENT DIRECTORY
                MOV         DX,OFFSET CUR_DIR
                INT         21H
                RET
ENDP            HOME_CMD

;
; THIS ROUTINE CLEARS THE PUBLIC AND PRIVATE HOLDER BUFFERS
;
PROC            RESET_CMD
                CALL        IRST        ; CLEAR THE PUBLIC AND PRIVATE
HOLDER BUFFERS
                PUSH        ES
                PUSH        DI
                PUSH        CX

PUSH        DS
                POP         ES
                MOV         AL,0                                ; ZERO
OUR_CMD
                MOV         CX,0
                MOV         CL,[INP_LEN]
```

```
                    MOV         DI,OFFSET OUR_CMD
                    REP         STOSB
                    MOV         AL,0                        ; ZERO
INP_BUF
                    MOV         CX,0
                    MOV         CL,[INP_LEN]
                    MOV         DI,OFFSET INP_BUF
                    REP         STOSB
                    MOV         AL,0                        ; ZERO
TSRBUF
                    MOV         CX,0
                    MOV         CX,BUF_SIZE
                    MOV         DI,OFFSET TSRBUF
                    REP         STOSB

POP         CX
                    POP         DI
                    POP         ES
                    RET
ENDP                RESET_CMD
;
; THIS ROUTINE PRINTS THE HELP INFORMATION
;
PROC                HELP_CMD
                    MOV         DX,OFFSET MSG6
                    MOV         CX,[M6_LENGTH]
                    MOV         BX,STDERR
                    MOV         AH,40H
                    INT         21H
                    MOV         DX,OFFSET MSG7
                    MOV         CX,[M7_LENGTH]
                    MOV         BX,STDERR
                    MOV         AH,40H
                    INT         21H
                    MOV         DX,OFFSET MSG8
                    MOV         CX,[M8_LENGTH]
                    MOV         BX,STDERR
                    MOV         AH,40H
                    INT         21H
                    MOV         DX,OFFSET MSG9
                    MOV         CX,[M9_LENGTH]
                    MOV         BX,STDERR
                    MOV         AH,40H
                    INT         21H
                    MOV         DX,OFFSET MSG10
                    MOV         CX,[M10_LENGTH]
                    MOV         BX,STDERR
                    MOV         AH,40H
                    INT         21H
                    MOV         DX,OFFSET MSG11
                    MOV         CX,[M11_LENGTH]
                    MOV         BX,STDERR
```

- 97 -

```
                    MOV      AH,40H
                    INT      21H
                    RET
ENDP                HELP_CMD

;
; THIS ROUTINE SETS THE SHELL FLAG FOR THE HOLDER LOOP. IT IS SET BY
; CMD IN NSCMENU
;

PROC                SHELL_CMD
                    MOV      [SHFLG],1
                    RET
ENDP                SHELL_CMD

;
; THIS IS THE HANDLER FOR THE DOS COMMAND EXECUTION.  IT IS CALLED IF
; THE USER ENTERS THE 'DOS' COMMAND REQUIRING ACCESS TO A COMMAND.COM.
;

PROC                DOS_CMD

MOV      [PAR_CMD],OFFSET NULTAIL            ; NO PARAMS, JUST CR
                    CALL     EXEC
                    RET
ENDP                DOS_CMD

;
; THIS CMD RETURNS TO THE GET_HOLDER LOOP FROM THE SHELL, AND EXITS FROM
; THE KERNEL PERMANENTLY FROM THE NSCMENU MENU.
;

PROC                EXIT_CMD

MOV      AX,1
                    MOV      [EXITFLG],AX                        ; SET EXITFLG TRUE
                    RET
ENDP                EXIT_CMD

;
;
;***************************************************************************
;
; THESE ARE THE ACCESS ROUTINES TO THE HOLDER TSR.
; THE RESULTS OF THESE ARE PLACED IN THE GLOBAL VARIABLES H_...
; WHEN CALLING THE PROCEDURES HERE, IT IS NOT NECESSARY FOR THE CALLER TO
```

What is claimed is:

1. In a microcomputer of the IBM compatible type incorporating a random access memory for storing an MSDOS type disk operating system, a plurality of serial communication ports and a real-time clock for generating real-time interrupts, apparatus for extending and enhancing the operating environment of subordinate application programs, said apparatus comprising:

(a) a public buffer of fixed capacity resident in said random access memory for storing inter-program messages and data indicative of a conditionally specified execution sequence for asynchronous communication with a kernel program;

(b) a private buffer of fixed capacity resident in said random access memory for storing data (execution thread) indicative of a conditionally specified application program execution sequence for asynchronous communication between application programs;

(c) a first controlling means (Holder program) for controlling the transfer of data to and from said public buffer according to a first predetermined command protocol, said first controlling means further controlling the transfer of data to and from said private buffer according to a second predetermined command protocol; and (d) a second controlling means (Kernel program) for controlling the execution of a plurality of distinct and subordinate application programs in a serial sequence according to the data stored in said private buffer, said subordinate application programs communicating asynchronously via said inter-program messages stored in said public buffer.

2. The apparatus as in claim 1 wherein said first predetermined command protocol is the same as said second predetermined command protocol, such that code defining said first controlling means is minimized.

3. The apparatus as in claim 2 wherein said public and private buffers each comprise a predetermined number of bytes partitioned into a plurality of slots, the slots being of varying size, and means for adjusting the size of the slots to accommodate interprogram messages which may occupy any fraction of the predetermined number of bytes of said public buffer, and execution sequence data which may occupy any fraction of the predetermined number of bytes of said private buffer.

4. The apparatus as in claim 3 wherein said interprogram messages include a predefined identifier serving to identify in addressee of a given interprogram message.

5. The apparatus as in claim 1 wherein said second controlling means includes means storing file handles associated with said communication ports in said public buffer for allowing multiple subordinate (child) application programs to share a single serial communication port.

6. The apparatus as in claim 1 and further including a third controlling means (CHRON program) responsive to said real-time interrupts and a state of said real-time clock of said microcomputer for storing an executable message in said private buffer as specified by a time-stamped message placed in said public buffer by one of said subordinate application programs.

7. A method of providing asynchronous inter-program communication for a microcomputer of the IBM compatible type incorporating a random access memory for storing a MSDOS type disk operating system comprising the steps of:

(a) installing in said microcomputer a control program defining a public and a private buffer, each of a fixed capacity and resident in said random access memory, the public and private buffers storing inter-program messages and data indicative of a conditionally specified execution sequence, respectively;

(b) controlling the transfer of data to and from said public buffer according to a first predetermined protocol defined by a first subprogram of the control program, said first subprogram further asynchronously controlling the transfer of data to and from said private buffer according to a second predetermined command protocol; and (c) controlling the sequence of execution of a plurality of distinct and subordinate application programs in a serial order, the distinct and subordinate application programs comprising a second subprogram, the sequence of execution being in accordance with the contents of said private buffer, said distinct and subordinate application programs asynchronously communicating in accordance with the interprogram messages contained in said public buffer.

* * * * *